(12) United States Patent
Kumar et al.

(10) Patent No.: US 9,703,796 B2
(45) Date of Patent: Jul. 11, 2017

(54) SHARED DICTIONARY BETWEEN DEVICES

(71) Applicant: Brocade Communications Systems, Inc., San Jose, CA (US)

(72) Inventors: Pashupati Kumar, San Jose, CA (US); Amar Vutukuru, San Jose, CA (US); Amr Sabaa, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 806 days.

(21) Appl. No.: 13/677,957

(22) Filed: Nov. 15, 2012

(65) Prior Publication Data

US 2013/0318051 A1 Nov. 28, 2013

Related U.S. Application Data

(60) Provisional application No. 61/567,281, filed on Dec. 6, 2011.

(51) Int. Cl.
*G06F 7/00* (2006.01)
*G06F 17/00* (2006.01)
*G06F 17/30* (2006.01)

(52) U.S. Cl.
CPC .............................. *G06F 17/30156* (2013.01)

(58) Field of Classification Search
CPC ............. G06F 17/30156; G06F 3/0641; G06F 11/1453; G06F 3/0683
USPC ........................................................ 707/692
See application file for complete search history.

(56) References Cited

U.S. PATENT DOCUMENTS

| | | | | |
|---|---|---|---|---|
| 8,543,609 | B1* | 9/2013 | Natanzon | G06F 3/0605 707/791 |
| 8,707,107 | B1* | 4/2014 | Panna | G06F 11/1469 714/1 |
| 2009/0210427 | A1* | 8/2009 | Eidler | G06F 11/1484 |
| 2010/0042790 | A1* | 2/2010 | Mondal | G06F 3/0608 711/161 |
| 2011/0184908 | A1* | 7/2011 | Slater | G06F 11/1453 707/609 |
| 2011/0188375 | A1* | 8/2011 | Chang | H04L 12/26 370/232 |
| 2011/0238635 | A1* | 9/2011 | Leppard | G06F 17/30159 707/693 |
| 2011/0258161 | A1* | 10/2011 | Constantinescu | G06F 11/1453 707/640 |
| 2012/0124011 | A1* | 5/2012 | Spackman | G06F 17/30162 707/692 |
| 2013/0086007 | A1* | 4/2013 | Bandopadhyay | G06F 17/30156 707/692 |
| 2013/0091102 | A1* | 4/2013 | Nayak | G06F 3/0613 707/692 |
| 2013/0246366 | A1* | 9/2013 | Preslan | G06F 11/1453 707/652 |

(Continued)

*Primary Examiner* — Binh V Ho
(74) *Attorney, Agent, or Firm* — Blank Rome, LLP

(57) ABSTRACT

In one embodiment, a system and method for managing a network deduplication dictionary is disclosed. According to the method, the dictionary is divided between available deduplication engines (DDE) in deduplication devices that support shared dictionaries. The fingerprints are distributed to different DDEs based on a hash function. The hash function takes the fingerprint and hashes it and based on the hash result, it selects one of the DDEs. The hash function could select a few bits from the fingerprint and use those bits to select a DDE.

43 Claims, 57 Drawing Sheets

(56) References Cited

U.S. PATENT DOCUMENTS

2014/0032508 A1\* 1/2014 Rao ...................... G06F 3/0641
707/692

\* cited by examiner

Literal Command

| b34 | b33-b32 | b31-b24 / b23-b16 | b15-b8 / b7-b0 |
|---|---|---|---|
| 0 | L | Byte 3 / Byte 2 | Byte 1 / Byte 0 |

| L Field | Byte 3 | Byte 2 | Byte 1 | Byte 0 |
|---|---|---|---|---|
| 01 | Valid | | | |
| 10 | Valid | Valid | | |
| 11 | Valid | Valid | Valid | |
| 00 | Valid | Valid | Valid | Valid |

Match Command

| b34-b32 | b31 | b30 | b29-b26 | b25-b16 | b15-b12 | b11-b0 |
|---|---|---|---|---|---|---|
| 100 | X | Y | Rsvd | Length | Rsvd | Offset |

— X: (Length < 128)
— Y: (Length < 9) and (Offset < 2048)

EOF Command

| b34-b33 | b32-b1 | b0 |
|---|---|---|
| 11 | Reserved | E |

FIG. 15A

Literal Records
Rec Type 0x00
(Up to 256 bytes)
N Literal Bytes
Rec Type 0x01 to 0x0F
(4 to 18 bytes)
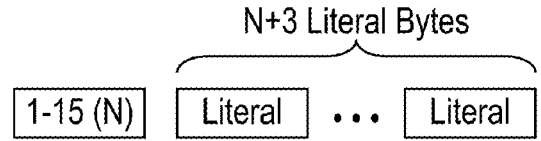
N+3 Literal Bytes
Match Records
Rec Type 0x20 (Length < 1024; 1 < Offset < 4096)
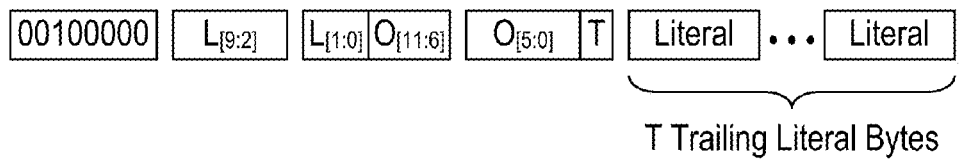
T Trailing Literal Bytes
Rec Type 0x20 to 0x3F (3 < Length < 128; 1 < Offset < 4096)
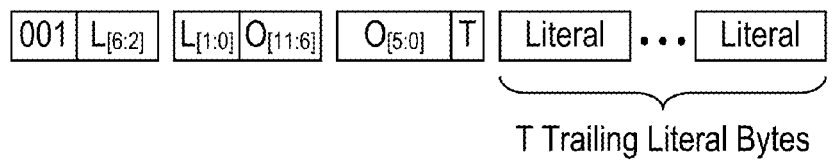
T Trailing Literal Bytes
Rec Type 0x40 to 0xFF (2 < Length < 8; 1 < Offset < 2049)
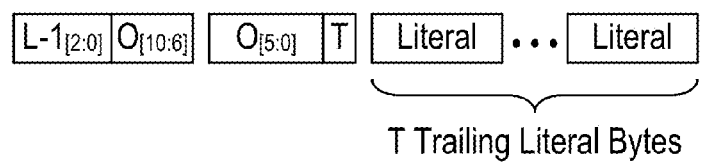
T Trailing Literal Bytes
EOF Record
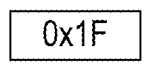
FIG. 15B

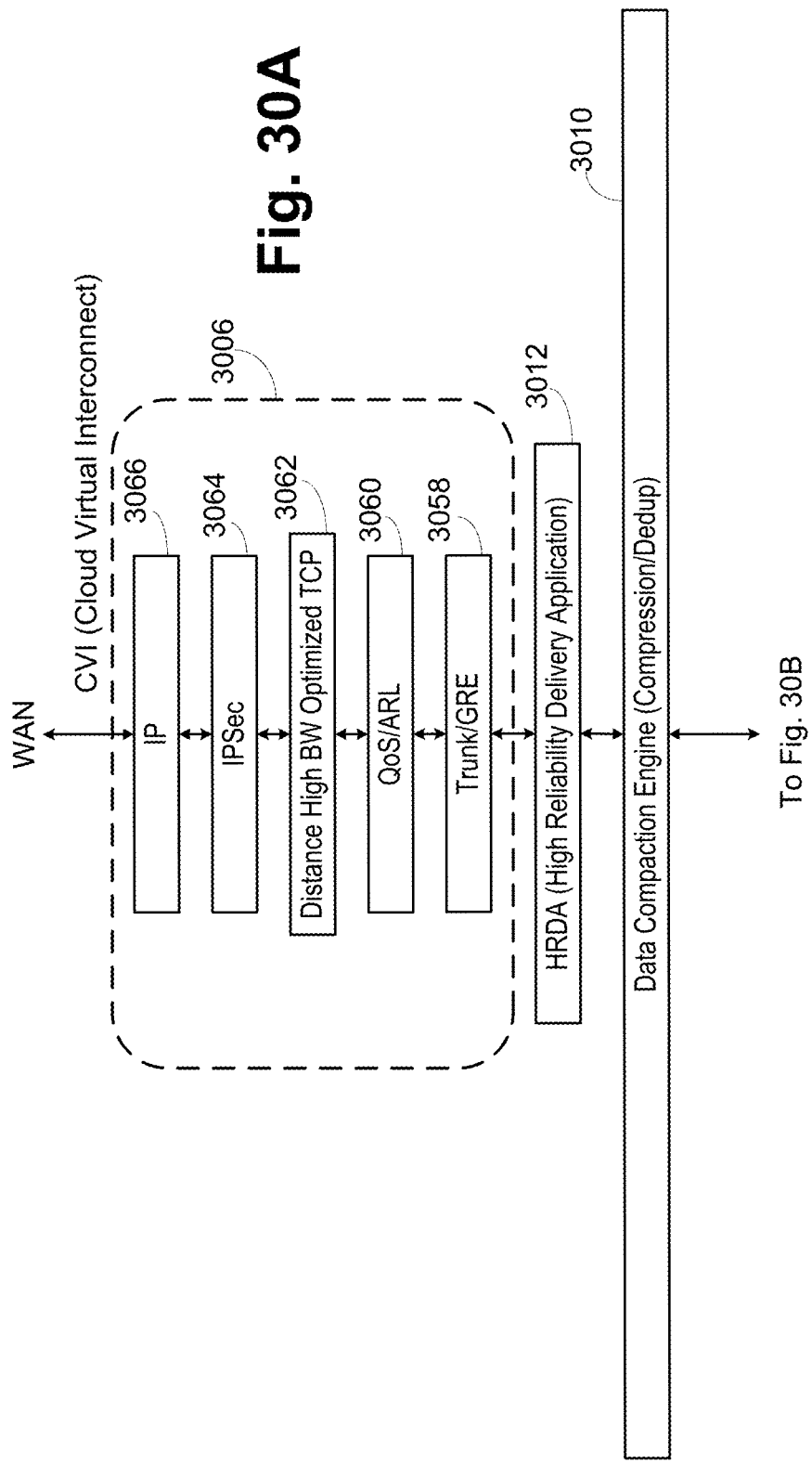

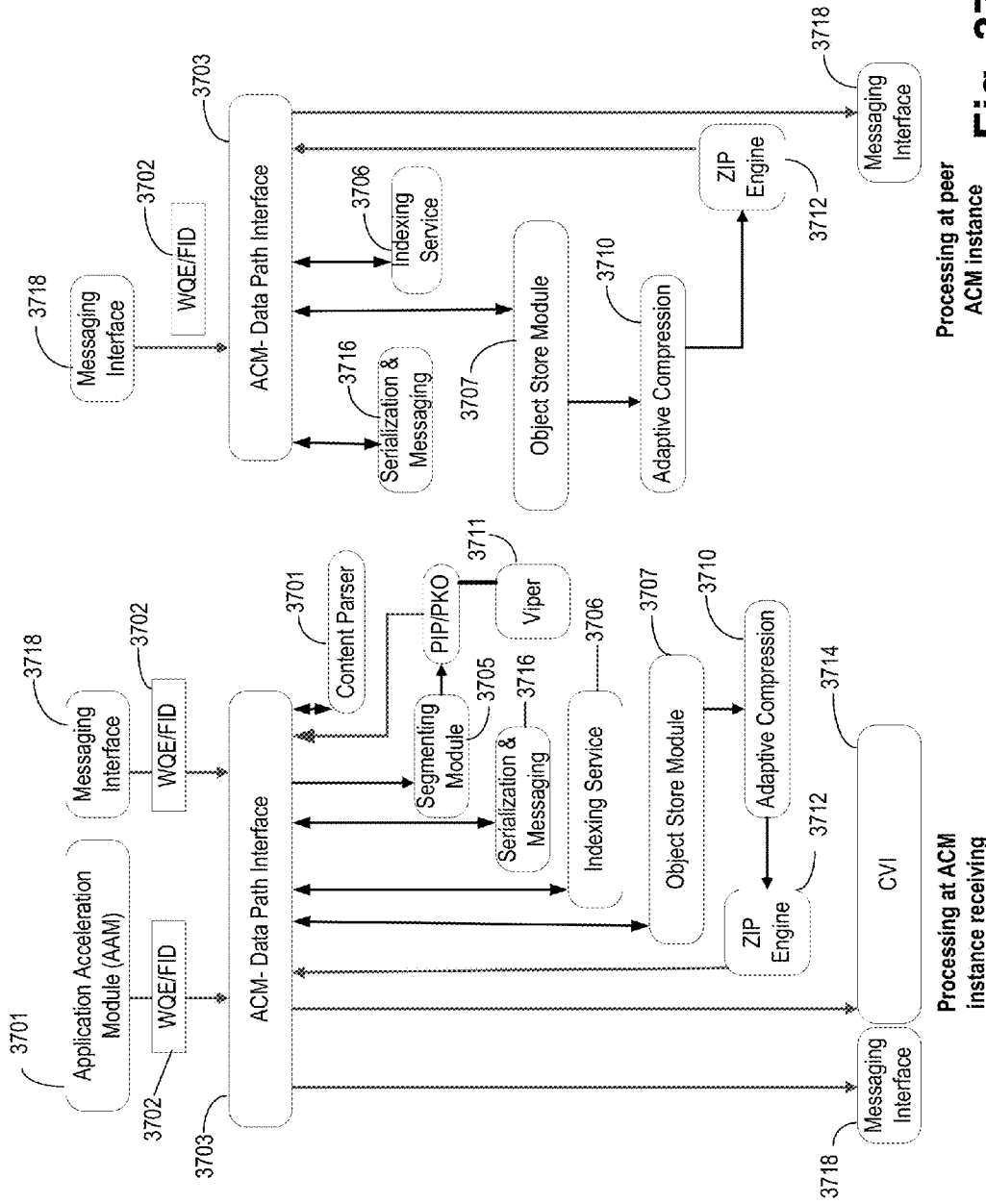

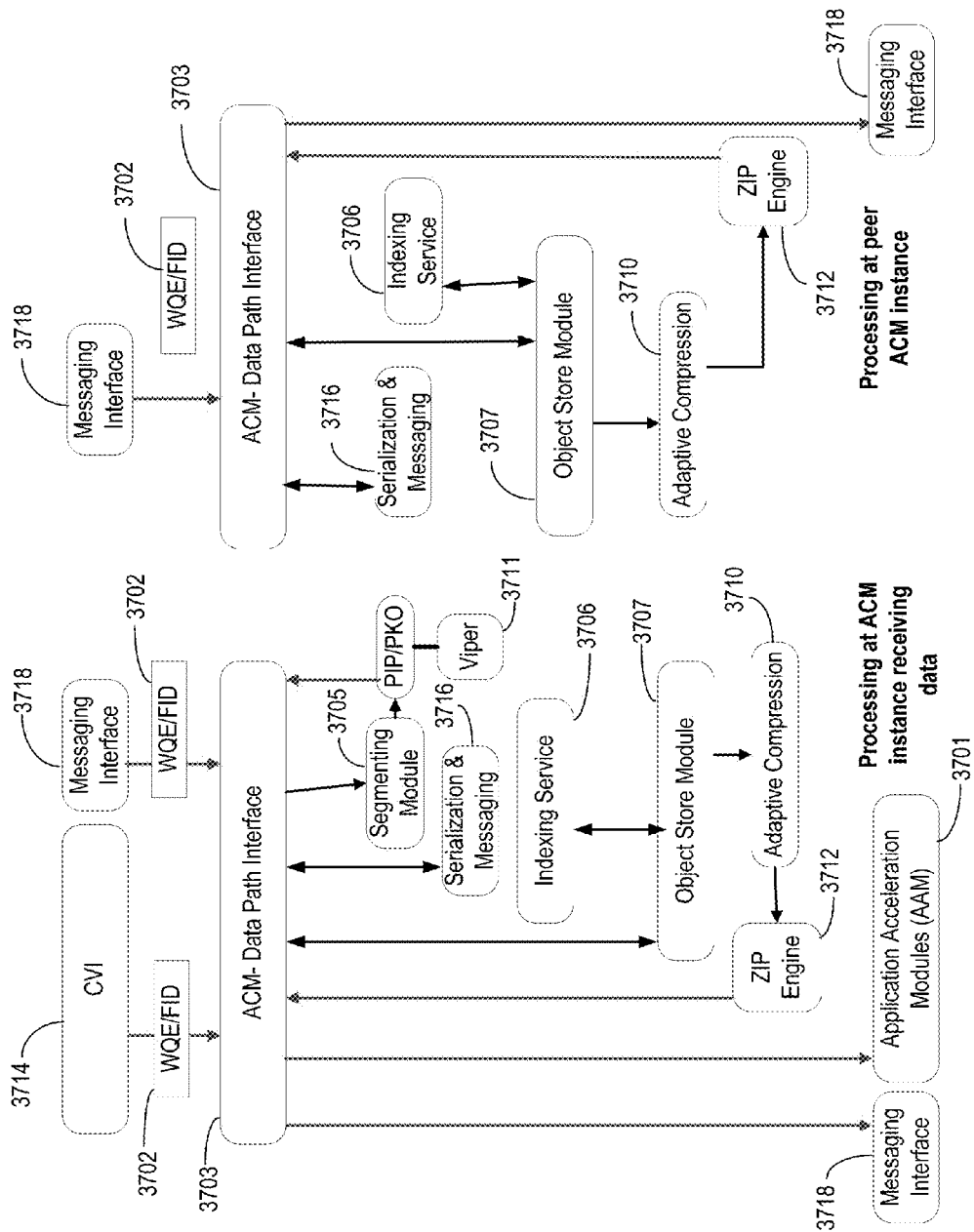
Fig. 38A — Processing at ACM instance receiving data
Fig. 38B — Processing at peer ACM instance

SHARED DICTIONARY BETWEEN DEVICES

CROSS REFERENCE TO RELATED APPLICATIONS

This application claims the benefit under 35 U.S.C. §119(e) of U.S. Provisional Patent Application Ser. No. 61/567,281 entitled "Distributed Dictionaries in Deduplication Devices," filed Dec. 6, 2011, which is hereby incorporated by reference.

TECHNICAL FIELD

The present invention relates to the field of computer networking, and in particular to techniques for sharing a dictionary between deduplication engines in deduplication devices that support a shared dictionary.

BACKGROUND

As the speed and size of networked computer systems have continued to increase, so has the amount of data stored within, and exchanged between, such systems. While a great deal of effort has been focused on developing larger and more dense storage devices, as well as faster networking technologies, the continually increasing demand for storage space and networking bandwidth has resulted in the development of technologies that further optimize the storage space and bandwidth currently available on existing storage devices and networks. One such technology is data compression, wherein the data saved to a storage device, or transmitted across a network, is manipulated by software to reduce the total number of bytes required to represent the data, and thus reduce the storage and bandwidth required to store and/or transmit the data.

Data compression can be divided into two general categories: lossy data compression and lossless data compression. As the terms imply, lossy data compression (sometimes referred to as perceptual coding) allows for some loss of fidelity in the encoded information, while lossless data compression requires that the decompressed data must be an exact copy of the original data, with no alterations or errors. While lossy data compression may be suitable for applications that process audio, image and/or video data, a great many other data processing applications require the fidelity provided by lossless data compression.

Most existing lossless data compression techniques are iterative in nature, and generally are optimized for software implementations. These software-based lossless compression techniques are typically not well suited for use in applications requiring high speed/low latency data throughput, where even small processing delays may be unacceptable. Some hardware-based implementations do exist, but many such implementations process one byte at a time, and are thus limited to the clock frequency at which the hardware can be operated. Other hardware implementations are capable of processing multiple byes at one time, but these implementations do so at the expense of compression efficiency.

While data compression techniques attempt to address storage space and bandwidth concerns by reducing the amount of data that is stored on (and transmitted to and from) a storage device, other techniques attempt to address bandwidth concerns by limiting the number of times data is read from and written to the storage devices. One such technique is "caching," wherein a copy of the desired data on the storage device is maintained in memory after an initial read or write, and subsequent accesses to the data are directed to the in-memory copy. While caching works well for data that is stored together in one area of a disk (e.g., within adjacent sectors) or related areas (e.g., different platters but within the same cylinder), wherein the data is retrieved within either a single access or a small number of sequential accesses with minimal repositioning of the read/write head of the storage device, it does not work well with data that is distributed over different areas within a storage device or even different storage devices. Such a distribution can occur in data that is heavily modified after its initial storage, particularly in systems that use "thin provisioning" combined with "sparse mapping."

In systems that combine thin provisioning with sparse mapping, storage is virtualized and appears as being allocated when requested (e.g., by opening a file or creating a directory), but the actual physical storage is only allocated on an "as-needed" basis when the data is actually written to disk (i.e., allocated on an I/O-basis). Further, different files and file systems are sparsely distributed (i.e., mapped) over the logical block address space of the virtual disk (i.e., separated by large unused areas within the address space), but are sequentially allocated physically adjacent storage blocks on the physical disk. As a result, adjacent blocks on the physical disk can be associated with different files on the virtual disk. Further, as files are modified and expand, the additional file extents could be allocated anywhere on the physical disk, frequently within unrelated areas that are not anywhere near the originally allocated portions of the file (a condition sometimes referred to as "file fragmentation").

While thin provisioning combined with sparse mapping can result in efficient use of available storage resources which can be expanded as needed, rather than pre-allocated in bulk up front (sometimes referred to as "fat provisioning"), over time thin provisioning can result in significant file fragmentation. This fragmentation can result in the loss of any performance gains achieved by caching, and can even result in a performance penalty, wherein the system performs worse with caching enabled than with caching disabled. Such a performance penalty is due to the overhead associated with updating the cache each time old data is flushed from the cache and new data is read into the cache from the storage device (or written into the cache from a host device writing to the storage device).

Lossless data compression can be performed at two different levels: 1) between blocks of data, wherein duplicate blocks of data are identified and replaced with a pointer to a single copy of the data block saved on the storage system; and 2) within a block of data, wherein duplicate byte sequences within a single block of data are identified and replaced with a pointer to a single copy of the sequence within the data block. As the system receives data to be stored on the storage system, the data is grouped into data blocks referred to as "chunks." If all of the data within a chunk is identified as having already been stored onto the storage system, the descriptor of the object being stored is modified to point to the chunk already stored on the storage system, rather than to point to a new chunk that would needlessly store a duplicate copy of an existing chunk. Such elimination of duplicated chunks is referred to as "deduplication" (also sometimes referred to as "capacity optimization" or "single-instance storage"). Additional structures (described below) keep track of the number of references to the chunk, thus preventing its deletion until the last object referencing the chunk is deleted.

Although the elimination of duplicated blocks and of duplicated data within a block are both considered forms of lossless data compression, different terms are used herein for each in order to distinguish between the two forms of lossless compression. Thus, throughout the remainder of this disclosure the term "deduplication" is used to refer to the elimination of duplicate chunks by storing one instance of a chunk that is referenced by multiple occurrences of the chunk within a virtualized storage device. Further, the term "compression" is used throughout the disclosure to refer to the elimination of duplicate byte sequences within a chunk, and the term "decompression" is used to refer to the reconstruction or regeneration of the original data within a previously "compressed" chunk.

After data has been grouped into chunks, the chunks are generally forwarded to fingerprint and Bloom filters, where a fingerprint is generated to identify each chunk and is applied to the Bloom filter to determine if the chunk has already been stored onto a corresponding storage device. The chunk information is stored in a file that is often referred to as a dictionary, as it defines the various chunks. The information includes the boundaries, fingerprint and Bloom filter lookup results for each new chunk, and the location information for those chunks that already exist.

The same principals can be applied to data being transmitted over a WAN, as deduplication is desirable as it reduces the needed bandwidth of the data. The deduplication units can be provided at each end of the WAN to deflate and inflate the data. However, if multiple deduplication units are used at each end of a WAN connection, this could result in inefficient use of memory as each deduplication unit would have to maintain a full dictionary. As a result, the number of stored chunks would be reduced due to the effectively smaller amount of memory available for the dictionaries.

Thus, what is needed is an efficient method for using the dictionary in a network system without having to maintain a full dictionary for each deduplication engine.

SUMMARY OF INVENTION

In one embodiment, a system and method for managing a network deduplication dictionary is disclosed. According to the method, the dictionary is divided between available deduplication engines (DDE) in deduplication devices that support shared dictionaries. The fingerprints are distributed to different DDEs based on a hash function. The hash function takes the fingerprint and hashes it and based on the hash result, it selects one of the DDEs. The hash function could select a few bits from the fingerprint and use those bits to select a DDE.

BRIEF DESCRIPTION OF THE DRAWINGS

The accompanying drawings, which are incorporated in and constitute a part of this specification, illustrate an implementation of apparatus and methods consistent with the present invention and, together with the detailed description, serve to explain advantages and principles consistent with the invention.

FIG. 15A shows the format of commands transmitted by the pre-encoder control to the encoder of FIGS. 13A and 17A, in accordance with at least some example embodiments;

FIG. 15B shows the format of various literal and match records generated by the encoder of FIGS. 13A and 17A, in accordance with at least some example embodiments;

FIGS. 30A and 30B are block diagrams of the functional blocks of the LDCM appliance of FIG. 26, in accordance with at least some example embodiments;

FIG. 37A-B are block and flow diagrams of a deflate operation with distributed dictionaries according to at least some example embodiments of the present invention; and FIG. 38A-38B are block and flow diagrams of an inflate operation with distributed dictionaries according to at least some example embodiments of the present invention.

DETAILED DESCRIPTION OF THE PREFERRED EMBODIMENTS

Figure 1A:
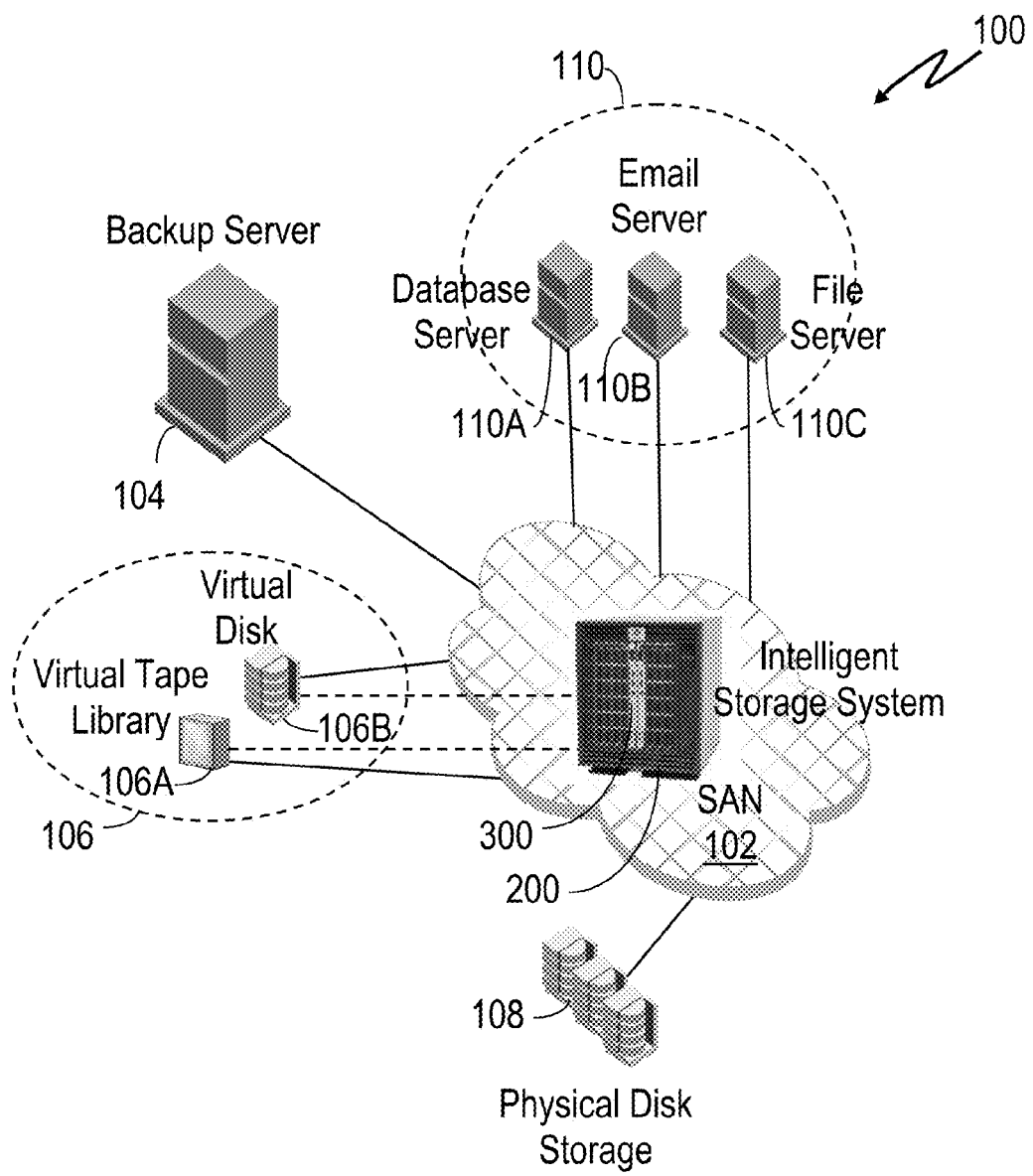
FIG. 1A shows a block diagram of a computer system incorporating lossless data compression implemented as part of director-level switch in accordance with at least some example embodiments.

A block diagram is shown in FIG. 1A that illustrates a computer system 100 incorporating lossless data compression, hierarchal sparse logical block address (LBA) mapping and thin storage provisioning implemented in accordance with at least some example embodiments. An intelligent storage system 200 is shown implemented as a director-level switch that forms storage area network (SAN) 102. SAN 102 interconnects backup server 104, application servers no (database server 110A, email server 110B and file server 110C), and physical disk storage 108. Physical disk storage 108 may be accessed directly by any of the servers shown in FIG. 1A, or may alternatively be accessed indirectly through virtual devices 106 (virtual tape library 106A and virtual disk 106B) presented on SAN 102 by intelligent storage system 200. Virtual devices 106 provide an abstraction layer that isolates the servers 104 and no from physical disk storage device 108. The isolation provided by this abstraction layer allows the actual configuration of physical disk storage 108 to be relatively independent of the configuration required by the servers 104 and no. Thus, for example, while database server 110A may be configured to access a single 128 Gbyte hard disk (seen as virtual disk 106B), the actual configuration of the portion of physical disk storage 108 accessed by intelligent storage system 200 to support virtual disk 106B may be an array of four 128 Gbyte disk drives configured for RAID 4 operation. Similarly, backup server 104 may be configured to access virtual tape library 106A, which may in actuality be implemented using physical disk storage 108. In this example, the use of a disk drive to store the backup data, rather than an actual tape library, is transparent to backup server 104.

Figure 1B:
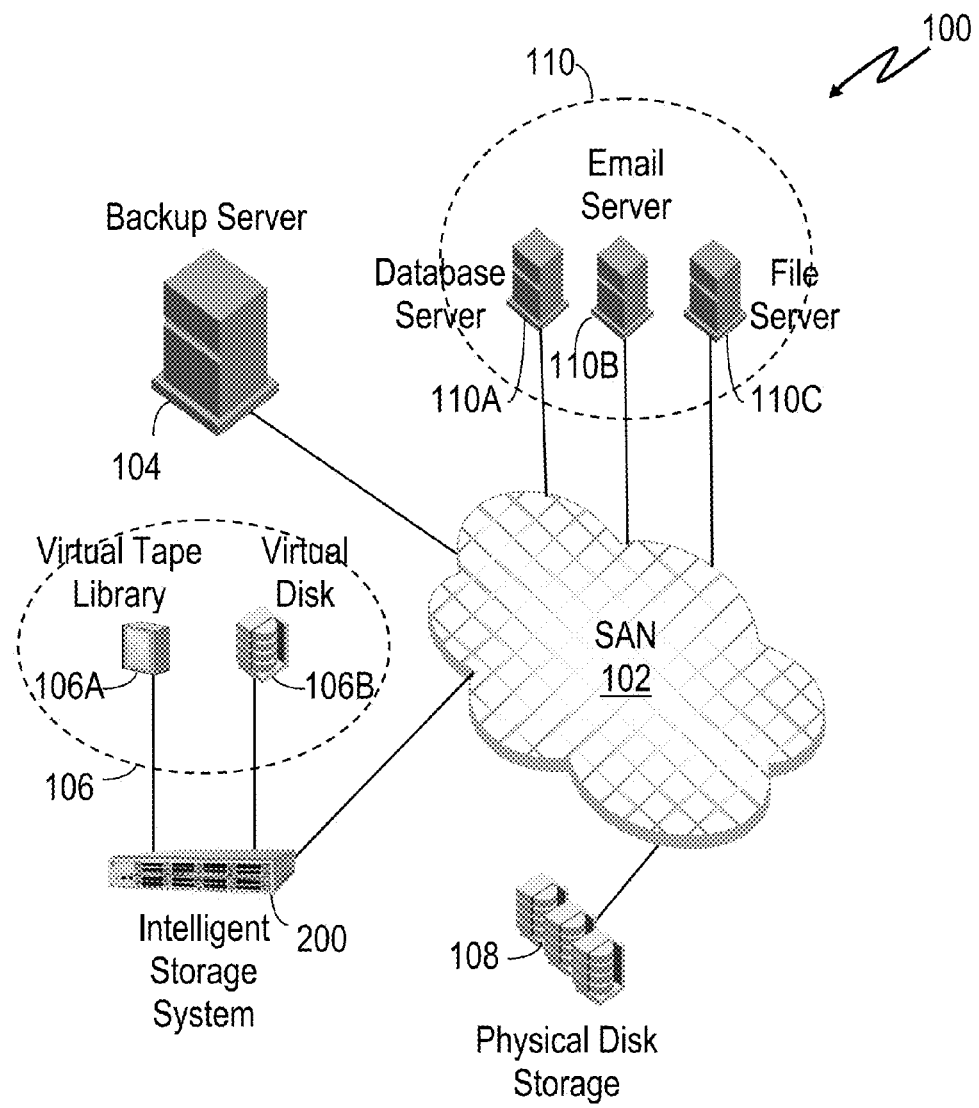
FIG. 1B shows a block diagram of a computer system incorporating lossless data compression implemented as a stand-alone de-duplication system in accordance with at least some example embodiments.

In other example embodiments such as that shown in FIG. 1B, intelligent storage system 200 may be implemented as a stand-alone system that includes the same or similar hardware as the deduplication blade 300 of FIG. 1A. Such an embodiment includes a switch that couples to, and is part of the SAN 102. In all other regards, the intelligent storage system 200 of FIG. 1B operates in the same manner, and provides the same functionality, as the intelligent storage system 200 of FIG. 1A. Although the examples described below are presented within the context of deduplication blade within an intelligent storage system implemented as a director-level storage switch, it is understood that a wide variety of hardware and/or software configurations may be suitable for implementing the data deduplication and/or data compression/decompression functionality described herein, and all such configurations are contemplated by the present disclosure.

In addition to isolating servers from the actual, physical hardware configuration of the storage devices, the abstraction layer created by the device virtualization of intelligent storage system 200 provides a common point in the data flow wherein data being written to or read from physical disk storage 108 may be deduplicated (described below), compressed and decompressed; wherein a variety of different virtual-to-physical LBA mappings can be implemented; and wherein the provisioning of storage space can be controlled and optimized. Because these operations are performed within intelligent storage system 200, such data deduplication, data compression and decompression, LBA mapping, and storage provisioning may be performed in a manner that is transparent to servers 104 and no. Further, these operations are also transparent to physical disk storage 108, which stores the data as received from intelligent storage system 200.

In at least some embodiments, intelligent storage system 200 can implement lossless data compression at two different levels: 1) between blocks of data, wherein duplicate blocks of data are identified and replaced with a pointer to a single copy of the data block saved on the storage system; and 2) within a block of data, wherein duplicate byte sequences within a single block of data are identified and replaced with a pointer to a single copy of the sequence within the data block. As intelligent storage system 200 receives data to be stored on the storage system, the data is grouped into data blocks referred to as "chunks." If all of the data within a chunk is identified as having already been stored onto the storage system, the descriptor of the object being stored is modified to point to the chunk already stored on the storage system, rather than to point to a new chunk that would needlessly store a duplicate copy of an existing chunk. Such elimination of duplicated chunks is referred to as "deduplication" (also sometimes referred to as "capacity optimization" or "single-instance storage"). Additional structures (described below) keep track of the number of references to the chunk, thus preventing its deletion until the last object referencing the chunk is deleted.

Although the elimination of duplicated blocks and of duplicated data within a block are both considered forms of lossless data compression, different terms are used herein for each in order to distinguish between the two forms of lossless compression. Thus, throughout the remainder of this disclosure the term "deduplication" is used to refer to the elimination of duplicate chunks by storing one instance of a chunk that is referenced by multiple occurrences of the chunk within a virtualized storage device. Further, the term "compression" is used throughout the disclosure to refer to the elimination of duplicate byte sequences within a chunk, and the term "decompression" is used to refer to the reconstruction or regeneration of the original data within a previously "compressed" chunk.

Figure 1C:
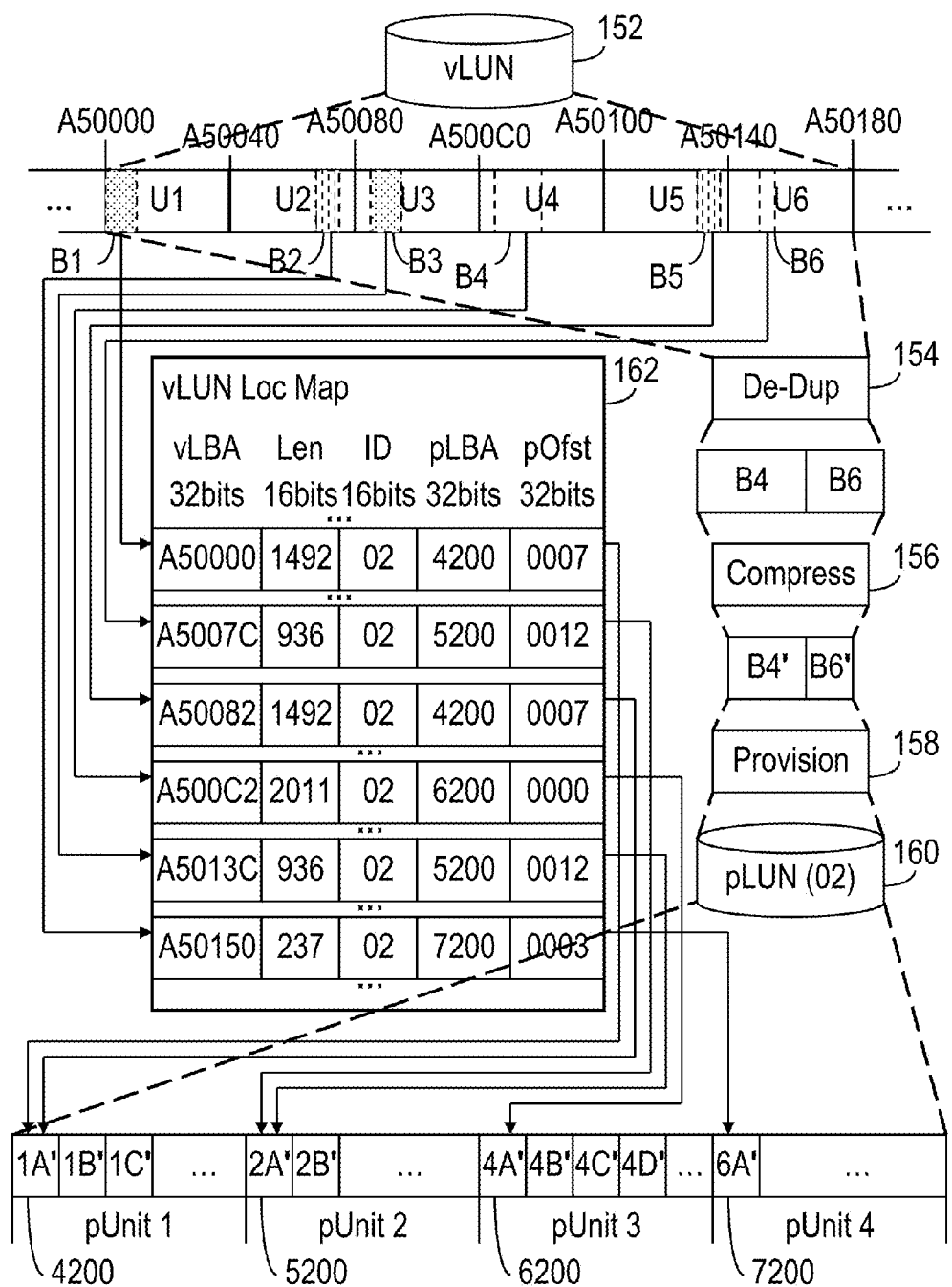
FIG. 1C shows a block diagram that illustrates the operations performed on data that is stored on a physical LUN that is presented on a SAN as a virtual LUN, in accordance with at least some example embodiments.

FIG. 1C shows a block diagram that illustrates an example of how the above-described operations may be performed by intelligent storage system 200 when data is written to a virtual LUN (e.g., vLUN 152), in accordance with at least some embodiments. In the example shown, two virtual LUN data units (U1 and U2 corresponding to pLUN data units pUnit 1 and pUnit 2 respectively) are already allocated on the physical disk, while 4 new data units (U3 through U6) are to be allocated to vLUN 152 (if not already allocated). The existing vLUN data units are assigned vLUN starting LBAs A50000-A5007F, and the new vLUN data units will be assigned vLUN LBAs A50080-A5017F. As indicated by the fill patterns, logical blocks B1 and B3 within data units U1 and U3 contain identical data, as do logical blocks B2 and B5 within data units U2 and U5, respectively. vLUN 152 uses logical blocks or extents that are variable in size, the size of which are each determined by the algorithm that defines the chunks used by deduplication function (De-Dup) 154. Thus, each logical block on the vLUN correlates to a chunk of data stored on backend physical LUN (pLUN) 160.

When the four new vLUN logical blocks are processed by deduplication function 154, blocks B3 and B5 are identified as duplicates and not saved again to the storage device. Instead, vLUN location map (vLUN Loc Map) 162, which maps the vLUN LBAs to the corresponding pLUN LBAs and starting LBA offsets, is updated such that the vLUN location map entry corresponding to vLUN LBA A500082 (block B3) maps to the same pLUN LBAs and starting offset (4200-4202 starting at offset 0007) as vLUN LBA A50000 (block B1). Similarly, the vLUN location map entry for vLUN LBA A5013C (block B5) is updated to map to the same pLUN LBAs and starting offset (5200-5201 starting at offset 0012) as vLUN LBA A5007C (block B2). In at least some embodiments, the vLUN location map is implemented as B+ search tree, wherein the vLUN LBA operates as the key of the tree, and the leaves contain the information necessary to access the data stored on the pLUN. In the example embodiment of FIG. 1C, each location map entry is a B+ tree leaf that includes the vLUN LBA, the size of the data stored on the backend pLUN, the storage identifier of the pLUN and the pLUN LBA of the first logical block where the data is stored on the pLUN.

Because blocks B3 and B5 are duplicates of blocks that have already been stored, only new data blocks B4 and B6 are processed further. Blocks B4 and B6 are compressed by compression function 156 to produce compressed blocks B4' and B6'. Provisioning function (Provision) 158 then allocates two pLUN data units worth of storage space (if not already allocated), one pLUN data unit corresponding to virtual data unit U4 (pUnit 3), and the other corresponding to virtual data unit U6 (pUnit 4). This allocation of fixed amounts of storage space in excess of the amount of space required for the requested transaction, wherein the allocation occurs on a per I/O transaction basis implements thin provisioning of the storage space while producing a hierarchal sparse mapping of the vLUN LBA space to the pLUN LBA space (described in more detail below). The compressed data for each virtual logical block (e.g., B4') is stored within one or more corresponding pLUN data unit logical blocks (e.g., 4A'-4D'). After the new compressed blocks are saved, the vLUN LBA entries within vLUN location map 162 for each of blocks B4 (A500C2) and B6 (A50150) are updated to reflect the backend storage identifier (02). The starting pLUN LBA and offset where the corresponding compressed data units are stored (B4' stored at pLUN LBAs 6200-6203 starting at offset 0000; B6' stored at pLUN LBA 7200 starting at offset 0003) as well as the size of the data stored on the pLUN are saved in the vLUN location map 162.

Figure 2:
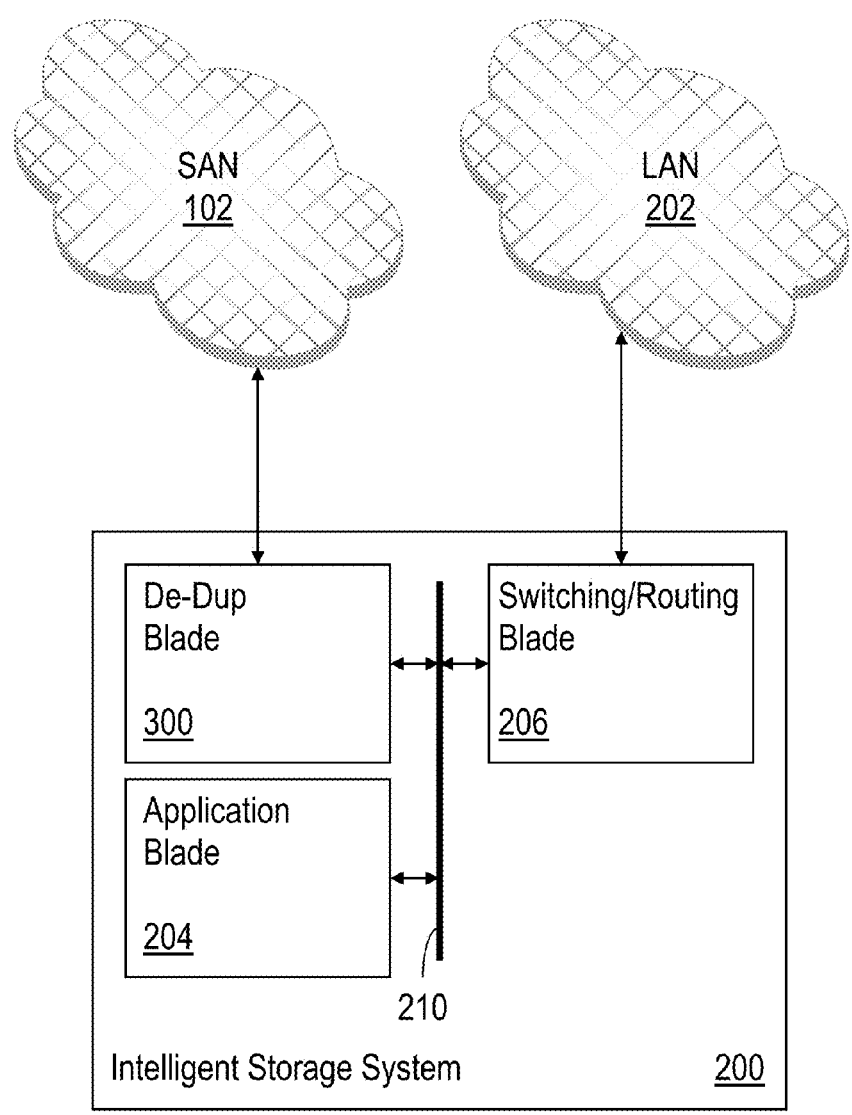
FIG. 2 shows a block diagram of the intelligent storage system shown in FIG. 1A, in accordance with at least some example embodiments.

FIG. 2 shows a block diagram of an intelligent storage system 200 implemented as a director-level switch with a deduplication blade 300 that implements the above-described functions, in accordance with some prior art embodiments. The intelligent storage system 200 includes several blades coupled to each other via backplane bus 210, wherein each blade provides a different function within intelligent storage system 200 and can exchange data with the other blades through the backplane. For example, switching/routing blade 206 provides connectivity between SAN 102 and other networks (e.g., LAN 202), and application blade 204 provides the ability to execute specialized software applications to facilitate the operation and management of SAN 102 and the devices coupled to the SAN (e.g., the Brocade Data Migration Manager software by Brocade Communications Systems, Inc.). Deduplication (De-Dup) blade 300 implements the storage virtualization, data deduplication, data compression and decompression, LBA mapping, and storage allocation performed by intelligent storage system 200.

Figure 3:
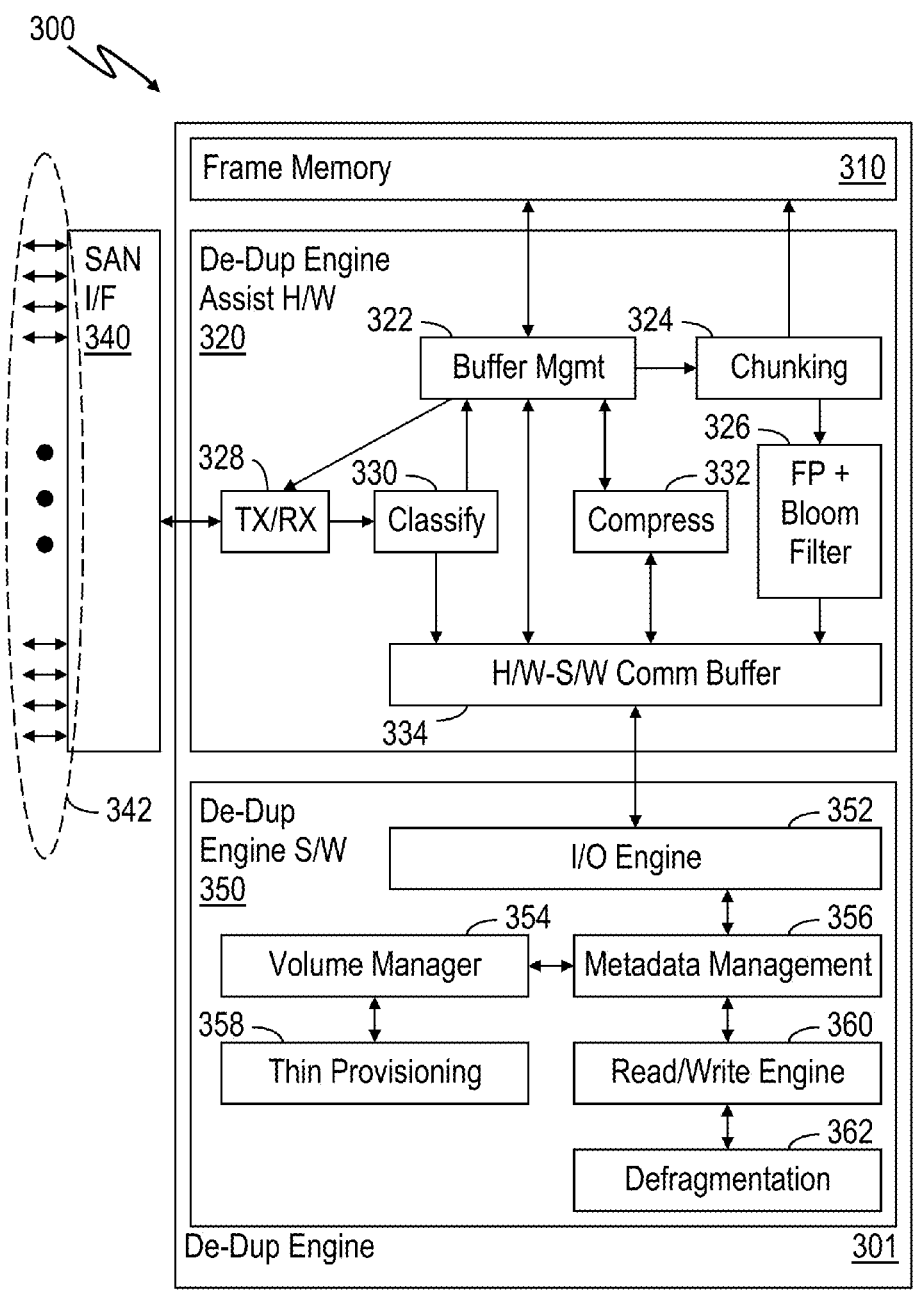
FIG. 3 shows a hardware and software functional block diagram of deduplication blade 300 of FIG. 2, in accordance with at least some example embodiments.

FIG. 3 shows a simplified functional block diagram of deduplication blade 300 that illustrates the functional division between deduplication blade assist hardware (De-Dup Engine Assist H/W) 320, deduplication blade software (De-Dupe Engine S/W) 350 and frame data memory (Frame Memory) 310 of deduplication engine (De-Dup Engine) 301 and storage area network interface (SAN I/F) 340. Deduplication engine assist hardware includes transmit/receive logic (TX/RX) 328, classification logic (Classify) 330, buffer management logic (Buffer Mgmt) 322, data compression engine (Compress) 332, chunk generation logic (Chunking) 324, fingerprint and Bloom filter logic (FP & Bloom Filter) 326 and hardware-software communication buffer (H/W-S/W Comm Buffer) 334. Deduplication engine software 350 includes input/output engine (I/O Engine) 352, volume manager 354, metadata management module 356, thin provisioning module 358, read/write engine 360 and defragmentation module 362.

SAN interface 340 couples to transmit/receive logic 328 and includes multiple ports 342 that couple to a SAN (e.g., Fibre Channel ports that couple to SAN 102 of FIG. 2). Transmit/receive logic 328 couples to classification logic 330 and buffer management logic 322, forwarding incoming messages received from SAN interface 340 to classification logic 330 and transferring outgoing messages to SAN interface 340 from frame data memory 310 (via buffer management logic 322, which couples to frame data memory 310). Classification logic 330 couples to buffer management logic 322 and hardware-software communication buffer 334, forwarding the headers of messages received from transmit/receive logic 328 to deduplication engine software 350, and forwarding complete messages (header and data) received from transmit/receive logic 328 to frame data memory 310 (via buffer management logic 322).

Buffer management logic 322, in addition to coupling to transmit/receive logic 328, classification logic 330 and frame data memory 310, also couples to hardware-software communication buffer 334 and data compression engine 332. Buffer management logic 322 sets up and manages frame buffers within frame data memory 310, and routes data between the frame data buffers and the other hardware components to which buffer management logic 322 couples. Hardware-software communication buffer 334, in addition to coupling to buffer management logic 322 and classification logic 330, also couples to data compression engine 332 and fingerprint and Bloom filter logic 326. Hardware-software communication buffer 334 routes messages between deduplication engine software 350 and the various hardware components to which hardware-software communication buffer 334 couples.

Chunk generation logic 324 couples to buffer management logic 322, frame data memory 310 and fingerprint and Bloom filter logic 326. Data to be deduplicated before being written to a storage device is forwarded to chunk generation logic 324 where it is subdivided into variable length blocks or chunks. The chunks are forwarded to fingerprint and Bloom filter logic 326, where a fingerprint is generated to identify each chunk and is applied to the Bloom filter to determine if the chunk has already been stored onto a corresponding storage device. A Bloom filter is a space-efficient probabilistic data structure that is used to determine whether an element is a member of a set. The chunk information generated by the bloom filter logic 326 is stored in a file that is often referred to as a dictionary, as it defines the various chunks. Fingerprint and Bloom filter logic 326 forwards the resulting list of chunk information to deduplication engine software 350 (via hardware-software communication buffer 334). The forwarded list includes the boundaries, fingerprint and Bloom filter lookup results for each new chunk, and the location information for those chunks that already exist. The data is then forwarded by chunk generation logic 324 to data compression engine 332 and the resulting compressed data is stored in frame buffers within frame data memory. Those chunks within frame data memory 310 that are identified by deduplication engine software 350 as new (i.e., not yet stored on the storage device being accessed) are saved onto the storage device, while those that are identified as already on the system are discarded.

Data compression engine 332 provides compression for data being written to a storage device (if compression is enabled), and data decompression for compressed data being read from a storage device. Both the input and output data for both compression and decompression operations is maintained in frame buffers within frame data memory 310, and control and status messages are exchanged between data compression engine 332 and deduplication engine software 350 through hardware-software communication buffer 334.

Continuing to refer to the example embodiment illustrated in FIG. 3, I/O engine 352 operates as the software interface to deduplication engine assist hardware 320, receiving message from and transmitting messages to the various components of deduplication engine assist hardware 320. I/O engine 352 communicates with metadata management module 356, which maintains all metadata associated with the data stored on the storage devices controlled and managed by deduplication engine 301. Metadata management module 356 communicates with volume manager 354 and read/write engine 360. Volume manager 354 maintains all information associated with maintaining and accessing the virtual storage devices that are presented on a storage area network by the deduplication engine (e.g., virtual device type, virtual device capacity, RAID configuration and user access lists and permissions). Read/write engine 360 operates as an abstraction layer that isolates the specific configuration of the physical drives from the other software modules, which operate on a LUN representing a physical drive or a portion of a physical drive (referenced in the present application as a physical LUN or pLUN), rather than on the physical devices directly. Thus details such as, for example, the size, organization and interface type of the physical drives are hidden by read/write engine 360 from the hardware and most of the software within deduplication engine 301.

Read/write engine 360 also communicates with defragmentation module 362, which operates to reallocate the data and corresponding metadata that has become de-localized such that each is more localized for a given file or set of related files. Volume manager 354 communicates with thin provisioning module 362, which maintains and controls how logical blocks on the pLUN are allocated and how the virtual LUN (vLUN) logical blocks map to the physical LUN blocks.

As already noted, the storage virtualization implemented by deduplication engine 301 provides an abstraction layer that operates to hide the type, structure and size of the physical storage devices actually used to store the data, and to hide many of the data manipulation operations that improve the overall performance and efficiency of intelligent storage system 200, such as data deduplication, data compression and decompression, hierarchal sparse mapping and thin provisioning. This abstraction layer is implemented at least in part through the use of the vLUN location map previously described and shown in FIG. 1C (vLUN Loc Map 162). The vLUN location map operates to associate vLUN logical blocks with one or more pLUN logical blocks by using the vLUN logical block address as an entry index into the vLUN location map. Each entry corresponds to the vLUN LBA matching the index value for the entry. An entry includes the pLUN LBA and offset for the first pLUN logical block corresponding to the vLUN logical block. The entry thus operates as a pointer to one or more pLUN LBAs, allowing any given vLUN LBA to be mapped to any pLUN logical block (or set of logical blocks) within the logical block address space of the pLUN.

Figure 4:
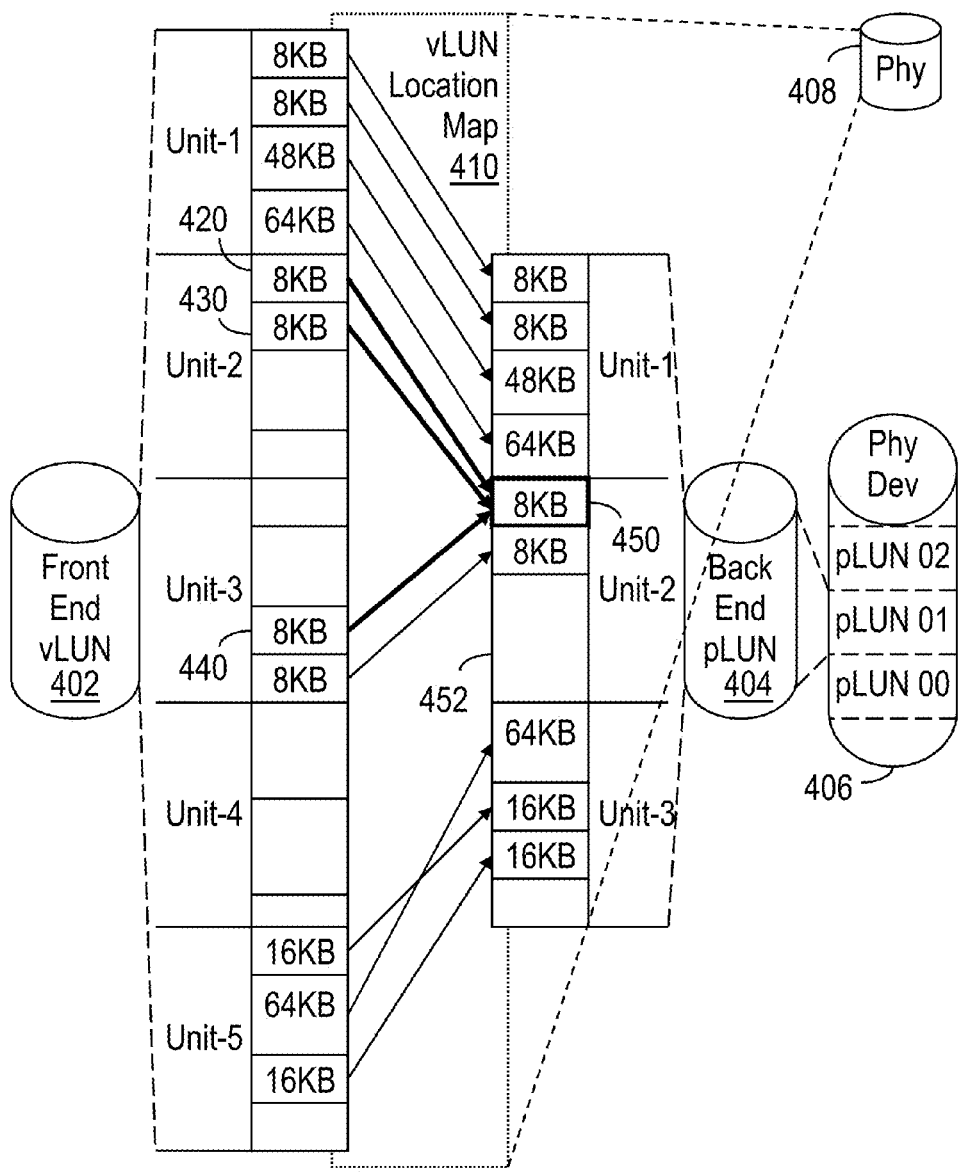
FIG. 4 shows an example of thin provisioning using hierarchal sparse mapping between front-end virtual LUN and back-end physical LUN logical block address spaces, in accordance with at least some embodiments.

The use of the above-described vLUN location map enables deduplication engine 301 to appear to allocate space to the vLUN, while actually delaying the allocation of physical disk space on the pLUN until it is actually needed at the time of the I/O writes the data to disk. The vLUN location map also enables deduplication engine 301 to implement sparse mapping of the vLUN LBA space, wherein data on the vLUN is spaced out within the vLUN LBA space, but more closely grouped within the pLUN LBA space. For example, as shown in FIG. 4, data is spread out within the address space of front end vLUN 402, with the data within vLUN Unit-1 and Unit-2 spaced out from the data within vLUN Unit-3, and the data within vLUN Unit-3 spaced out from the data within vLUN Unit-5. vLUN Unit-2 and Unit-3 contain very little data, with Unit-2 containing data at the upper end of the address space within the unit, and Unit-3 containing data at the lower end of the address space. vLUN Unit-4 contains no data at all, even though it is shown as allocated space within vLUN 402. When the storage space is actually allocated on pLUN 404, Unit-1 of vLUN 402 is mapped to Unit-1 on pLUN 404, vLUN Unit-3 is mapped to pLUN Unit-2, and vLUN Unit-5 is mapped to pLUN Unit-3. Because vLUN Unit-4 does not include any data, vLUN Unit-4 is not mapped when allocated, and no space is allocated for this unit on pLUN 404.

The mapping of vLUN 402 to pLUN 404 is provided using vLUN location map 410, which is stored on physical storage device 408 but which in at least some embodiments is also maintained in volatile storage (e.g., RAM) for faster access (as described below). Depending upon its size, a copy of the vLUN location map may be stored in memory in its entirety, or only portions of the map may be stored in volatile storage as needed (e.g., cached in high performance SDRAM). pLUN 404 may represent a portion of the total space available on a physical drive, as shown in the example embodiment of FIG. 4, or my represent all of the space available on a physical drive (i.e., the physical drive includes only one LUN).

By allocating the space on pLUN 404 on an as-needed basis, a form of thin provisioning is implemented by deduplication engine 301. However, the thin provisioning implemented in accordance with at least some embodiments allocates storage units of a fixed size (i.e., the pLUN data units shown in FIG. 4), allowing for the allocation of pLUN storage space in excess of what is required by the corresponding vLUN unit (e.g., spare space 452 within pLUN Unit-2 of FIG. 4). As is described in more detail below, the hierarchal structure implemented in the pages, sub-pages and blocks within each unit also provides for additional space in excess of what is required by the data being stored, allowing for variations in the size of a stored chunk (e.g., due to data changes that change the size of a compressed chunk, or due to the addition of data) without necessarily having to allocate additional storage, or to re-allocate new storage for the modified data.

Figure 5A:
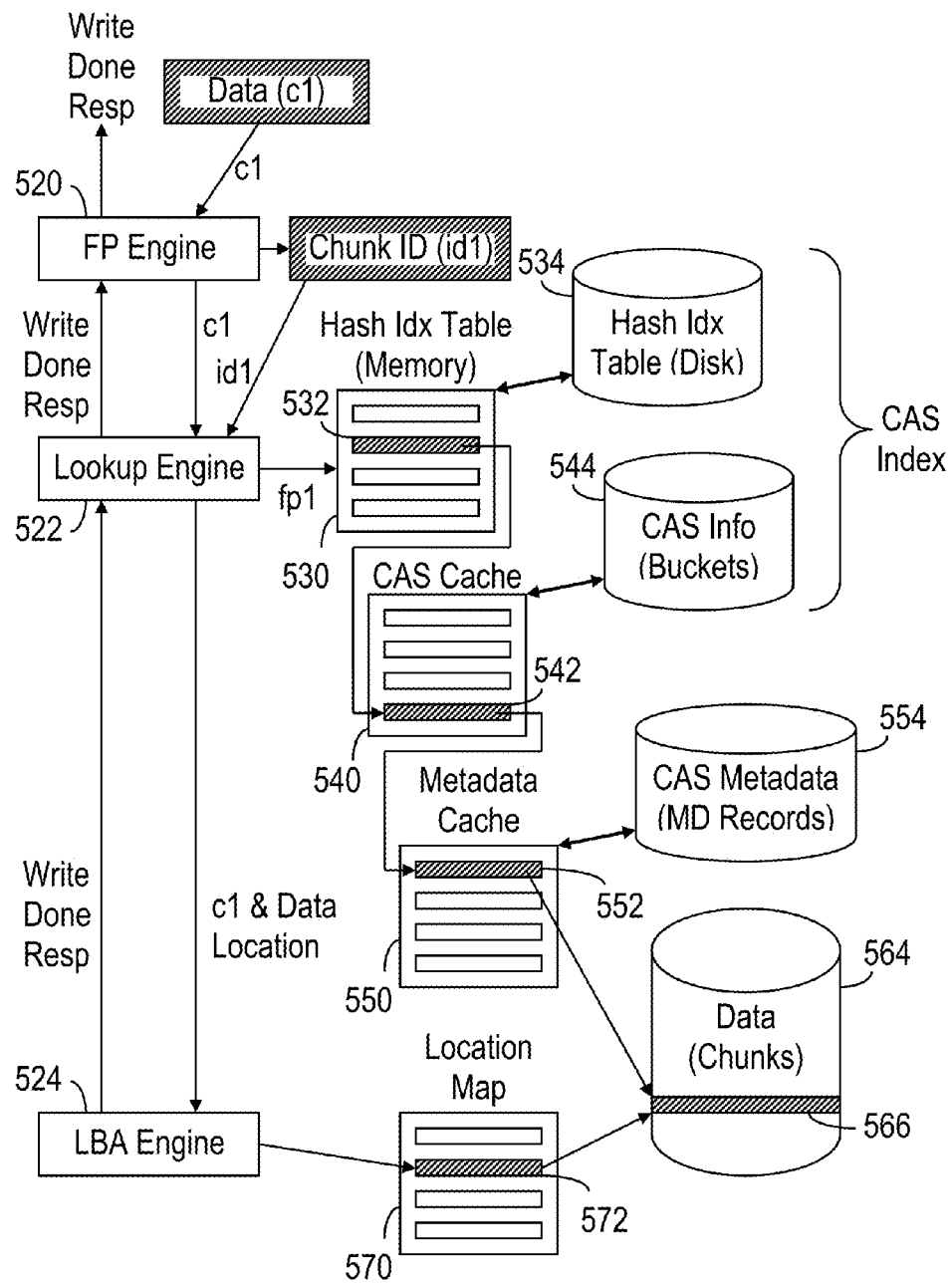
FIG. 5A shows a functional block diagram of a data write and deduplication of a chunk performed by deduplication engine 301 of FIG. 3, in accordance with at least some example embodiments.
Figure 5B:
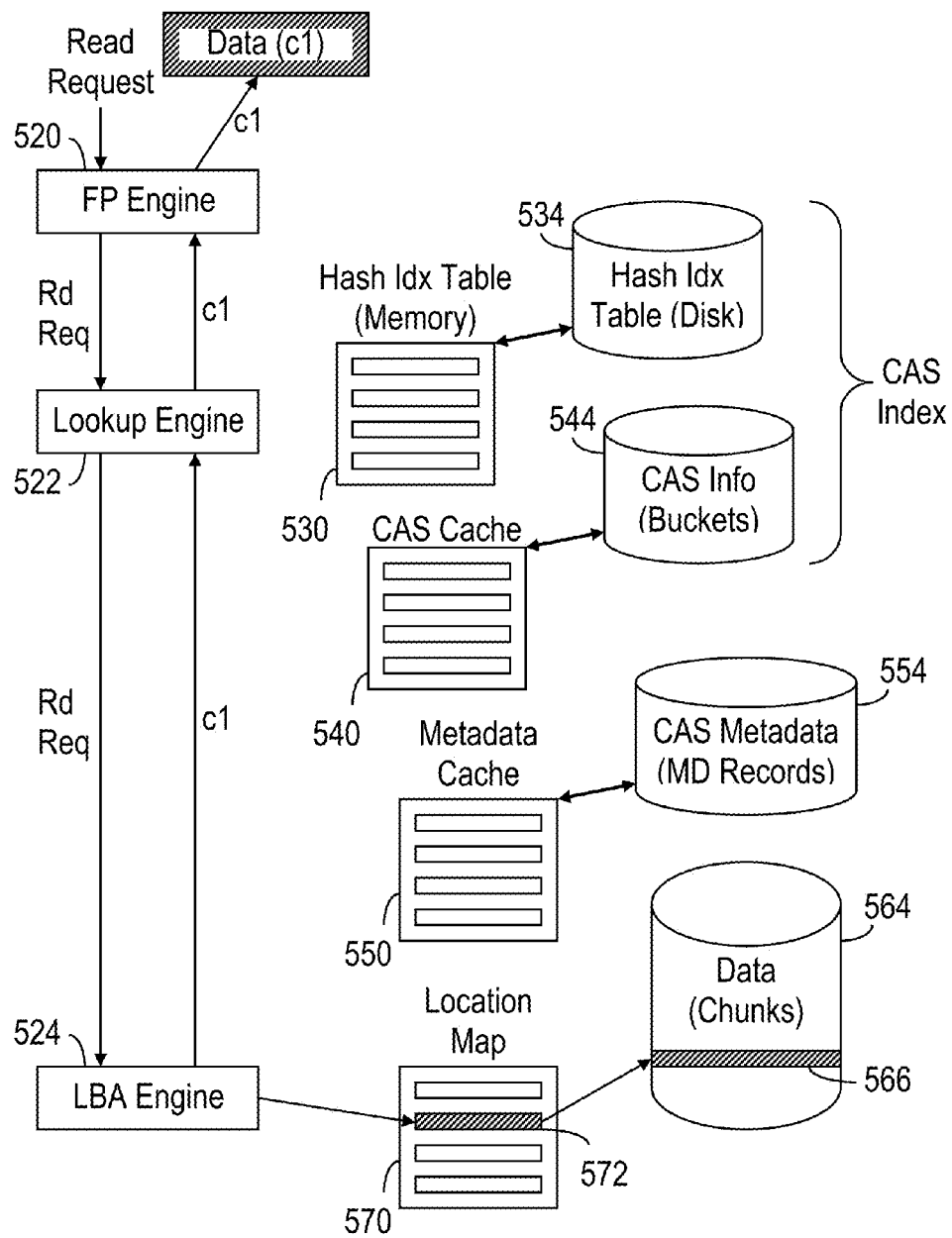
FIG. 5B shows a functional diagram of a data read of a deduplicated chunk performed by deduplication engine 301 of FIG. 3, in accordance with at least some example embodiments.

In addition to enabling the thin provisioning described above, vLUN location map 410 also provides a mechanism for implementing chunk deduplication by mapping multiple vLUN blocks (i.e., chunks) to a single pLUN block. For example, as shown in FIG. 4, two data chunks within vLUN Unit-2 are deduplicated and mapped to the same block(s) within pLUN Unit-2, i.e., vLUN data chunks 420 and 430 of Unit-2 and vLUN data chunk 440 of Unit-3 all contain identical data and are deduplicated by mapping all three vLUN data blocks to the same single pLUN data block(s) 450 of pLUN Unit-2. FIGS. 5A and 5B depict functional block diagrams illustrating in more detail how deduplicated chunks are written to, as well as read from, the storage device virtualized by deduplication engine 301, in accordance with at least some embodiments.

Referring first to FIG. 5A, a chunk is presented as Data C1 to Fingerprint engine 520, which uses data C1 to generate a chunk identifier Chunk ID (id1) that is unique to data C1. Both data c1 and identifier id1 are forwarded to lookup engine 522 to determine whether chunk c1 is a duplicate of a chunk already stored on physical LUN 564. Lookup engine 522 uses at least part of identifier id1 (e.g., part of fingerprint signature fp1, described further below) as an index into memory-resident hash index table 530, which is kept in synchronization with a disk-resident copy of the hash index table maintained on storage device 534. If the chunk already exists on physical LUN 564, a valid entry will exist within hash index table 530 at the indexed location. Each valid table entry (e.g., table entry 532) in hash index table 530 points to a block in content addressable storage (CAS) cache 540 (e.g., block 542), which maintains a cached subset of the CAS information stored on storage device 544. Each block in CAS cache 540 (referred to as "bucket blocks") includes one or more bucket block entries that are each used to uniquely identify a full fingerprint signature (e.g., fingerprint signature fp1) associated with an entry. The combination of a valid hash index table entry and an associated CAS bucket block entry together operate as a CAS index that uniquely identifies a chunk stored on physical LUN 564.

Each CAS bucket block entry also includes a pointer to a metadata record in metadata cache 550 (e.g., metadata record 552), which in turn includes a pointer to the location on physical LUN 564 (e.g., logical block 566) where a corresponding chunk is stored. For an existing chunk identified by lookup engine 522, this data location information is retrieved and forwarded to logical block address (LBA) engine 524. LBA engine 524 updates vLUN location map 570 with data location information so that entry 572 maps its corresponding virtual LUN logical block address (associated with data c1) to the physical LUN logical block address and starting offset of the data already stored in logical block 566 of physical LUN 564. vLUN location map 570 is maintained both on disk (not shown) and in memory (either fully, or partially as a location map cache), and maps the logical block addresses of a vLUN to corresponding logical block addresses and offsets on a pLUN where the data is actually stored (e.g., logical block 566). The virtual LUN logical block address is used as an index into vLUN location map 570, as previously described. Upon completion of the update to vLUN location map 570, LBA Engine 524 issues a write done response that indicates completion of the write operation, which is forwarded back to the requestor by lookup engine 522 and fingerprint engine 520.

If lookup engine 522 determines that data c1 is not already saved to physical LUN 564, the data structures within the Hash Index Table 530, CAS Cache 540 and Metadata Cache 550 (as well as their disk-resident counterparts on storage devices 534, 544 and 554) are updated to include new entries for data c1. Data c1 is stored on physical LUN 564 by LBA engine 524. The virtual LUN logical block address for data c1 is used by LBA engine 524 to update vLUN location map 570 such that entry 572 (corresponding to data c1) points to the logical block(s) on pLUN 564 where the chunk is actually stored. Upon completion of the update to vLUN 570, LBA Engine 524 issues a write done response that indicates completion of the write operation, which is again forwarded back to the requestor by lookup engine 522 and fingerprint engine 520.

Referring now to the example embodiment of FIG. 5B, a read request for data stored on the storage system is received by fingerprint engine 520 and forwarded to lookup engine 522, which in turn forwards the request to LBA engine 524. In this case, neither fingerprint engine 520 nor look up engine 522 access any of the structures and/or related storage devices needed for the previously described write operation. LBA engine 524 simply accesses the chunk requested by reading logical block 566 on physical LUN 564, which is pointed to by entry 572 of vLUN location map 570 (the entry corresponding to the virtual LUN logical block address provided in the read request). No additional processing related to chunk deduplication is required to read the requested chunk. Data c1 (read by LBA engine 524) is transferred to lookup engine 522, which in turn forwards the data to fingerprint engine 520 for delivery to the requestor, completing the read operation.

As shown in FIGS. 5A and 5B, much of the data referenced either directly or indirectly by lookup engine 522 is cached in memory for faster access to the desired information. Faster access is achieved, at least in part, because of the higher operational speed of memory devices (e.g., random access memories or RAMs) as compared to disk drives. However, because cache memories only store a subset of the information stored on disk, much of the performance gain achieved through the use of cache memory may be diminished whenever new information not currently in the cache is accessed (i.e., a cache "miss"). To mitigate the impact of cache misses and increase the probability that the desired data is already stored in the cache memory (i.e., to increase the probability of cache "hits"), at least some embodiments take advantage of how stored data units tend to be clustered, both hierarchically (i.e., based upon how data units are logically grouped together) and temporally (i.e., based upon the order in which data units are accessed). By storing data units in close physical proximity to each other that are related to each other by either a hierarchal grouping (e.g., data units that form a file) or by contemporaneous access (e.g., files within a single directory sequentially accessed by a backup application), much (if not all) of the data required for a given series of related operations may be read into cache memory using fewer disk read operations, since the disk block(s) accessed and stored in cache memory contains interrelated data.

Figure 6:
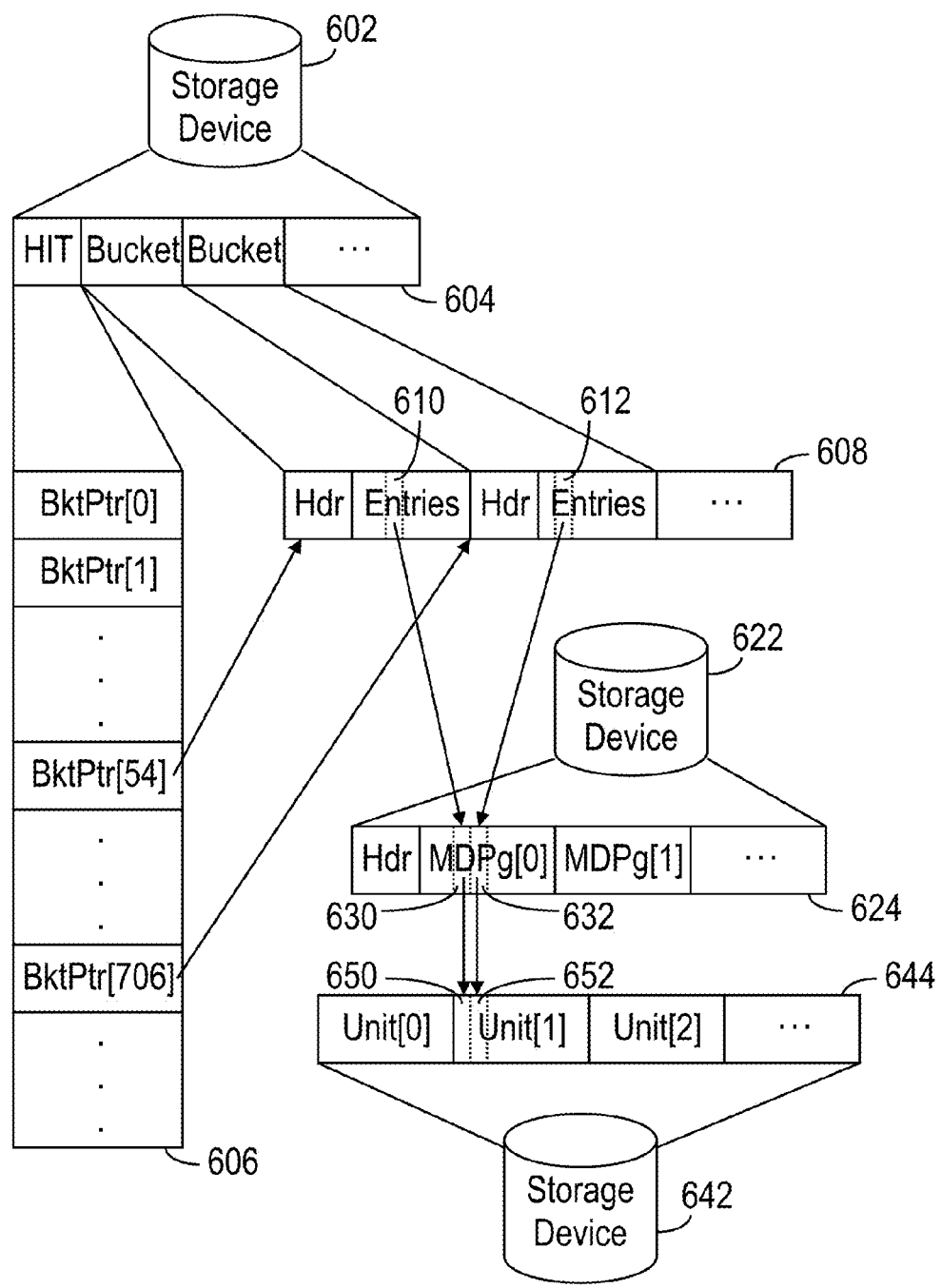
FIG. 6 illustrates the clustering of related metadata and data stored within the deduplication engine 301 of FIG. 3, in accordance with at least some example embodiments.

FIG. 6 shows an example of how the buckets, metadata records and chunks of related data are clustered together on their respective storage devices, in accordance with at least some example embodiments. CAS index 604, which includes hash index table 606 and bucket blocks 608 (each bucket block corresponding to an individual hash index table entry), is maintained on storage device 602. Because only part of the signature fingerprint of a chunk of data is used as an index into the hash index table, each hash index table entry may map to more than one stored chunk, and thus each bucket block includes multiple bucket block entries. Each hash index table entry includes a pointer to a bucket block, which allows related hash index table entries to reference bucket blocks that are close or even adjacent to each other, regardless of the location of the hash index table entry within the table. Thus, for example, even though BktPtr[54] and BktPtr [706] of FIG. 6 are stored at non-adjacent locations within hash index table 606, each pointer is configured to reference adjacent bucket blocks that include entries 610 (corresponding to BktPtr [54]) and 612 (corresponding to BktPtr[706]). If the amount of data read during a CAS Index disk I/O is large enough to encompass multiple bucket blocks (e.g., 512 Kbyes encompassing 2,048, 256 byte memory-resident bucket blocks), accessing the bucket corresponding to BktPtr[54] will not only cause the bucket block containing entry 610 (corresponding to BktPtr[54]) to be read, but also the bucket block containing entry 612 (corresponding to BktPtr[706]) (as well as a number of other bucket blocks). The storage of BktPtr[54] and BktPtr[706] within CAS cache 540 of FIG. 5A precludes the need for additional reads of the bucket entries from disk each time the information within the entries must be accessed, until such time as they are purged from the CAS cache.

Each bucket entry similarly includes a pointer to a CAS metadata record that is part of CAS metadata 624. CAS metadata 624 is stored on storage device 622 and subdivided into metadata pages, each including a collection of metadata records. As with the bucket blocks, related metadata entries are stored together within a metadata page. Thus, when the metadata page that includes metadata record 630 (corresponding to bucket block entry 610 and BktPtr[54]) is read from storage device 622 into metadata cache 540 of FIG. 5A, related metadata record 632 (corresponding to bucket block entry 612 and BktPtr[706]) is also read and thus available within the metadata cache. As with the bucket blocks, subsequent accesses to metadata records 630 and 632 may be made without additional I/O operations on storage device 622 until the metadata records are purged from the metadata cache.

Each metadata record points to a chunk of data 644 stored on storage device 642. In at least some example embodiments, the chunks (like their corresponding metadata records) are grouped together in units that include chunks containing related data. Thus when the unit that includes chunk 650 (corresponding to metadata record 630, bucket block entry 610 and BktPtr[54]) is read, related chunk 652 is also read and made available within a chunk cache (not shown). As with the bucket blocks and metadata records, subsequent accesses to chunks 650 and 652 may be made without additional I/O operations on storage device 642 until the chunks are purged from the chunk cache.

By clustering related bucket blocks, metadata records and chunks on their respective storage devices as described above, cache misses are reduced across all caches for interrelated data. Thus, for example, if a file stored on the storage system of FIG. 6 is saved as chunks 650 and 652, after the initial read of chunk 650, metadata record 630 and bucket block entry 610, no additional disk reads are required to access the data within the file (until at least one of the caches is purged of an entry related to the file or a write operations is performed), since all of the data associated with the file is already in cache memory after the initial access to chunk 650. Further, only three storage device I/O operations were required (one for each of storage devices 602, 622 and 642), even though six individual pieces of information were initially required. Additional access to the file as it is operated upon by an application may also be performed on the file without additional I/O operations, as long as the file is not modified. When a modification is made, the corresponding changes from cache to disk may require as little as two I/O operations (a single write of the chunk to storage device 642 and a single write of the chunk metadata to storage device 622), as will be explained in more detail below.

If a chunk is identified as a new chunk that will be saved onto the storage system (i.e., not deduplicated), deduplication engine 301 will attempt to compress the chunk before it is saved. The chunk is scanned for duplicate sequences of bytes within the chunk, and if a duplicate data sequence is identified it is replaced with a code word that includes a pointer to a location within the chunk where the sequence previously occurred. Because the number of bytes of the code word is less than the number of bytes in the identified duplicate sequence, the overall amount of data within the modified sequence of the chunk is reduced, and thus less device storage space is required to save the chunk onto the storage system. Also, less bandwidth is required to transmit the compressed data over the SAN to the storage device.

Figure 7A:
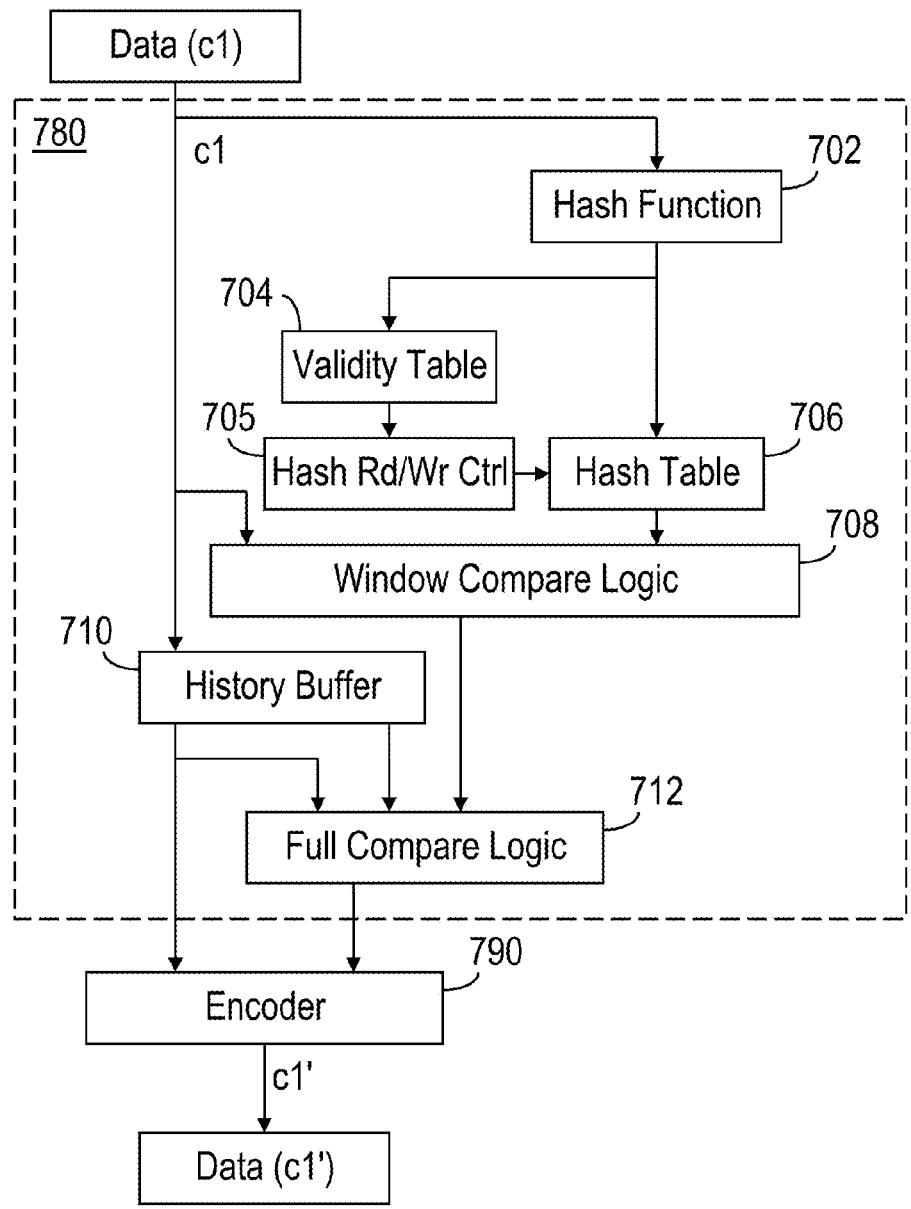
FIG. 7A shows a functional block diagram of a data write and compression of the data within a chunk performed by deduplication engine 301 of FIG. 3, in accordance with at least some example embodiments.

FIG. 7A depicts a functional block diagram illustrating in more detail how data within a chunk is compressed prior to storage on the storage system, in accordance with at least some example embodiments. Chunk data bytes are provided as data c1 to hash function 702 within sequence detector 780. Hash function 702 generates a hash code over a moving window of a predetermined size (e.g., 3 bytes). The resulting hash code is used to index into both a validity table 704 and a hash table 706. Both the validity and hash tables are divided into lanes (not shown) that each corresponds to a byte position within a grouping of bytes, each within a separate moving window. As is explained in more detail below, the subdivision of the incoming data stream into lanes facilitates the processing of multiple bytes in parallel as part of the compression of the incoming data.

Validity table 704 provide an indication as to whether a valid hash table entry exists for the byte sequence currently within the moving window, and in which of the data lanes the sequence may be valid. If a valid entry exists in the hash table, then the sequence may have previously occurred in the corresponding lane(s) within the chunk. The validity bits are decoded by hash read/write control (Hash Rd/Wr Ctrl) 705, and used to determine which hash table entries are read, and the lanes from which they are read. In at least some embodiments, the hash code is smaller than the window size, thus resulting in a one-to-many mapping of the hash code to multiple data sequences. The valid entries within hash table 706 corresponding to the hash code each stores sufficient bits of a corresponding previous data sequence occurrence to uniquely identify the data sequence. These bits are compared by window data compare logic 708 to the corresponding data bits of the chunk within the moving window. If a matching sequence is identified, window data compare logic 708 enables full compare logic 712 to continue comparing subsequent received chunk bytes with previously received bytes (saved in history buffer 710), until a byte mismatch is encountered.

Whenever matching bytes are identified, encoder 790 generates a "match" record, which includes a pointer to the matching sequence in the form of an offset from the current chunk location to the location within the chunk of the beginning of the matching sequence. In at least some example embodiments, a pointer to the location in the incoming data stream where the data sequence previously occurred is also stored within hash table 706. In other example embodiments the sequence location pointer is stored within validity table 704. For byte sequences that do not match, encoder 790 generates a "literal" record, which includes the non-matching bytes. When all data within the chunk has been processed, an EOF record is generated and saved to the storage system to indicate the end of the data within the chunk. Encoder 790 outputs these records as they are generated for storage onto the storage system as a new chunk with data c1', which is a collection of literal records, match records, or a combination of both types of records, as well as a single EOF record.

Figure 7B:
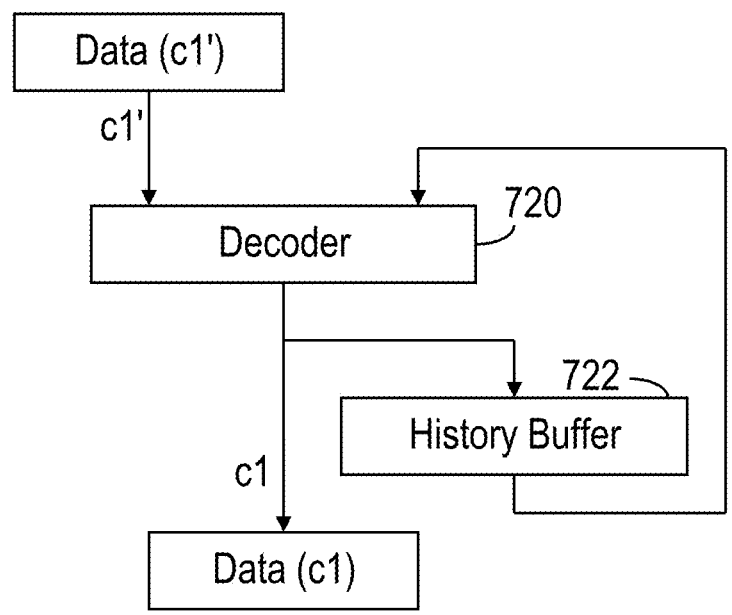
FIG. 7B shows a functional block diagram of a data read and reconstruction of the compressed data within a chunk performed by deduplication engine 301 of FIG. 3, in accordance with at least some example embodiments.

FIG. 7B depicts a functional block diagram illustrating how compressed data that is read from the storage system is reconstructed upon retrieval, in accordance with at least some example embodiments. A chunk with data c1 is read from the storage system and presented to decoder 720. Decoder 720 identifies and processes records within the chunk, parsing out both literal records and match records. When a literal record is identified by decoder 720, the literal bytes stored within the record are extracted and forwarded for transmission as part of data c1 of the requested chunk and for storage within history buffer 722. When a match record is identified, decoder 720 uses the offset pointer within the record to index back to the location within history buffer 722 where the previous occurrence of the matched sequence is stored, reads the identified sequence from the location, outputs the bytes of the sequence as part of data c1 of the requested chunk, and saves the output bytes to history buffer 722. Data is decoded and output in this manner until an EOF record is read, which indicates the end of data c1' of the chunk being read. No part of the EOF record is output as part of data c1.

Although the above-described compression of data within a chunk is performed in conjunction with the deduplication of data chunks stored within the storage system of the embodiments described, those of ordinary skill will recognize that each of these two operations may be selectively performed either together as described or separately. Thus, for example, data that does not necessarily lend itself to efficient chunk compression but does lend itself to very efficient chunk deduplication (e.g., back up data) may be stored as deduplicated data that is not compressed. Similarly, data that does not necessarily lend itself to efficient chunk deduplication but does lend itself to very efficient chunk compression (e.g., semi structured data such as Microsoft® Exchange data) may be stored as compressed data that is not deduplicated.

Although the system described thus far is depicted as implementing thin provisioning, data deduplication, and data compression and decompression, each of these may be implemented without the need for the other. Those of ordinary skill in the art will thus recognize that other example embodiments may include the capability for data deduplication, data compression/decompression, and thin provisioning either alone or in any combination, or all together with the ability to independently enable and/or disable each function, and all such combinations, capabilities and abilities are contemplated by the present disclosure.

Functional Details: Hierarchal Sparse Mapping and Thin Provisioning

As previously described, in at least some example embodiments the front-end vLUN (e.g., vLUN 402 of FIG. 4) is segmented into virtual "units" of a predetermined size, and data stored in the units is spread out over the available virtual address space (i.e., sparsely mapped). A corresponding physical unit is allocated on the back-end pLUN when data is actually written to the physical disk (i.e., using thin provisioning). The sizes of both the physical and virtual units are set when the intelligent storage system is initially configured. In at least some example embodiments, the virtual and physical unit sizes are set so as to align with the physical disk skew, thus reducing or in some cases eliminating head movement during a seek performed by a physical disk.

Figure 8:
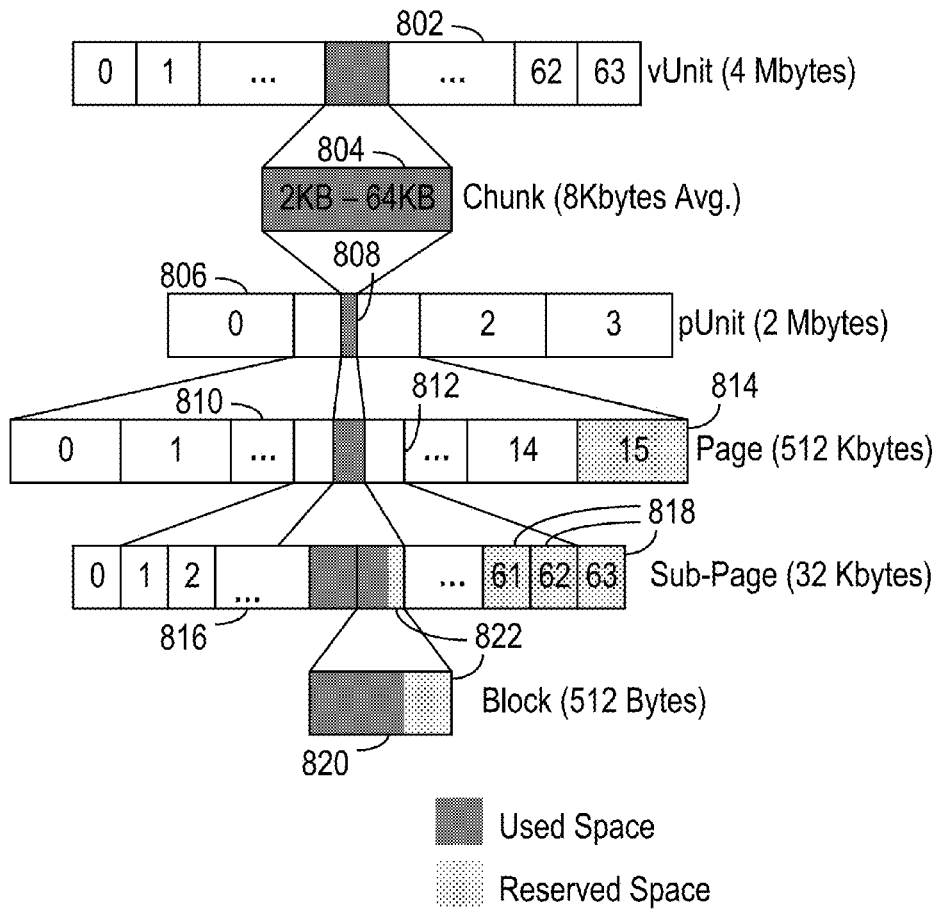
FIG. 8 illustrates the internal hierarchy of a physical LUN unit used to implement hierarchal sparse mapping and thin provisioning, in accordance with at least some example embodiments.

FIG. 8 show the internal hierarchy of a physical unit used to implement hierarchal sparse mapping and thin provisioning in at least some embodiments. In the example shown, each physical unit includes a fixed number of 512-Kbyte pages. The number of pages per physical unit depends upon the size of the virtual unit, and the average level of data compression expected for the system. Thus, as shown in the example of FIG. 8, if the size of virtual unit (vUnit) 802 is set to 4 Mbytes, and an overall average compression ratio of 2:1 is anticipated for the system (using deduplication, data compression, or both), then four, 512-Kbyte pages of pLUN storage space will be allocated for each virtual unit 802 when data is written to that unit. This results in a physical unit (pUnit) 806 with a size of 2 Mbytes.

Data to be stored within virtual unit 802 is divided into variable size chunks 804, each chunk corresponding to a variable length virtual logical block ranging from 2 Kbytes to 64 Kbytes in length, with an average length of 8 Kbytes. In the example embodiment shown, each chunk is deduplicated, and any chunks not already stored on the pLUN are compressed and written to page 810 of pUnit 806. Each page 810 is divided into 16, 32 Kbyte sub-pages 816, and each sub-page is divided into 64, 512-byte blocks 820. At each level of the hierarchy shown, reserved space is set aside to accommodate at least some increases in the amount of data stored without the need to allocate additional virtual and physical units. Thus, in the example of FIG. 8, each page 810 maintains sub-page 15 as 32 Kbytes of reserved space 814, each sub-page 816 maintains blocks 61-63 as 1,536 bytes of reserved space 818, and each block maintains any unused space at the end of the block as reserved space 822. In at least some embodiments, if when the data is initially written the unused space that remains at the end of a block is less than a threshold value (e.g., less than 10% of the block size), an additional block is allocated and operates as at least part of block reserved space 822.

Figure 9:
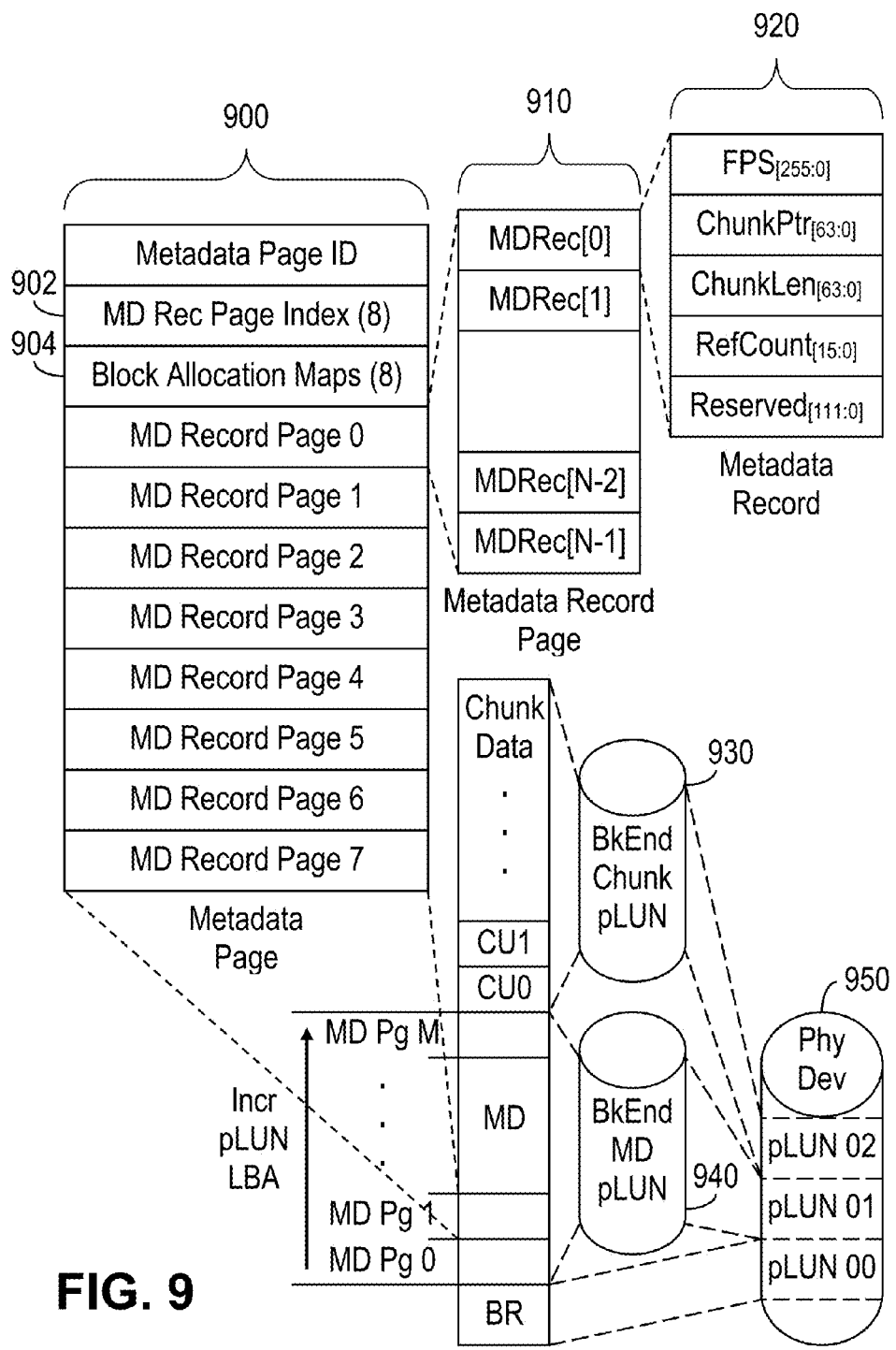
FIG. 9 shows an example of how metadata corresponding to a physical LUN unit is grouped together in a metadata page, in accordance with at least some embodiments.

Metadata corresponding to each allocated pLUN unit is grouped together in a metadata page. FIG. 9 shows an example of how such a page is organized, in accordance with at least some embodiments. Each Metadata Page 900 includes up to 8 metadata record pages (MD Record Pages) 910, and each metadata record page describes a 512-Kbyte chunk data page stored on backend chunk pLUN (BkEnd Chunk pLUN) 930 and associated with a particular pLUN unit. For each represented chunk data page, the corresponding metadata record page includes: a page index within a page index array 902 with the start address of the allocated chunk data page; a block allocation map from an array of block allocation maps 904, indicating which logical blocks of the backend pLUN within the chunk data page are currently in use (one bit per logical block); and the metadata records 910 (collected together within the metadata record page) that each correspond to a chunk stored within the chunk data page. Each metadata record 920 includes the full fingerprint signature of the corresponding data chunk, the starting pLUN LBA and starting LBA offset of the data chunk (i.e., the chunk pointer), the length in bytes of the data chunk (both before and after data compression), a reference count that tracks the number of chunks on the vLUN that reference the data chunk stored on the pLUN, and a reserved field set aside for future expansion. Table 1 below illustrates an example of how such fields may be organized and subdivided within a 64-Byte metadata record.

TABLE 1

| Name | Description | Length |
| --- | --- | --- |
| Fingerprint Signature | One-way secure hash value on the data chunk | 32 Bytes |
| Chunk Pointer | Device ID: Physical device reference | 2 Bytes |
| | Device starting LBA: Physical logical block in which chunk data starts | 4 Bytes |
| | Device LBA Offset: Starting offset within the device starting LBA of the chunk data | 2 Bytes |
| Chunk Length | Original Length: Length of the uncompressed chunk in bytes | 3 Bytes |
| | Compressed Length: Length of the compressed chunk in bytes | 3 Bytes |
| | Pad Length: Length of fill bytes (modulo 512 bytes) | 2 Bytes |
| Reference Count | Specifies the number of virtual to physical logical block links associated with the chunk | 2 Bytes |
| Reserved | For future expansion | 14 Bytes |

Each metadata page 900 is stored on a backend physical LUN (e.g., BkEnd MD pLUN 940), and includes the metadata records corresponding to a "unit" stored on another backend physical LUN (e.g., BkEnd Chunk pLUN 930). Thus, in the example of FIG. 9, metadata page 1 (MD Pg 1) includes the metadata for the data chunks stored within chunk unit 1 (CU1) on backend chunk pLUN 930. The metadata pages are ordered according to the pLUN LBA of the data represented by the metadata page. Thus, for example, if each metadata page represents two backend units that are each 2 Mbytes in size (i.e., 8 metadata record pages each representing 512 Kbytes of chunk data, 4 metadata record pages per unit), then metadata page 0 includes the metadata records for the data chunks in chunk units 0 and 1 (stored within the first 4 Mbytes of LBA space of pLUN 02), metadata page 1 includes the metadata records for the data chunks in chunk units 2 and 3 (stored within the second 4 Mbytes of LBA space of pLUN 02), and so on for the remainder of the metadata and chunk data. In this manner at least some of the higher order bits of the backend chunk pLUN LBA can be used to index into the metadata LBA space to locate the metadata page that stores the metadata corresponding to the chunk LBA. The remaining lower order bits may be used to locate the specific metadata record within a metadata page and metadata record page.

Referring again to FIG. 8, if at a later time chunk data 804 is modified such that the compressed chunk requires more space (and the chunk reference count is not greater than one), the data is written into the available reserved space within the blocks already allocated if the reserved space is sufficient to accommodate the modified data chunk. Because the modified chunk is written to the same blocks within the same page and sub-page, the modification of the corresponding metadata record is limited to the chunk length field. If the modified chunk data cannot be written back to the existing allocated space (e.g., if there is not enough reserved space within the block and the adjacent block is already used, or if the chunk reference is greater than one and thus cannot be modified), space for the modified chunk is allocated elsewhere within the sub-page. If there is insufficient space within blocks 0-60, but the modified block will fit within reserved sub-page space 818, the reserved space is allocated (as needed) to the modified chunk.

Regardless of whether the modified chunk is written to reserved or non-reserved space within sub-page 816, the described modification of the metadata is limited to (at most) an update of the metadata record within the metadata record page corresponding to the modified chunk data, and an update to the block allocation map corresponding to the metadata record page of the modified metadata record. Since the example described involves a modification of an existing chunk (i.e., a read-modify-write operation), it is highly probable that the metadata record page corresponding to the chunk data page will already be in metadata cache memory (described below) as a result of the initial read, and thus the updates to the metadata records described will be performed as memory write operations that are later flushed to disk in as little as two disk I/O operations (one to the chunk data storage device, the other to the metadata storage device). By using the reserved space before allocating additional space, incremental changes to data chunks can be made with little or no degradation in performance (as compared to the initial write of the chunk data) due to the metadata upkeep, since the metadata for the reserved space is kept in the same metadata record page as the metadata for the unmodified chunk data.

Similarly, in at least some example embodiments, if there is insufficient space within a sub-page to allocate to a modified chunk, space is allocated from another sub-page. If there is insufficient space in sub-pages 0-14, space is allocated from reserved space 814 (i.e., sub-page 15). Because the metadata for all of the sub-pages are maintained within the same metadata page record, the updates to the corresponding metadata records will also likely be performed as write operations to metadata cache memory. Additionally, in at least some embodiments, a defragmentation process (previously described) executes in background within a processor of the intelligent storage system of the present disclosure, reallocating space among the various chunks so as to periodically free up the reserved space at each level within the data page hierarchy, while still keeping related data and metadata in the same or physically proximate chunk data pages and metadata record pages on the pLUN, respectively. By maintaining a pool of reserved space, future chunk modifications can be continually accommodated with little or no metadata-related performance penalty (as compared to the initial write of the chunk data).

The thin provisioning described above, wherein units of the backend chunk pLUN are allocated only when data is actually written, is not limited to just the chunk data. In at least some example embodiments, space on the backend metadata pLUN (e.g., backend metadata pLUN 940 of FIG. 9) is also allocated when the corresponding chunk data is allocated on the backend chunk pLUN (e.g., backend chunk pLUN 930 of FIG. 9), regardless of when the corresponding space is allocated on the vLUN. Because the metadata pages are of a known, fixed size, as the storage requirements of the system grows the corresponding metadata storage requirements can be calculated and increased in direct proportion to increases in chunk data storage. Thus, physical storage resources needed for both the chunk data and the chunk metadata can be added to the intelligent storage system on an as-needed basis, as demand increases, over time. It should be noted that because the metadata pages are of a known fixed size, in at least some example embodiments there is no need to maintain reserved space within the physical units of the backend metadata pLUN. Also, in such example embodiments, the physical units are sized to match either the size of a metadata page, or a multiple of the size of a metadata page.

Functional Details: Chunk Creation and Chunk Identifier Generation

Figure 10A:
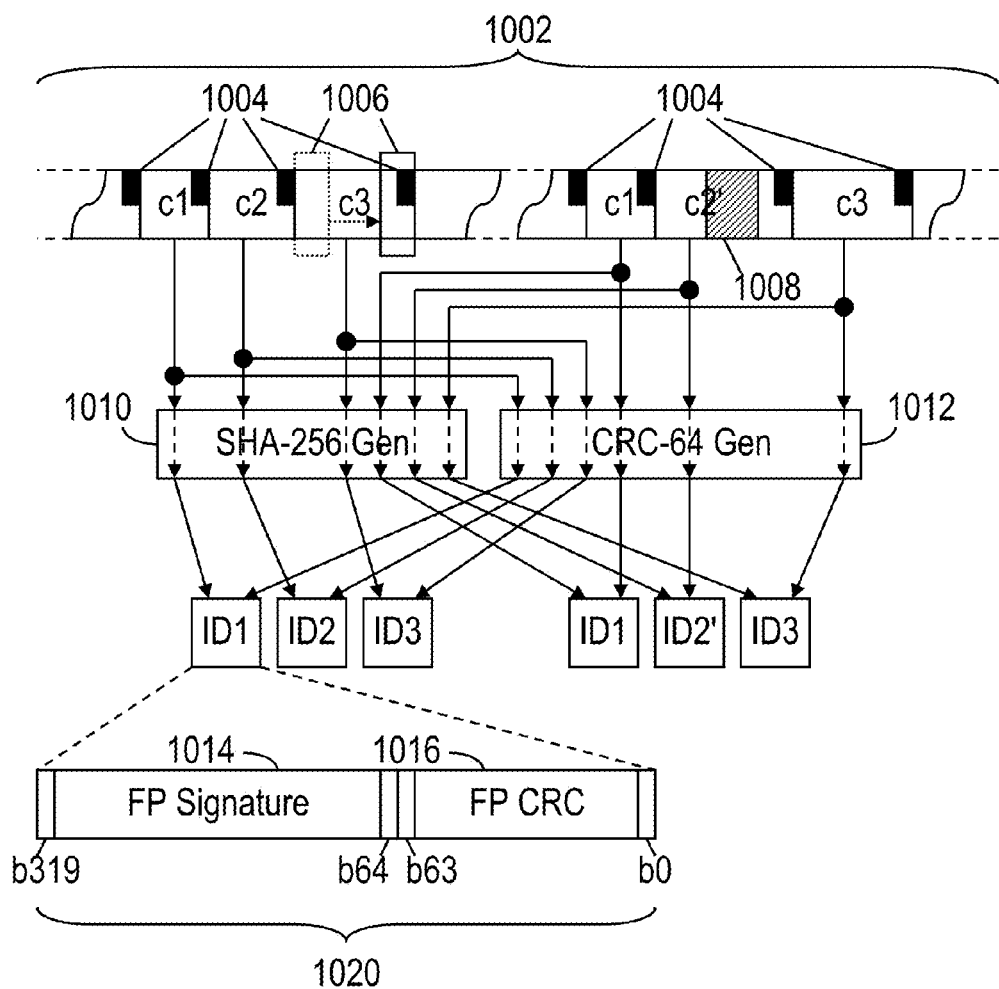
FIG. 10A shows the chunking and chunk ID generation implemented by deduplication engine 301 of FIG. 3, in accordance with at least some example embodiments.

FIG. 10A illustrates some of the processing performed on an incoming data stream received for storage by deduplication engine 301, in accordance with at least some example embodiments. Data stream 1002 is first subdivided into "chunks" of varying size as the data is received (e.g., chunks c1-c3 and c2' of FIG. 3). Duplicate chunks may later be "deduplicated" (as previously described), and deduplicated chunks may optionally be individually compressed before being stored. The size of each chunk is determined based upon the content of the data, a technique sometimes referred to as "content-defined chunking." The boundary between two chunks is defined by identifying anchor points 1004 that depend upon small subsets of the data, as shown in FIG. 10A. More specifically, as the data is received, a digital signature is calculated on a small fixed size sliding window 1006 over the data stream. While any random irreducible polynomial may be used to generate the digital signature (and thus all such polynomials are contemplated by the present disclosure), in at least some embodiments a Rabin fingerprint is calculated over a 48-byte sliding window according to the 22-bit polynomial, $$X^{22}+X^{20}+X^{18}+X^{16}+X^{13}+X^{12}+X^{10}+X^4+X^3+X+1, \quad (1)$$

Although a 48 byte window is used in at least some of the embodiments described, other window sizes may be used and all such window sizes are contemplated by the present disclosure.

The length of the polynomial used to calculate the digital signature determines the upper limit of the average chunks size, which for the polynomial of equation (1) is 4 Mbytes. In at least some embodiments, the maximum chunk size is limited to 64 Kbytes so as to limit the amount of hardware needed to implement said embodiments. As the data is received, signature window 1006 moves along the data stream and the digital signature for the 48 bytes currently within the window is calculated. An anchor 1004 is identified when a selected subset of bits of the resulting digital signature (the Rabin fingerprint value in the embodiments described) matches a pre-defined constant value. In at least some embodiments, the 13 least significant bits of the digital signature are used (yielding a probability of 1 in $2^{13}$ of identifying the chosen constant value within a data byte), and are compared against a constant value of 0x78. The resulting average chunk size is 8 Kbytes, assuming a random distribution of the data within the data stream.

The use of a digital signature as described above is susceptible to extreme cases, wherein the identified anchors may be either too close to each other or too far apart. To avoid such cases, upper and lower limits may be imposed to force both a minimum and a maximum distance between anchor points. In at least some embodiments, a minimum chunk size (i.e., a minimum anchor spacing) is imposed by not beginning the search for an anchor until at least 2 Kbytes of data have been received since the last identified anchor (or since the start of data reception if no anchors have yet been identified). If the data stream is less than the minimum chunk size, fill bytes are added at the end of the stream until the minimum chunk size is reached. Similarly, a maximum chunk size is imposed by ending the search for an anchor if 64 Kbytes have been received since the start of data reception or since identifying the previous anchor point, in which case the anchor point is forced at 64 Kbytes (which is the maximum size chosen to simplify the implementation of at least some of the hardware, as previously noted).

By using digital fingerprinting to define chunks, a small change in one chunk within a data stream will not cause a mismatch between all subsequent chunks and previously matching chunks, which would prevent inter-block deduplication of the chunks (whether compressed or uncompressed) after the change. Continuing to refer to the example of FIG. 10A, if two sequences of chunks c1-c2-c3 and c1-c2'-c3 are transmitted within the data stream 1002, only the chunk that is different (chunk c2') will not be deduplicated. Because the anchor points are content-defined, the anchor points defining chunks c1 and c3 will be the same within both sequences c1-c2-c3 and c1-c2'-c3, despite the insertion of additional data 1008 within chunk c2', and thus most of sequence c1-c2'-c3 can be deduplicated relative to sequence c1-c2-c3 (i.e., stored at least partially as a series of pointers to the corresponding matching chunks c1 and c3 within sequence c1-c2-c3).

As the data stream of FIG. 10A is subdivided into chunks, a chunk identifier is generated to uniquely identify each chunk (e.g., ID1, ID2, ID2' and ID3). While any number of hash functions may be used to generate the chunk identifier (all of which are contemplated by the present disclosure), in at least some example embodiments a chunk identifier is produced that is a composite of two hash values, wherein each hash value is generated by inputting the chunk data through separate, independent hash functions (hash generation functions SHA-256 Gen 1010 and CRC-64 Gen 1012). The first hash value (FP Signature 1014) is generated using a 256-bit Secure Hash Algorithm (SHA-256), while the second hash value (FP CRC 1016) is generated as a 64-bit Cyclic Redundancy Check (CRC-64) code. The two hash values are concatenated to produce 320-bit chunk identifier 1020, with FP Signature 1014 (the SHA-256 hash value) occupying bits 319 through 64 (b319-b64) of chunk identifier 1020, and FP CRC 1016 (the CRC-64 hash value) occupying bits 63-0 (b63-b0) of chunk identifier 1020.

Functional Details: Duplicate Block Identification

Once the chunks are defined and the identifiers for each chunk have been generated, each chunk is checked to determine if it is a duplicate of another chunk already stored within the storage system. Each chunk is checked by "folding" selected subsets of its chunk identifier bits into a series of smaller hash address values, each of which is applied to the Bloom filter to determine if the unique chunk identifier (and thus the chunk) has previously been stored by the storage system. As mentioned before, the Bloom filter is a space-efficient probabilistic data structure that is used to determine whether an element is a member of a set. False positives are possible, but false negatives are not, and elements are added to the set, but are not removed. Further, the more elements that are added to the set, the larger the probability of false positives. A Bloom filter is organized as an array of m bits, which are all initialized to a de-asserted state (e.g., zero). An element is added to the set by applying k independent hash functions to the element data, and using the resulting k hash values to address and assert (e.g., set to one) a bit within the array of bits. Thus, for each element added, k bits within the array will be asserted. A query to test whether an element already belongs to the set is performed by applying the k hash functions to the set element data and testing each of the k bits addressed by each resulting hash address value. If any of the k bits read are de-asserted, the element is not in the set. If all k bits read are asserted, then the element may be in the set, but is not guaranteed to be in the set.

For larger values of m (i.e., a larger number of Bloom filter array bits), independence among the k hash functions can be relaxed with a negligible increase in the rate of false positive indications to query responses. Further, because a good hash function is one that has little if any correlation between different bit fields of the hash address value generated, a hash function that generates a wide hash address value can be subdivided into k bit fields (sometimes referred to as partitioning) to produce the k independent hash function values. Thus, while the hash function values produced by partitioning may not be truly independent, such values are independent enough for use with the Bloom filter if the original base hash value is wide enough and the partitioned hash values are applied to a Bloom filter with a large number of Bloom filter array bits (e.g., a 256-bit hash value that is partitioned into four 39-bit hash address values that each address 1 out of 549,755,813,888 ($2^{39}$) possible Bloom filter array bits). The results of a smaller number of independent hash functions (e.g., 2 or 3 functions) may also be manipulated and combined (sometimes referred to as double or triple hashing) as an alternative means of producing the k independent hash function values required by a Bloom filter (e.g., an SHA-256 value combined with a CRC-64 value to produce a 320-bit hash value that is subsequently partitioned). In at least some embodiments, a combination of partitioning and multi-level hashing are used to produce the k hash function values.

Figure 10B:
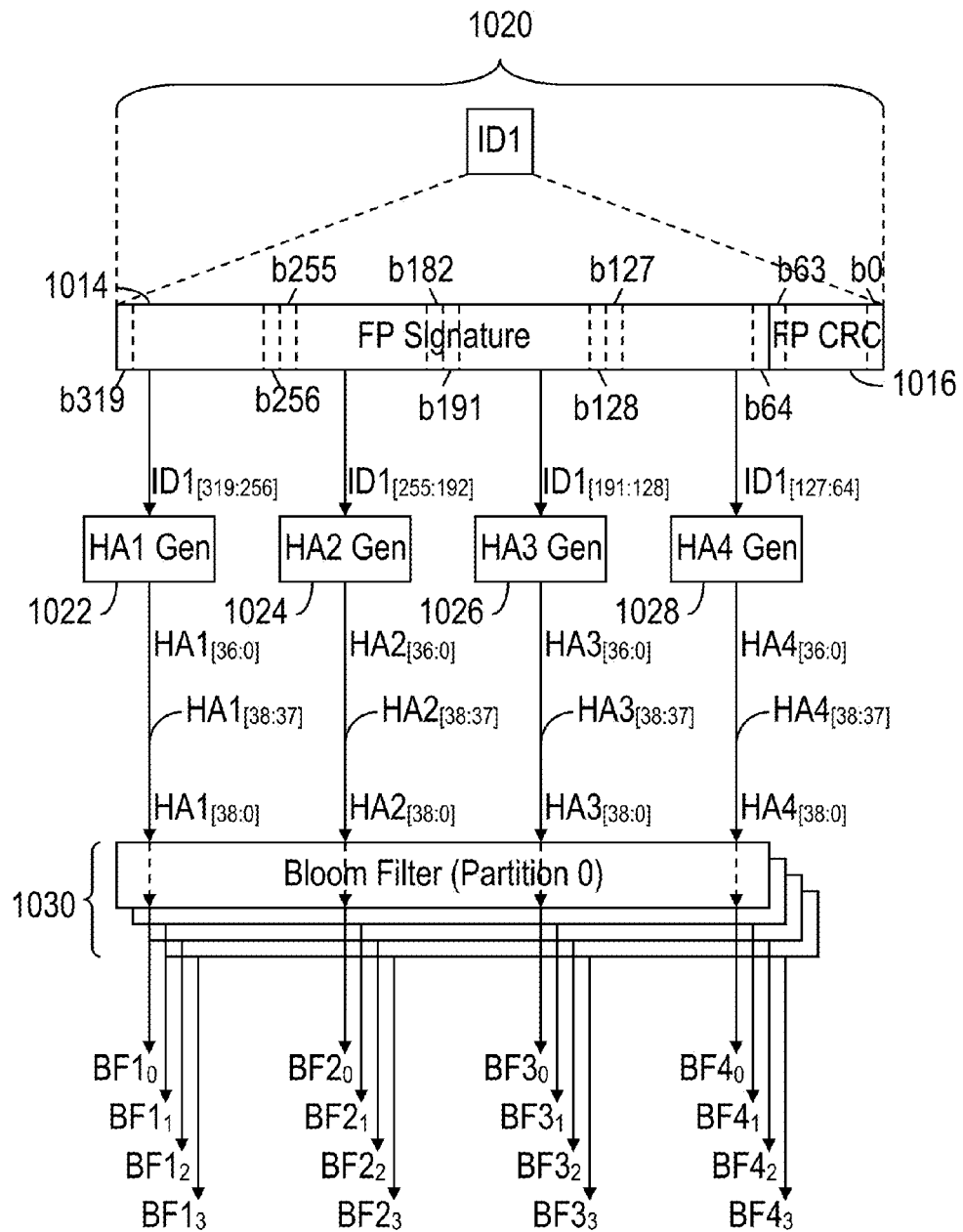
FIG. 10B shows the conversion of the chunk ID of FIG. 10A into separate hash address values used to access the Bloom filter status bits, in accordance with at least some example embodiments.

In the example of FIG. 10A, 256-bit fingerprint signature 1014 is manipulated ("folded") to produce k, 39-bit hash address values. FIG. 10B shows an example of such "folding," wherein fingerprint signature 1014 of chunk identifier 1020 is subdivided into 4 bit fields (k=$_4$), each of which is folded by hash address generators 1-4 (HA1 Gen 1022 through HA4 Gen 1028) to each generate one of four hash address values (HA1 through HA4). Each hash address value may be up to 39-bits in width, depending upon the partition size. The partition size (minus 1) acts as a mask that ensures that the addresses each fall within a given partition.

Each of the resulting k address values is then applied to Bloom filter 1030. Table 2 illustrates an example for generating the hash addresses with k set to 4.

TABLE 2

| k | Bit Field Subdivision | Hash Address Generation (Folding of ID bits) |
|---|---|---|
| 4 | Field1: ID[63:0]<br>Field2: ID [127:64]<br>Field3: ID[191:128]<br>Field4: ID [255:192] | For Field1-Field4 (substituting the corresponding ID bits):<br>ID bit field bits are folded to form a 37-bit address:<br>Fold[36:0] = ID[36:0]^ID[63:37]<br>Mask to force address into partition address range:<br>Mask[36:0] = Fold[36:0]&{PartSize-1, 28'hfff_ffff, 3'h7}*<br>Add partition base address:<br>HashAddr[38:0] = Mask + {PartBaseX**, 28'h0, 3'h0} |

*Indicates a 28-bit field set to all ones, concatenated with one less than the partition size. PartSize is the size of a memory partition in 256 Mbyte increments (4-bit field).
**PartBaseX is the partition base address in memory for partition X (0-3), in 256 Mbyte increments (8-bit field that includes hash address bits 31-38).

In at least some example embodiments, the Bloom filter array is maintained in memory as a collection of individual bits that each corresponds to a single hash address. Thus, for a 39-bit hash address, up to 549,755,813,888 ($2^{39}$) Bloom filter bits may be accessed, requiring 64 Gbytes of memory for the Bloom filter status array ($2^{39}$ bits/$2^3$ bits per byte). This address space is further subdivided into partitions, each of which addresses the status bits for a separate Bloom filter 1030. The filters are each presented with the same hash address (e.g., $HA1_{[38:0]}$ of FIG. 10B) to concurrently access the corresponding Bloom filter bit in each partition as described in more detail below. In at least some embodiments, deduplication engine software 350 of FIG. 3 selects the partition by determining the value of the upper two most significant bits of the Hash address (e.g., $HA1_{[38:37]}$). In the example of FIG. 10B, each Bloom filter includes 137,438,953,472 status bits ($2^{39}$ bits/$2^2$ partitions), each requiring 16 Gbytes of memory ($2^{37}$ bits per filter/$2^3$ bits per byte). The sizing of the partitions and the number of partitions actually configured depends upon such factors as the number of configured hash functions, the amount of memory available for use by the Bloom filter, and the desired worst case false positive detection rate of the Bloom filter (e.g., the false positive detection rate of a full backend storage device). Further, the partitioning of the Bloom filter memory space is mirrored by a similar partitioning of the memory and storage space used to maintain the hash index table, CAS metadata and chunk data as described in more detail below.

For each Bloom filter the k resulting hash address values are used to address one of m bits stored within a partition in memory (i.e., the Bloom filter data structure), thus accessing the Bloom filter status bit corresponding to the hash address value. In the example of FIG. 10B, hash address values HA1 through HA4 each separately accesses a corresponding status bit within Bloom filters 1030 for each of the four partitions shown (status bits BF1 through BF4 for each of partitions 0-3). Status bits $BF1_0$ through $BF1_3$ are accessed using hash address HA1, status bits $BF2_0$ through $BF2_3$ are accessed using hash address HA2, and so forth for the remaining hash addresses HA3 and HA4. Each of the k status bits for each partition is read and tested to determine whether the hash address value has not previously been processed and thus not previously been stored on the storage system (i.e., at least one of the k bits read is not asserted). If any of the k bits read is not asserted (i.e., this is the first occurrence of the chunk processed by the storage system), then the k status bits for the active partition (described in more detail below) are re-saved in the asserted state back to the corresponding Bloom filter data structure, thus recording the occurrence and storage of the chunk (corresponding to the processed chunk ID).

As already noted, the Bloom filter accurately indicates when a particular chunk identifier (and thus the chunk) has not previously been detected by the storage system (no false negative indications), but may indicate that the chunk identifier has previously been detected and processed when in fact it has not (a false positive indication). In at least some example embodiments, a chunk that is identified as new by the Bloom filter is flagged for storage, and no additional reads to memory and/or disk are performed (and none are needed) to confirm that the chunk is new. If the chunk is identified by the Bloom filter as a duplicate, additional reads to memory and/or disk must be performed to determine whether the chunk really is a duplicate (i.e., has already been stored) and is not a new chunk that has been incorrectly identified as new (i.e., a false positive). If the chunk is in fact a new chunk, it is flagged for storage. If the chunk is a duplicate of a previously stored chunk, the chunk is flagged as a duplicate chunk that requires additional processing, as further described below.

Because the removal of a set element from the Bloom filter array is not possible, the rate of false positive indications will increase as chunks are deleted from the storage system (while their corresponding Bloom filter entries are not deleted), or as data is changed (thus changing the corresponding Bloom filter entry without deleting the previously corresponding entry). To address this issue, at least some embodiments can reinitialize and reconstruct the Bloom filter array to reflect the current contents of the storage system. The reconstruction is initiated by the deduplication engine software, based upon a threshold being exceeded (e.g., if the number of false positive for the last woo Bloom filter searches exceeds 20%). When being rebuilt, the Bloom filter array is marked as "disabled" and messages sent by the deduplication assist hardware in response to requests from the deduplication software to search the Bloom filter array indicate that no search was performed. This response causes the deduplication software to perform additional memory and/or disk reads similar to those performed when the Bloom filter indicates that the chunk identifier is a duplicate. While disabled, the Bloom filter is cleared (all bits de-asserted). The CAS index is then searched for all fingerprints currently stored within the CAS buckets, and each Bloom Filter array entry, corresponding to the hash addresses produced by each fingerprint, is asserted to indicate that the chunk associated with the fingerprint is already on the disk. When all of the fingerprints stored within the CAS index have been processed, the Bloom filter is marked enabled, and processing of Bloom filter search requests resumes.

To reduce the impact of the above-described Bloom filter rebuild on the overall performance of the system, a partition rotation scheme is implemented in at least some embodiments. According to one such example scheme, one partition is selected as the active partition and this is the partition that is updated whenever a new chunk is identified and saved. Upon reaching a predetermined threshold value, but before reaching the above-described rebuild threshold value, the active partition is deselected and another partition is selected as the active partition. If the deactivated partition subsequently exceeds the rebuild threshold and a rebuild is initiated, writes of new chunks will not be affected by the rebuild since updates to the Bloom filter are only applied to the active partition. Further, because such a rotation scheme results in a distribution of the status bit over multiple partitions, the probability of accessing a Bloom filter being rebuilt is reduced proportionately by the number of partitions. In at least some embodiments, only one partition is rebuilt at a time to further reduce the chances of accessing a Bloom filter being rebuilt. Also, because the partitions are subsets of the total memory allocated for the Bloom filters rebuilding only a single partition takes less time than would be required to rebuild a single Bloom filter occupying the entire Bloom filter memory space.

The above-described rotation scheme also results in a segregation of Bloom filter status bits within each partition, with status bits corresponding to newer chunks being stored in partitions that were more recently the active partition, and status bits for older chunks being stored in partitions that were less recently the active partition. A rebuild of a Bloom filter may be initiated whenever the corresponding partition becomes the oldest partition (least recently selected as the active partition). In this manner the oldest partition, which tends to have a higher number of false positive indications, is rebuilt prior to being selected as the active partition even if it has not reached its rebuild threshold. Such preemptive Bloom filter rebuilding helps reduce false positive indications for the active partition, which tends to be the most active partition, thus improving the overall system performance.

Each of the hash values included within chunk identifier 1020 may also each be used separately to implement other functions within deduplication engine 301 of FIG. 3. In at least some embodiments, fingerprint signature 1014 of chunk identifier 1020 is further used to uniquely identify the chunk used to generate the signature, while requiring less data bits than the full chunk identifier. Similarly, fingerprint CRC 1016 of chunk identifier 1020 is additionally used to provide integrity and/or error checking of the corresponding chunk data as it is processed by the various components of deduplication engine 301.

Functional Details: Chunk Deduplication

Because the fingerprint signature uniquely identifies a chunk, it is possible to also use this signature as an indicator of the location within a storage system of the chunk. A hash value can be derived from the fingerprint signature (which itself was previously derived from the data within the chunk) and the derived hash value used to determine the location of the chunk. Such a use of data content to produce a hash value that identifies the location in storage of the data content is sometimes referred to as "Content-Addressable Storage" (CAS). In at least some example embodiments, the 24 most significant bits of the fingerprint signature are used as a hash value to access a disk-resident hash index table.

Figure 11A:
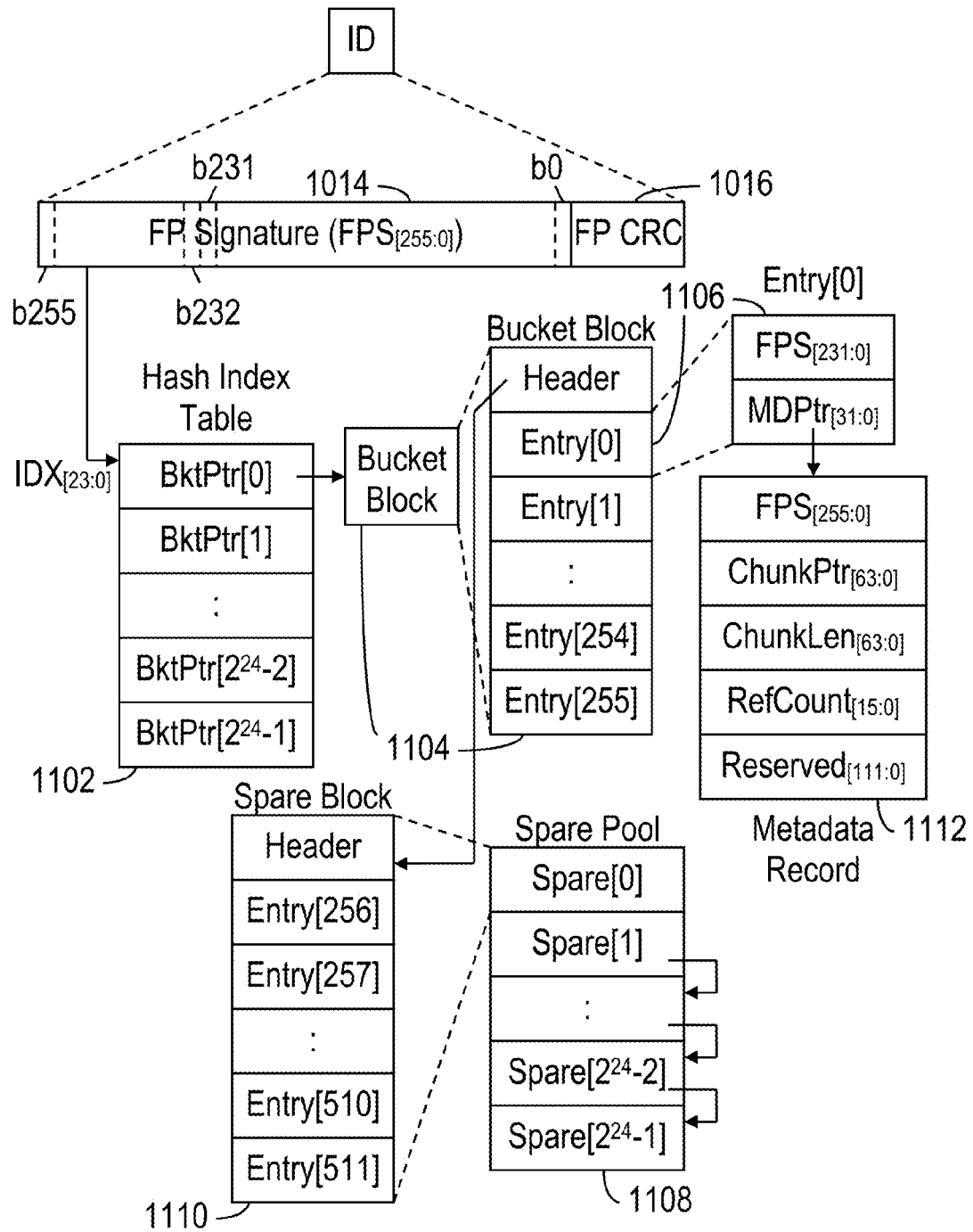
FIG. 11A shows the organization of the metadata within the disk-resident portion of a CAS system, in accordance with at least some example embodiments.

FIG. 11A illustrates an example of a disk-resident CAS system, implemented in accordance with at least some embodiments, which uses at least part of the fingerprint signatures of the chunk IDs of FIGS. 10A and 10B to index into CAS hash index table 1102 as described above. The 24-bit hash value ($IDX_{[23:0]}$) is used as an index into table 1102, which contains a list of 32-bit pointers to CAS bucket blocks at each indexed location within the table. If a valid pointer (e.g., a non-zero pointer) exists at the indexed location, a valid entry exists within the bucket block addressed by the pointer. In the example of FIG. 11A, the hash index table entry for the bucket pointer corresponding to index 0 (BktPtr[0]) contains the address of bucket block 1104. Each bucket block includes a header and 256 CAS entries, wherein each entry includes the remaining 232 bits of the fingerprint signature (29 bytes) and a 32-bit pointer (4 bytes) to a CAS metadata record. Thus, in the example of FIG. 11A, bucket block 1104 includes entry[0] 1106, which includes the 232 least significant bits of fingerprint signature 1014 ($FPS_{[231:0]}$) and a pointer (MDPtr) to metadata record 1112, which describes the chunk corresponding to fingerprint signature 1014.

Because only 24 bits of the fingerprint signature are used to locate a bucket block (via its index), multiple fingerprint signatures can map to the same bucket block (i.e., two or more fingerprint signatures may "collide"). For this reason, multiple entries are maintained within each bucket block, with each entry including the remaining bits of the fingerprint signature (FPS bits 231:0 in the example of FIG. 11A). The specific entry corresponding to the fingerprint signature used to access the bucket block can be identified by searching through the entries for the correct fingerprint signature within a bucket using any of a number of known data structures and search methods.

In other example embodiments, each bucket block entry stores the next 32 most significant bits following the 24 index bits of the fingerprint signature, rather than the full remaining 232 bits. This reduces the minimum storage requirements for each bucket block entry from 33 bytes per entry to 8 bytes per entry. However, in order to determine if the full fingerprint signature matches, the full signature corresponding to the entry must be read from the metadata record pointed to by the entry. If the full fingerprint signature is not a match, the metadata records for each subsequent partially matching entry within the bucket block must be read until a matching entry is found, or the end of valid entries in the bucket block is reached. The savings in bucket block storage space is thus achieved at the expense of entry processing time for fingerprint signatures that map to a bucket block with multiple entries, wherein a matching entry is either not the first entry or is not yet stored within the bucket block. In still other embodiments, the full 240 bits of the fingerprint signature are stored in the bucket block.

Although each bucket block of the described embodiments can accommodate up to 256 entry pointers, the number of entry slots pre-allocated per bucket block may be set to any value (higher or lower than 256 entries), depending upon the average chunk size and the total amount of storage which needs to be represented by the hash index table. Thus, for at least some of the described embodiments, with an average chunk size of 8 Kbytes (each represented by a single entry) and $2^{24}$ hash index table buckets, if a total storage capacity of 32 Tbytes is desired, the buckets must be able to accommodate, on average, 256 entries ($2^{24}$ buckets*256 entries/bucket=$2^{32}$ entries, and $2^{32}$*8 Kbytes/entry=32 Tbytes). If more (or less) storage space is desired/required, buckets with more (or less) entries may be used, or a larger (or smaller) table (i.e., a larger/smaller number of buckets) may be used, or both different table and bucket sizes may be used. Those of ordinary skill in the art will recognize that any combination of table sizes and/or bucket sizes may be used to meet any of a number of desired storage requirements, and all such combinations are contemplated by the present disclosure.

Even though the use of SHA-256 to generate the fingerprint signature, and the generally random nature of the data processed, together tend to produce a statistically random distribution of entries among buckets, it is possible for some data patterns to cause one or more bucket blocks to require more than the number of entries allocated to a bucket block (e.g., more than 256 in the example of FIG. 11A). To address this bucket overflow condition, in at least some embodiments a spare pool that includes a number of unused bucket blocks (e.g., Spare Pool 1108 of FIG. 11A) equal to the total number of pre-allocated permanent bucket blocks is maintained in a linked list. Each of these spare bucket blocks can be re-linked to any of the permanent bucket blocks if additional entries are needed within a bucket block. The example of FIG. 11A illustrates such a case, wherein bucket block 1104 (corresponding to bktPtr[o]) is linked to spare block 1110 (corresponding to the spare[o] entry of spare pool 1108). The remaining spare entries within the spare pool remain linked to each other. If the number of entries within an overflowed bucket is later reduced below the overflow point, the spare bucket block can be released and returned to the spare bucket pool (i.e., unlinked from the permanent bucket block and re-linked to the spare bucket blocks of the spare pool linked list).

In at least some embodiments, the partitioning described with respect to the Bloom filter is also applied to the system's metadata and data. Thus, each partition has a hash index table, bucket blocks, CAS metadata and chunk data. When a Bloom filter provides a positive indication, the metadata structures corresponding to the Bloom filter's partition are accessed. If none of the Bloom filters for any of the partitions provide a positive indication, the new metadata and data are stored within the appropriate structures corresponding to the active partition. As with the bloom filter status bits, the previously-described rotation of the partitions operates to segregate and distribute the metadata and data across partitions. Further, in at least some embodiments, metadata and data stored on older partitions are given priority over newer metadata and data by defragmentation module 362 of FIG. 3, as the older data and metadata are more likely to be fragmented. Since newer defragmented data is stored on the active partition, this operates to pre-emptively free up space on the older partition prior to being selected as the active partition.

Figure 11B:
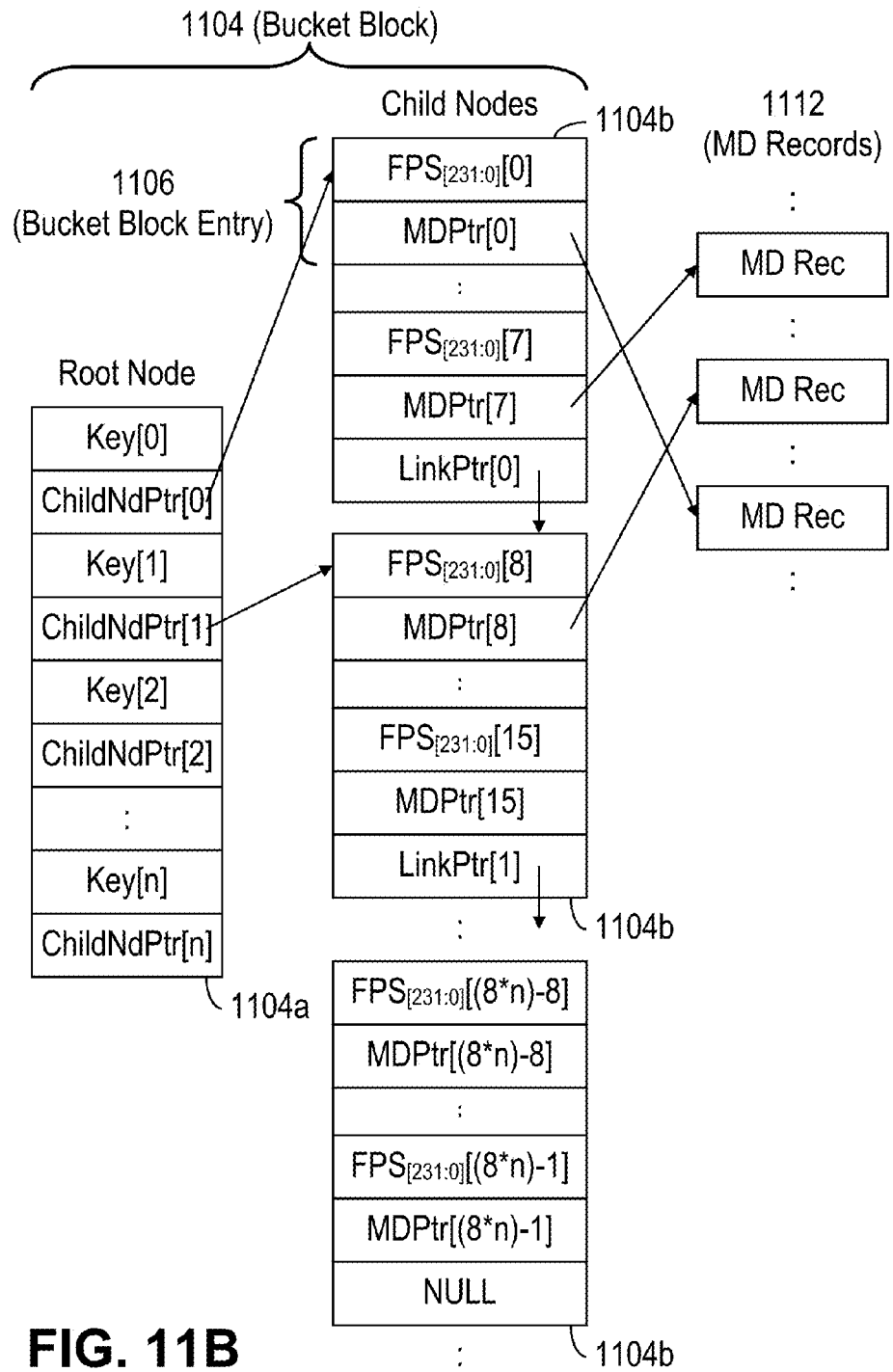
FIG. 11B shows the organization of a B+ search tree implemented within a CAS bucket block, in accordance with at least some example embodiments.

In at least some embodiments, the entries within a bucket are organized as a B+ search tree, as shown in FIG. 11B. The theory and use of B+ search trees is well known in the art and thus the discussion that follows focuses primarily on the structure of the disclosed embodiments that implement such trees. In the embodiment of FIG. 11B, each of the bucket blocks 1104 includes both a memory-resident root node 1104a (initialized when intelligent storage system 200 is initialized) and disk-resident child nodes 1104b of the B+ search tree. The child nodes together contain the bucket block entries 110b of bucket block 1104 (each entry including bits 231:0 of fingerprint signature 1014 and a pointer to the corresponding metadata record).

By using the B+ search tree structure of FIG. 11B, bucket blocks with multiple entries may be searched for a fingerprint signature match more efficiently when compared to a straight linear search of the bucket block structure shown in FIG. 11A. Also, because the root node is created and maintained in memory, the basic structure of the bucket block entries stored on disk is essentially the same for both the linear search implementation of FIG. 11A and the B+ search tree implementation of FIG. 11B. Thus, as long as all bits of the value used as the key of the search tree are stored in the bucket block entry (e.g., the lower 231 bits of fingerprint signature 1014), intelligent storage system 200 may be optionally operated either with or without the B+ search tree without altering how bucket block entries are stored.

It should also be noted that when a B+ search tree is implemented there is no need for a separate spare bucket block linking field within the bucket block header, as shown in FIG. 11A. Instead, in at least some embodiments the link pointer of the last child node (normally set to a null) is set to the location of the first entry of the spare bucket block. All other operations regarding the spare bucket block are performed as previously described.

Functional Details: Caching and Cache Optimization

Figure 11C:
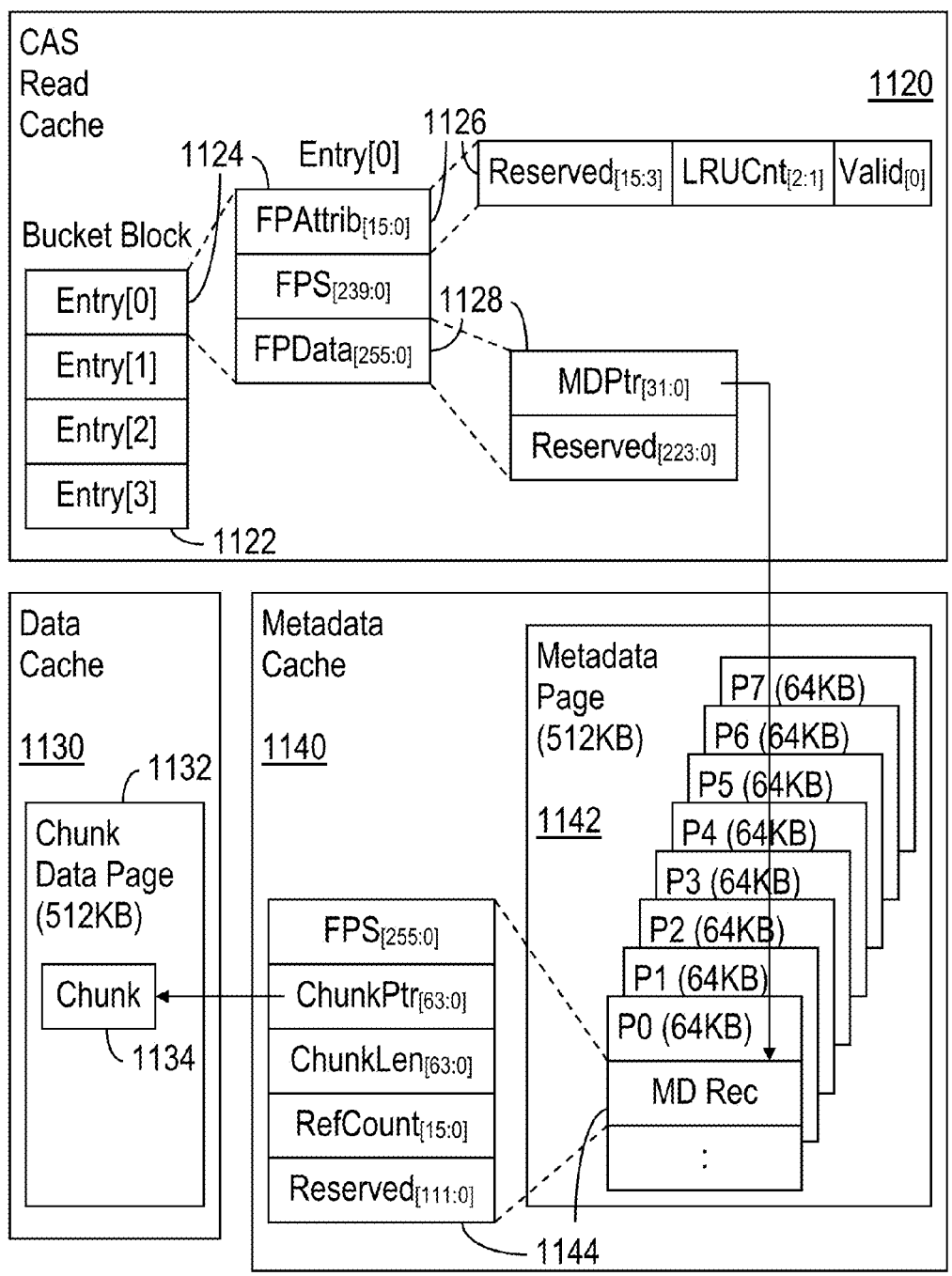
FIG. 11C shows the organization of the metadata within the read section of the memory-resident portion (read cache) of a CAS system, in accordance with at least some example embodiments.

To further improve the performance of the storage system utilizing the CAS technique described above, at least some example embodiments include both a CAS read cache and a CAS write CAS. Referring to FIG. 11C, CAS read cache 1120 maintains a memory-resident subset of the disk-resident CAS bucket blocks and entries, wherein only some of the bucket blocks are copied from disk into the CAS read cache as a memory-resident bucket block (e.g., Bucket Block 1122), and wherein each memory-resident bucket block copy only includes four of the entries of the corresponding disk-resident bucket. The CAS read cache thus operates as a 4-way associative cache. Each memory-resident entry (e.g., Entry[0] 1124) includes additional fields (e.g., a least recently used count and a valid bit) within an attributes section (e.g., FPAtrrib$_{[15:0]}$ 1126) that are used to maintain usage information of the memory-resident entries. These fields allow invalid and/or lesser used entries to be replaced with other entries (read from disk) for the same bucket block, as needed (e.g., using a least recently used or LRU algorithm).

When an entry is identified as corresponding to the fingerprint signature of a chunk being processed, the metadata page that includes the metadata record pointed to by the identified entry is accessed (e.g., metadata page 1142 including metadata record (MD Rec) 1144, pointed to by a metadata pointer within fingerprint data (FPData) 1128 within Entry[0] 1124) and read into a separate cache memory (e.g., metadata cache 1140). In the example shown in FIG. 11C, chunk data page 1132, which includes the data chunk referenced by metadata record 1144 (chunk 1134) is also read into another cache memory (data cache 1130), thus providing additional performance improvements.

The above-described read caching of metadata and data takes advantage of the temporal and spatial locality of many types of data. It is not uncommon for data to be created and modified contemporaneously and related data is frequently stored in a common location (e.g., a common subdirectory) even if saved as separate files. The bucket blocks provide an abstraction layer that enables co-locating related metadata records on disk. The metadata records similarly provide an abstraction layer that enables co-locating related data chunks on disk. Such co-location reduces the probability of cache misses when accessing related information, as co-located related metadata data and data will generally already be loaded and available in the corresponding cache after the initial access of the first chunk and its related metadata. Further, defragmentation module 362 of FIG. 3 operates to maintain such co-location, thus sustaining the performance gains achieved by co-locating the metadata and data.

Figure 11D:
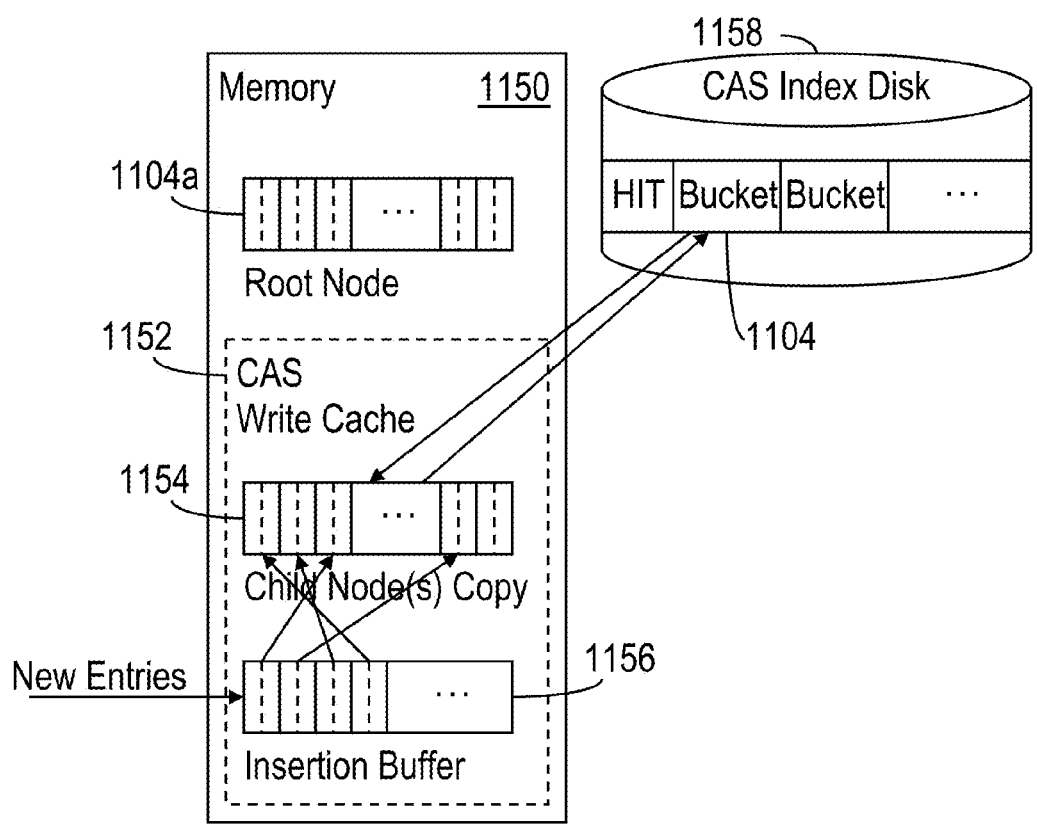
FIG. 11D shows the organization of the meta data within the write section of the memory-resident portion (write cache) of a CAS system, in accordance with at least some example embodiments.

FIG. 11D illustrates an example of a CAS write cache 1152 that interacts with and updates the B+ search tree of FIG. 11B. When new buck block entries are added to a bucket block, the new entries are added to insertion buffer 1156 within CAS write cache 1152, which is associated with a particular bucket block. CAS write cache 1152 and previously-described root node 1104a of the B+ tree are both stored within memory 1150. New entries continue to be added to the bucket block's insertion buffer 1156 until a flush of the buffer is triggered. The buffer flush may be triggered, for example, by the buffer being full or by a request to read an entry from bucket block 1104. In either case, one or more child nodes 1154 are copied from disk-resident bucket block 1104 into CAS write cache 1152. The contents of insertion buffer 1156 are inserted into the appropriate locations within the copy of the bucket block's child node(s) and the root node is updated, as required to maintain the B+ search tree. Once child node(s) copy 1154 and root node 1104(*a*) are updated the child node(s) copy is written back to disk-resident bucket block 1104. In this manner, multiple write updates to bucket blocks stored on CAS index disk 1158 can be performed in as little as one I/O operation (e.g., a read-modify-write operation). Additional performance improvements may be achieved by sizing the child nodes to match a memory or disk device access unit size (e.g., a memory page size, a disk sector size, both or multiples of both).

In at least some example embodiments, a second data cache or "chunk group cache" (not shown) is maintained between data cache 1130 of FIG. 11C and the backend pLUN that temporarily stores chunk data written to the pLUN. The chunk group cache collects into chunk group buffers allocated for each unit (e.g., a 4 Mbyte chunk group buffer allocated within a chunk group cache implemented using 2 Gbytes of non-volatile RAM) the data and metadata associated with individual chunks or groups of chunks written to a given pLUN unit. When a chunk group buffer is full, or when a threshold time limit for holding the buffered data chunks has expired, the data chunks are written to the pLUN unit in just a few write operations (possibly as few as one write operation). By grouping the data as described, the overhead associated with large numbers of smaller write operations is avoided, providing additional performance improvements.

Although only a subset of CAS bucket blocks and entries are maintained in CAS read cache memory 1120 at any given point in time, a complete copy of the full disk-resident CAS hash index table 1102 of FIG. 9A is maintained in memory, allowing quick access to the bucket blocks within either the memory-resident CAS cache, or the disk-resident CAS storage. This is possible due to the fact that the hash index table only includes the 32-bit block pointers to the bucket blocks, and thus the entire table only requires 64 Mbytes of memory ($2^{24}$ table entries*4 bytes per entry=64 Mbytes).

As previously noted, as many as 8 partitions may be defined for a corresponding number of Bloom filter, hash index table, bucket block, CAS metadata and chunk data partitions. In at least some embodiments that implement such partitioning, the CAS cache may similarly be divided into separate corresponding partitions.

Figure 11E:
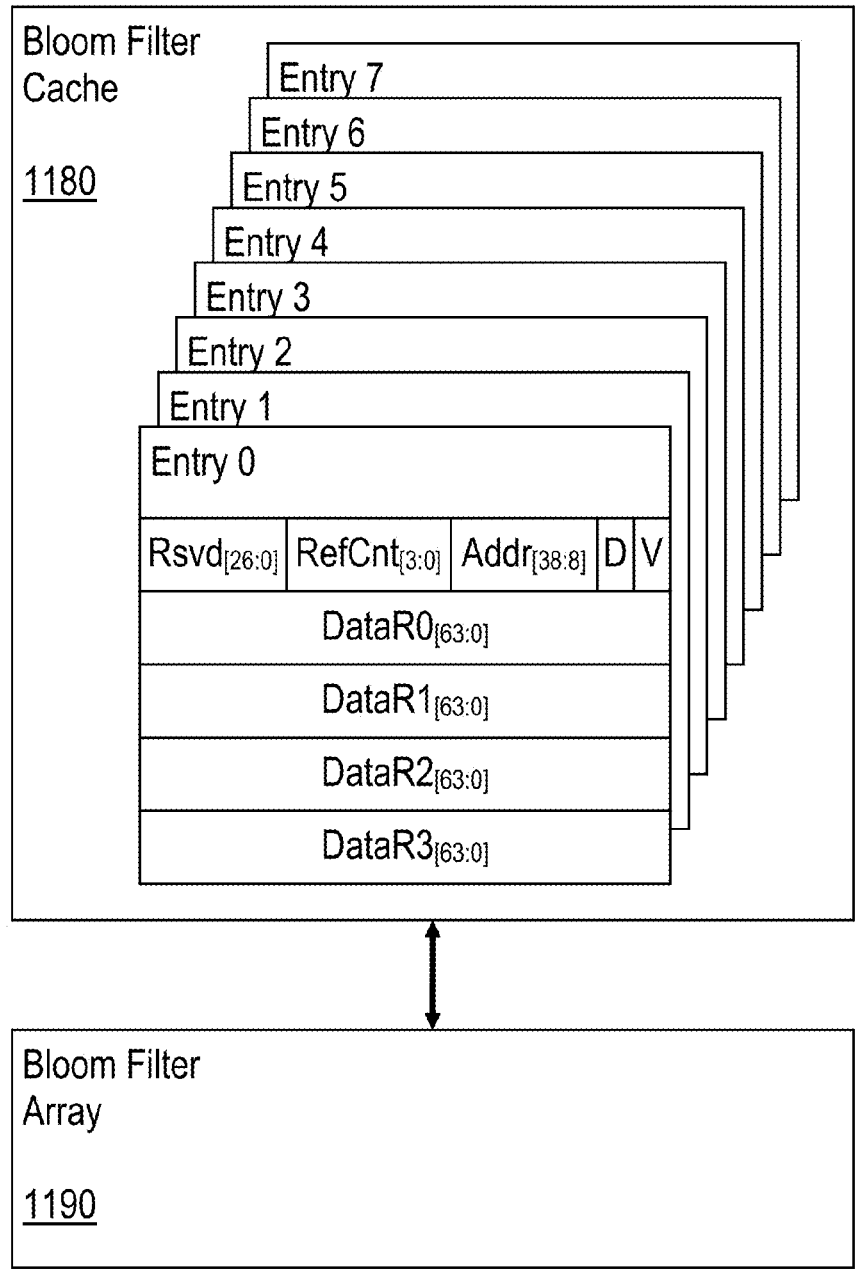
FIG. 11E shows the organization of the Bloom filter data within the Bloom filter cache, in accordance with at least some example embodiments.

The Bloom filters are each maintained in high performance memory devices (e.g., double data rate, version 2, synchronous dynamic random access memories, or DDR2 SDRAMs). However, because the Bloom filters are accessed more frequently than the CAS or metadata caches (also maintained in DDR2 SDRAMs), in at least some embodiments a Bloom filter cache is utilized to further improve the performance of deduplication engine 301. As shown in FIG. 11E, Bloom filter cache 1180 includes 8 entries (Entry 0-Entry 7). Each entry includes a valid bit (V), a dirty bit (D), a 31-bit address field ($Addr_{[38-8]}$), a 4-bit reference count, 27 bits reserved for future expansion ($Rsvd_{[26:0]}$), and 256 Bloom filter status bits (organized as 4 rows of 64 status bits each, DataR0-DataR3).

When data is read from within Bloom filter array 1190, 32 bytes of array data is read into an available Bloom filter cache 1180 entry (i.e., an entry with a de-asserted valid bit). As previously noted, in at least some example embodiments each unique 39-bit hash address presented to the Bloom filter accesses a single Bloom filter status bit. When a hash address is used to access a Bloom filter status bit, the 31 most significant bits of the hash address (bits 38-8) are first compared against the 31-bit address field of each of the eight cache entries within Bloom filter cache 1180. If a matching entry with an asserted valid bit is identified, the status bit being accessed is already loaded in the Bloom filter cache. The remaining 8 least significant bits of the hash address are used to access the specific status bit. Hash address bits 6-7 are used to select the data row (i.e., one of DataR0-Data R3), and hash address bits 0-5 are used to select one out of the 64 status bits of the selected data row.

When a Bloom filter status bit is initially accessed (read or written), the reference count for the corresponding cache entry is incremented. If the status bit is not modified, the I/O operation is completed and the reference count of the entry is decremented. If the status bit is modified (e.g., asserted to indicate the addition of a new chunk to the storage device), then the cache bit is updated, the dirty bit is asserted, and the reference count is decremented, completing the I/O operation. Because the Bloom filter is a shared resource that can be accessed as part of the deduplication of multiple concurrent data streams, it is possible for multiple Bloom filter accesses to the same cached range of status bits to be requested before a pending request completes. For example, after an update to a Bloom filter bit has been performed, additional updates to the dirty bit and to the reference count must still be performed to complete the I/O operation. In between each of these accesses, another access may be initiated by the deduplication of another stream processed by deduplication engine 301. The cache entry reference count tracks the number of such back-to-back I/O operations that are initiated but not yet completed, i.e., the number of pending Bloom filter cache I/O operations.

When the reference count is decremented back down to its initial value (e.g., −1), all pending I/O operations accessing bits within the cache entry's hash address range have been completed. If the dirty bit is set, then at least one of the I/O operations involved a write to one of the bits within the entry, and this updated status needs to be written back to Bloom filter array 1190. The full 32 bytes of status data are written back to the array, and the dirty bit is de-asserted, thus updating Bloom filter array 1190. By allowing multiple pending I/O operations initiated by the deduplication of multiple streams, it is possible to reduce the number of writes to Bloom filter array 1190. Allowing multiple pending I/O operations also reduces the latency that would otherwise be introduced by holding off the deduplication of one stream while awaiting the completion of a Bloom filter I/O operation initiated by the deduplication of another stream. Instead, the I/O operations for multiple streams may be initiated back-to-back, regardless of the completion status of the previous I/O. Updates by a previous I/O are reflected in the cached entry, and subsequent I/O operations to the same status bit will produce the correct results.

In at least some example embodiments, the number of pending I/O operations performed on bits within a Bloom filter cache entry is limited to a maximum number (e.g., 8). When the reference count reaches this limit, all subsequent requests to access a Bloom filter status bit within the range of the entry are rejected. When the count is decremented below the limit, subsequent requests are again accepted. If a request is presented to the Bloom filter to access a status bit that is not currently in the cache, the request will cause a new read of the corresponding hash address range of Bloom filter array 1190 data into Bloom filter cache 1180 if a cache entry is available. An entry is considered available if there are no I/O operations still pending (e.g., a reference count of −1) and the entry's dirty bit is not asserted (i.e., a write back to the Bloom filter array is not pending), or if the entry's valid bit is not asserted. If no entries are available, the request is rejected.

Because the Bloom filter array is shared by all of the devices managed by deduplication engine 301, setting the number of Bloom filter cache entries and the number of allowable pending I/O requests equal to the maximum number of partitions (i.e., equal to the number of Bloom filters and thus to the number of backend pLUNs) operates to reduce delays caused by the collision of Bloom filter cache I/O operations associated with different backend pLUNs. If each I/O operation involves non-overlapping ranges of Bloom filter status bits, each I/O operation will be assigned to a different Bloom filter cache entry. If the I/O operations involve overlapping ranges of Bloom filter status bits, requiring access to the same Bloom filter cache entry, each of the I/O operations will be performed back-to-back, as described above. In each case, an I/O operation to the Bloom filter cache associated with one pLUN device is not held off pending the completion of an I/O operation to the Bloom filter cache associated with a second pLUN device. Further, none of the I/O requests will be rejected, given that the number of cache entries and the maximum number of allowable pending I/O requests are both sufficient to accommodate any combination of requests for all of the partitions.

Additionally, if the number of Bloom filter cache entries is also at least equal to the maximum number of concurrent streams that can be processed by deduplication engine 301, then concurrent and/or back-to-back Bloom filter accesses will also be possible, regardless of whether the accesses are associated with different pLUN devices, the same pLUN device but different Bloom filter array ranges, or the same pLUN device within the same Bloom filter array range. In all cases, a Bloom filter I/O operation associated with one data stream will not be held off pending the completion of a Bloom filter I/O operation associated with another stream. Also, none of the I/O requests will be rejected, given that the number of cache entries and the maximum number of allowable pending I/O requests are both sufficient to accommodate any combination of requests from all of the streams currently being processed by deduplication engine 301.

Functional Details: Chunk Compression/Decompression

Figure 12:
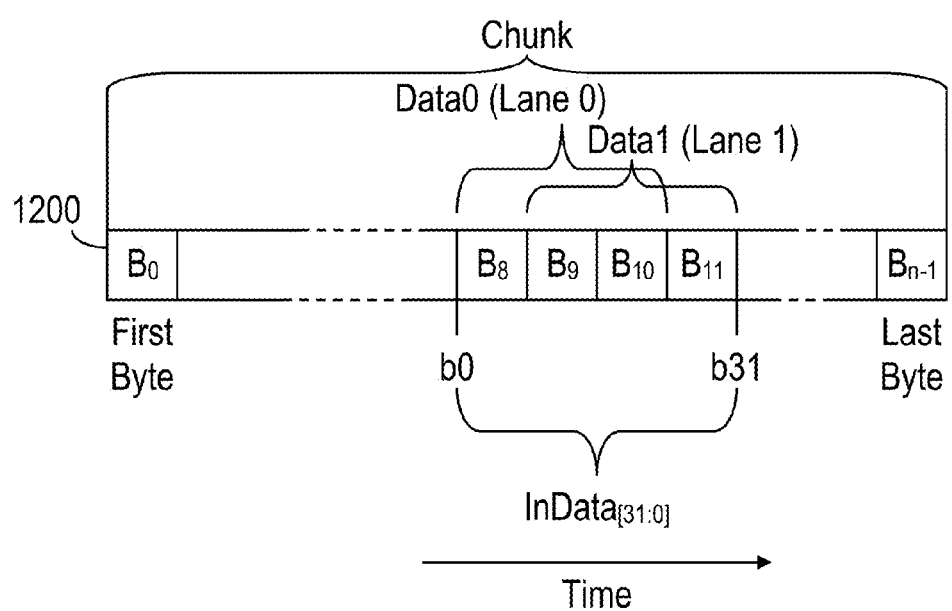
FIG. 12 shows the subdivision of an incoming byte stream into two data lanes, in accordance with at least some example embodiments.

Once those chunks within a write operation that are already saved onto a storage device are indentified, the remaining new chunks (if any) are each forwarded for compression (if enabled) prior to being stored on a backend pLUN. As previously described, the chunk is compressed by identifying duplicate byte sequences within the chunk and replacing such duplicate sequences with code words that point to a prior occurrence of the sequence. A hash code is generated using chunk data within a moving window, and the hash code is used to index into a series of tables (described below) to determine if the sequence of data bytes has previously occurred within the chunk. In at least some example embodiments, multiple hash codes are concurrently generated in parallel using data within multiple windows over different portions of the incoming chunk data stream. FIG. 12 shows an example using two moving windows of three bytes each, each window defining a data lane within chunk byte stream 1200. For a minimum code word size of two bytes, three bytes is the minimum window size that can be used that produces a compression of the data (i.e., a reduction of at least one byte).

In the example shown in FIG. 12, as well as the in subsequent examples shown in the figures and described in the present disclosure, two data lanes are presented for simplicity and clarity. Nonetheless, those of ordinary skill in the art will recognize that a variety of embodiments incorporating any number of lanes may be used to implement the compression techniques described herein, and all such embodiments are contemplated by the present disclosure. Those of ordinary skill in the art will also recognize that increasing the number of data lanes proportionally increases the number of bytes that can be concurrently processed in parallel by the data compression engine. Such increases in concurrent processing enable the data compression engine described to support similarly proportional increases in the bit rate of the incoming data stream.

Continuing to refer to the example of FIG. 12, one window defines lane 0 (Data0), which includes data bytes $B_8$ (the first byte of the 3-byte sequence that includes bits 0 through 23) through $B_{10}$ (the last byte of the 3-byte sequence). Similarly, a second window defines lane 1 (Data 1), which includes data bytes $B_9$ through $B_{11}$ (bits 8-31 ). Because both lanes are processed concurrently in parallel, for each processing cycle the processed byte stream is shifted by two bytes, and two new bytes are loaded. Thus, in the next cycle after that shown in FIG. 12 data lanes 0 and 1 will include data bytes $B_{10}$-$B_{12}$ and $B_{11}$-$B_{13}$ respectively.

Figure 13A:
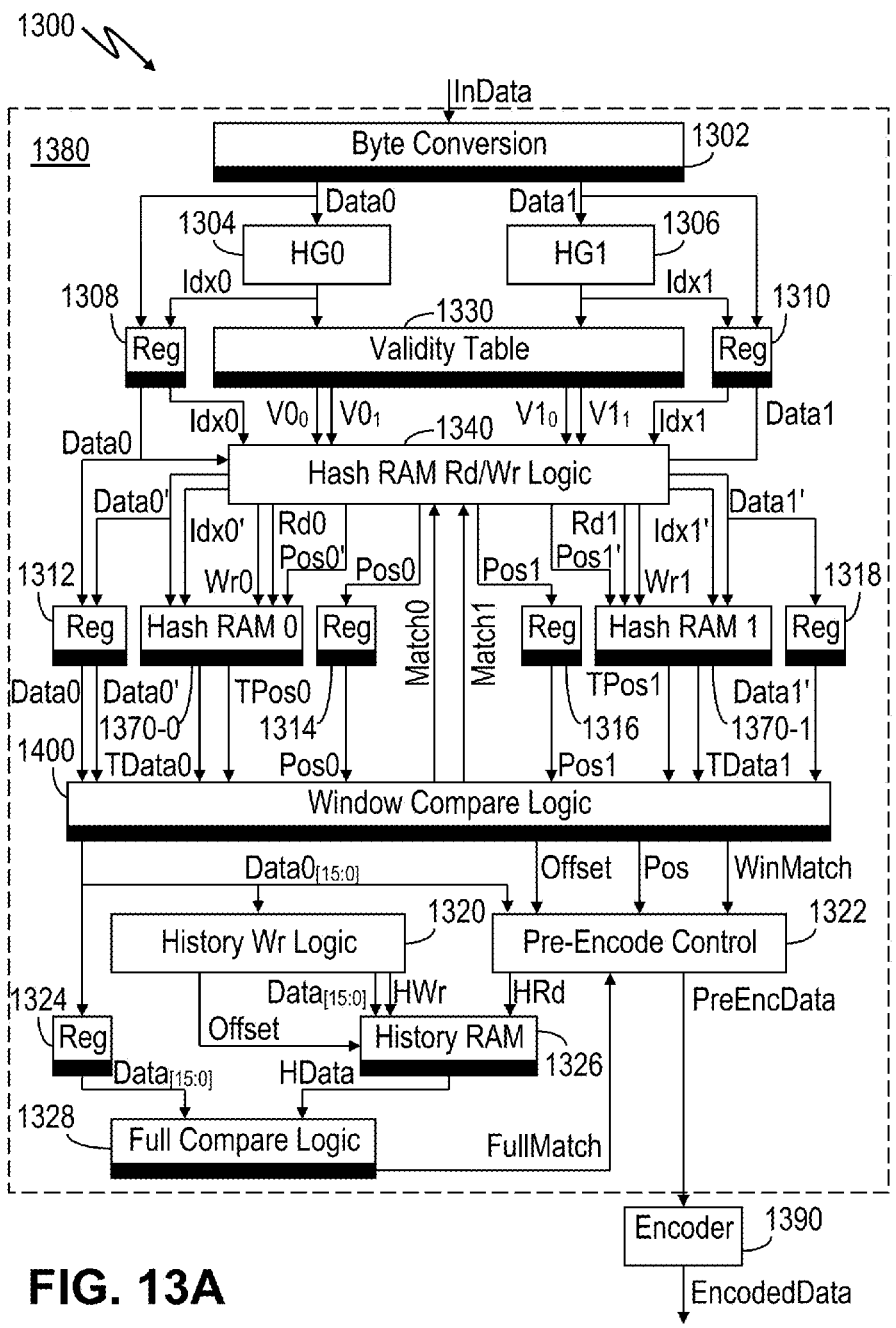
FIG. 13A shows a detailed functional block diagram of a compression engine, in accordance with at least some example embodiments.

FIG. 13A shows a functional block diagram of data compression engine 1300, which includes sequence detector 1380 and encoder 1390. Data compression engine 1300 provides concurrent compression processing of the parallel data lanes of FIG. 12, in accordance with at least some example embodiments. Because of the high data rates which data compression engine 1300 may support (e.g., 48 Gbps), pipelining is used within sequence detector 1380, and each pipeline stage boundary is indicated by a black bar at the output of a functional block within a stage. Registers (Reg 1308, 1310, 1312, 1314, 1316, 1318 and 1324) are shown where signals pass through a given stage without necessarily being processed by logic within a stage, reflecting the lockstep transfer of all data from one pipeline stage to the next. While the detailed diagrams of some of the functional blocks of FIGS. 13A and 17A (e.g., FIG. 14) do not show any registers or supporting clocking logic associated with the pipelining, the omission of such circuitry in these detailed figures is only to simplify and de-clutter the figures. Continuing to refer to FIG. 13A, byte conversion block 1302 accepts the incoming data, shifting the data bytes by two bytes, and forwarding the resulting four bytes of data to the rest of the processing logic, once per processing cycle. Because the two data lanes together span four bytes, processing by sequence detector 1380 cannot begin until at least the first four bytes of data chunk 1200 of FIG. 12 have been received.

Continuing to refer to FIG. 13A, once at least four bytes have been received, the data for each lane is forwarded to a corresponding hash code generator (HG0 1304 for data lane 0, HG1 1306 for data lane 1). Each hash generator implements in hardware an irreducible polynomial that uses the 24 bits of the corresponding lane data to produce a 10-bit hash index value (Idx0 for lane 0, Idx1 for lane 1). Equation (2) below illustrates an example of such a polynomial:

$$X^{24}+X^{22}+X^{20}+X^{19}+X^{18}+X^{16}+X^{14}+X^{13}+X^{11}+X^{10}+X^{8}+X^{7}+X^{6}+X^{3}+X+1. \tag{2}$$

Those of ordinary skill in the art will recognize that a variety of irreducible polynomials and hardware implementations of such polynomials may be suitable for implementing the hash generators described herein, and all such polynomials and implementations are contemplated by the present disclosure. Each generated index value is used to perform a lookup within validity table 1330. Validity table 1330 maintains validity bits for each possible index value that together indicate whether that index value has previously occurred within a chunk, and in which lane the value occurred. The validity bit information is subsequently used by hash RAM read/write logic (Hash RAM Rd/Wr Logic) 1340 to determine if a read of one or more of the hash tables is needed, and which tables (lane 0 and/or lane 1) will be accessed to retrieve the hash table data.

Figure 13B:
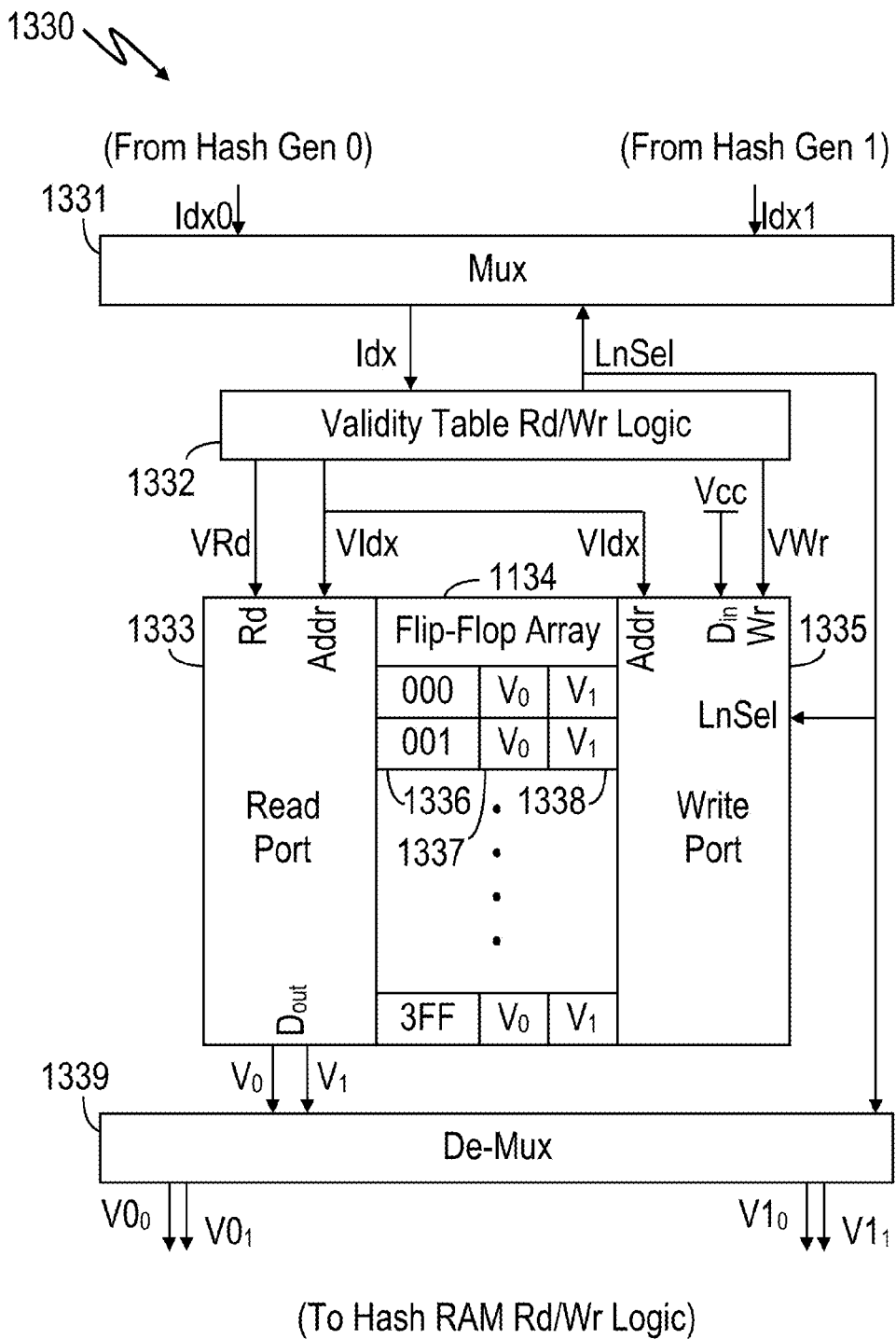
FIG. 13B shows a block diagram of validity table 1330 of FIG. 13A, implemented as a flip-flop array, in accordance with at least some example embodiments.

FIG. 13B shows a more detailed functional block diagram of validity table 1330 of FIG. 13A, in accordance with at least some example embodiments. Validity table 1330 is implemented using a dual-port array of static flip-flop pairs, each flip-flop pair addressed by one of the 1024 ($2^{10}$) possible hash index values. One port is a dedicated read port that reads both values at the addressed location (e.g., values $V_0$ and $V_1$), while the other port is a dedicated write port that only writes to one of the two validity bits at the addressed location. The validity bit updated during a write is determined by the value of the lane select (LnSel) signal, generated by validity table read write logic (Validity Table Rd/Wr Logic) 1332. The lane select signal also controls the input port selection of multiplexer (MUX) 1331 and the output port selection of de-multiplexer (De-Mux) 1339. Those of ordinary skill will recognize that validity table 1330 may be implemented using discrete components, using one or more field programmable gate arrays (FPGAs), or using any combination of these or any of a variety of components. All such components and combinations of components are contemplated by the present disclosure.

By using static flip-flops to form the array of validity bits, the array may be accessed multiple times for either reads or writes (or both reads and writes) within a single processing cycle. Thus, a preliminary determination of which data lane values have previously occurred in both lanes may be made (based on the occurrence of the hash indices) without having to read each corresponding location within the larger, slower hash RAMs. As will be shown below, this preliminary determination permits the identification of a number of conditions that preclude the need for accessing one or more of the hash RAM.

At the beginning of each chunk, a global clear signal (not shown) initializes all of the validity bits within the table to a de-asserted state (e.g., to a logical 0). After both bits at a validity table location are read, the location is updated to reflect the current occurrence of the index value by asserting the validity bit stored at that location. In the example of FIG. 13B, the write data input is forced to a voltage level (VCC) corresponding to a logical 1 and the value is written to the location corresponding to the selected lane when a write cycle is performed. Because each lane only updates the validity bits corresponding to that lane, the index addresses for which the validity bits are valid are evenly distributed across lanes within the table.

Figure 13C:
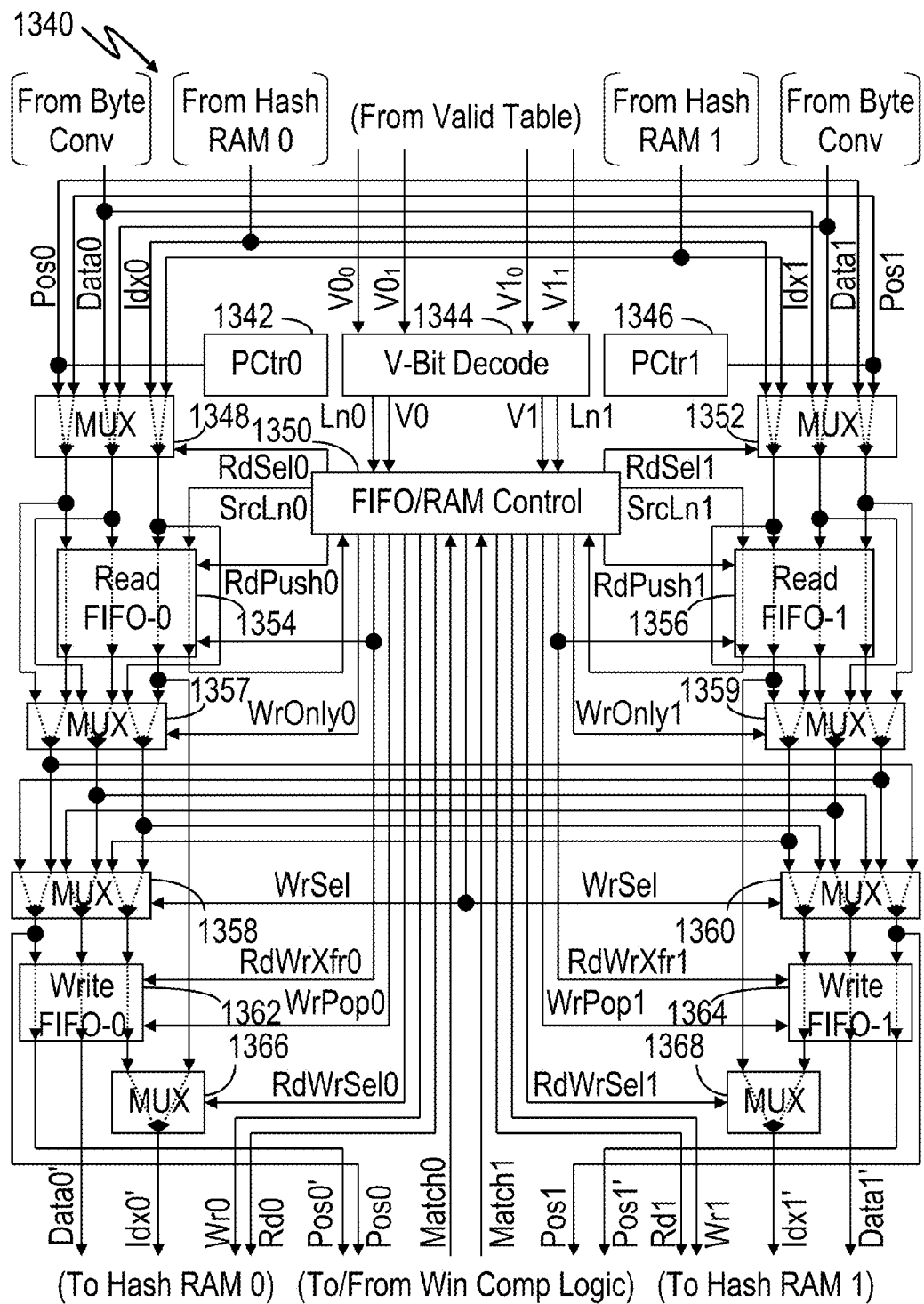
FIG. 13C shows a block diagram of hash RAM read/write logic 1340 of FIG. 13A, in accordance with at least some example embodiments.

Referring again to FIG. 13A, the index values (Idx0 and Idx1) and validity bits for each lane ($V0_0$ and $V0_1$ for lane 0, and $V1_0$ and $V1_1$ for lane1) are forwarded to hash RAM read/write logic 1340, which determines which hash RAM locations should be read, and from which lane(s). Each lane includes a separate hash RAM (hash RAM 0 1370-0 for lane 0, and hash RAM 1 1370-1 for lane 1), and hash RAM read/write logic 1340 controls read and write accesses to both RAMs. FIG. 13C illustrates an example of hash RAM read/write logic 1340, in accordance with at least some embodiments. The validity bits for both lanes are input into validity bit decode (V-Bit Decode) 1344, which combines the validity bits to produce validity flags (V0 and V1) and target read lane signals (Ln0 and Ln1) for each lane. Table 3 shows how the validity bits are combined in the example embodiment of FIG. 13C to produce the target read lane signals for each lane:

TABLE 3

| Lane 0 Validity Bits | | Lane 1 Validity Bits | | Hash Target Read Lane 0 | Hash Target Read Lane 1 |
|---|---|---|---|---|---|
| V0 | V1 | V0 | V1 | | |
| 0 | 0 | 0 | 0 | X* | X |
| 0 | 0 | 0 | 1 | X | 1 |
| 0 | 0 | 1 | 0 | X | 0** |
| 0 | 0 | 1 | 1 | X | 1 |
| 0 | 1 | 0 | 0 | 1** | X |
| 0 | 1 | 0 | 1 | 1*** | 1*** |
| 0 | 1 | 1 | 0 | 1** | 0** |
| 0 | 1 | 1 | 1 | 1** | 0** |
| 1 | 0 | 0 | 0 | 0 | X |
| 1 | 0 | 0 | 1 | 0 | 1 |
| 1 | 0 | 1 | 0 | 0*** | 0*** |
| 1 | 0 | 1 | 1 | 0 | 1 |
| 1 | 1 | 0 | 0 | 0 | X |
| 1 | 1 | 0 | 1 | 0 | 1 |
| 1 | 1 | 1 | 0 | 1** | 0** |
| 1 | 1 | 1 | 1 | 0 | 1 |

*A don't care (X) indicates that a hash RAM read is not required from either lane.
**One or both hash RAM reads are from an opposite lane.
***Both hash RAM reads are from the same lane.

As can be seen from Table 3, where a validity bit indicates that the index may have previously occurred in more than one lane, the hash RAM lane corresponding to the current lane is selected if the selection doesn't cause two reads from the same hash RAM lane. Otherwise, the opposite hash RAM lane is selected to avoid performing both reads in the same lane. This is because the hash RAM is generally the slowest component within sequence detector 1380, and the processing cycle of the pipelined sequence detector of FIG. 13A is thus limited to the time it takes to perform a hash RAM read (assuming that the hash RAM is implemented as a dual-port RAM, with one port dedicated to reads and the other to writes). By adopting a validity bit decode strategy that seeks to avoid two reads in the same lane, only two combinations of validity bits produce reads from the same hash RAM lane that cannot be avoided, i.e., when both lanes indicate that the corresponding indices have previously occurred only in lane 0 or only in lane 1 (indicated in Table 3 with a triple asterisk).

If validity bit decode 1344 indicates that an index has previously occurred within at least one of the two lanes (e.g., by asserting one or both of signals V0 or V1), the index value (Idx0/1), the position within the chunk (Pos0/1) and the lane data (Data0/1) are routed from the originating lane to the read FIFO (read FIFO 1354 or 1356) corresponding to the target read lane by one of multiplexers 1348 or 1352 (controlled by the read select 0 or 1 (RdSel0/1) signal). The read FIFOs are static asynchronous FIFOs that, like the static flip-flops of validity table 1330, can be both written and read multiple times within a single processing cycle. Thus, if validity bit decode 1344 indicates that a read is needed from lane by both of the current lanes, FIFO/RAM control 1350 will sequence the FIFO read select 0, read push 0 (RdPush0), read select 1 and read push 1 signals so as to load the index, position (generated by position counter Pctr0

1342), data and source lane (SrcLn 0) values from lane 0 to read FIFO 0, and then the index, position (generated by position counter Pctr1 1346), data and source lane (SrcLn 1) values from lane 1 to read FIFO 0 as well. In this manner, the read FIFO load of both sets of values is performed within a single processing cycle.

If a read is not required for a lane, FIFO/RAM control 1350 operates one of either multiplexer 1357 (lane 0) or 1359 (lane 1) with the write only signal for that lane (e.g., WrOnly1) to bypass the corresponding read FIFO and load the set of values directly into the write FIFO for the lane. Subsequently, if one or both of the read FIFOs for a lane is not empty, the hash RAM read/write select (RdWrSel0/1) signal(s) is/are set to operate multiplexer 1366 and/or 1368 to select the index value from the output of the corresponding read FIFO, and the hash RAM read (Rd0/1) signal(s) for the non-empty lane(s) is/are transitioned to execute a read of the hash RAM for the corresponding lane(s). The write select (WrSel) signal is set (based on the state of the source lane bit(s) output by the read FIFO(s)) so as to transfer to write FIFO 1362 and/or 1364 (via multiplexer 1358 and/or 1360) any sets of values still within the read FIFO(s), and the read/write transfer (RdWrXfr0/1) signal for each lane with read FIFO data is transitioned to execute the transfer (pushing the values onto the write FIFO and popping the values off of the read FIFO). The hash RAM read/write select signal(s) is/are set to operate multiplexers 1366 and/or 1368 to select the index value from the output of the corresponding write FIFO, and the hash RAM write (Wr0/1) signal(s) is/are transitioned to execute a write of the hash RAM for the corresponding lane(s). The write updates the hash RAM for each lane with the new data and position values associated with the corresponding index value. Because the data for the write originates from the output of the read FIFOs, the write is guaranteed to be performed after any required read of the same location.

Referring again to FIG. 13A, if the data read from the hash RAMs (e.g., TData0) matches the current chunk data output by hash RAM read/write logic 1340 as part of a set of values (e.g., Data0'), and the current chunk data is close enough to the previous occurrence within the chunk to be represented by a code word, a match signal for the corresponding lane will be asserted by window compare logic 1400 (described in detail below) within the same processing cycle as the hash RAM read. If the position value of the next set of values present at the output of the read FIFO for the lane just matched is within two bytes of the preceding position value output by the same FIFO (e.g., if two hash RAM reads are required in the same lane within a processing cycle), the set of values at the output of the read FIFO are transferred to the write FIFO without performing a hash RAM read (i.e., a "write only" operation as previously described). This is because the chunk data byte at the start of the next set of values is already known to be one of the three bytes that will be included in the code word that will be created as a result of the match. Thus, it doesn't matter whether the lane data corresponding to the next byte matches an existing hash RAM entry, and the next hash RAM read can be skipped. In at least some example embodiments, such a comparison of two successive read FIFO positions values is performed within hash RAM read/write logic 1340 (not shown), with the results of the comparison provided to FIFO/RAM control 1350.

Figure 13D:
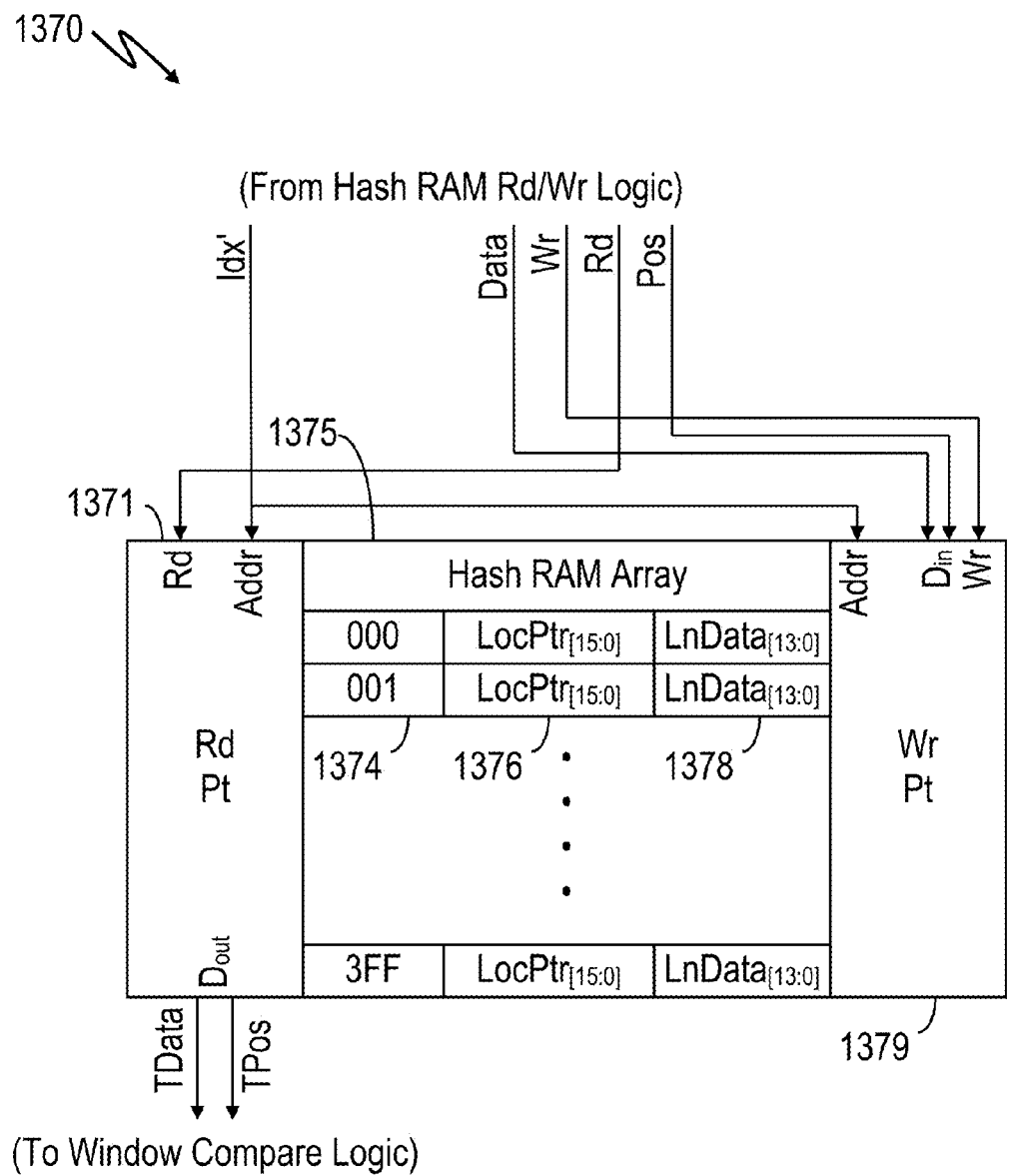
FIG. 13D shows a block diagram of a hash RAM 1370 (corresponding to hash RAMs 1370-0 and 1370-1 of FIG. 13A), in accordance with at least some example embodiments.

FIG. 13D illustrates an example of dual-port hash RAM 1370 (representative of hash RAMs 1370-0 and 1370-1 of FIG. 11A), in accordance with at least some embodiments. One port is dedicated to hash RAM reads (Rd Pt 1371), the other to hash RAM writes (Wr Pt 1379). Each location 1374 within array 1375 corresponds to one of the 1024 possible index values, and both the position relative to the start of the chunk (LocPtr$_{[15:0]}$ 1376) and the data value (LnData$_{[13:0]}$ 1378) of the most recent data sequence corresponding to the index value are stored in the hash RAM. Because the bit width of the hash index (10 bits) is less than the bit width of the data used to produce the index ($2_4$ bits), the correspondence between data values and index values is a many-to-one correspondence, with 16,384 ($2^4=2^{24}-2^{10}$) different possible data values mapping to each index location. Thus, as already described, the incoming data value must be compared with the value of the previous occurrence (stored in the hash RAM) to confirm that the stored occurrence does actually match the current data.

In at least some example embodiments, if the hash index values are generated using an irreducible polynomial that is of the same order as the index produced, it is not necessary to store and subsequently compare all of the data bits to determine a match. Thus, for example, if hash index generators 1304 and 1306 of FIG. 13A implement an irreducible polynomial of size 10 to generate the 10 bit index previously described, at most 14 bits of the original data need be stored in the hash RAM and later compared to determine an exact match between the incoming lane data and the data that generated the most recent occurrence of the index identified by the hash RAM entry. In the example embodiment of FIG. 13D, only lane data bits 0-13 are stored and used in the data match determination. Regardless of whether the incoming lane data and the stored lane data match, the incoming lane data is always written to the corresponding index location in the hash RAM for that lane. Thus, the hash RAM always stores the data and location values for the data that most recently produced the hash index value corresponding to that hash RAM address. As with the validity bits of validity table 1330, because the data for a lane is always written to the hash RAM for that lane, an even distribution of the incoming data results across the two data lanes, and thus across the two hash RAMs.

Although data and location values for only one hash index value is store at each index value location of the hash RAM embodiment of FIG. 11D, those of ordinary skill in the art will recognize that any number of hash values may be concurrently maintained for each index value. In at least some example embodiments, a plurality of entries are maintained, and each is output and compared in parallel so that a match can still be determined in a single processing cycle. If there is a match, the write is directed to the matching entry (e.g., via a de-multiplexer connected to the data inputs of the hash RAM). If there is no match, a rotation algorithm may be used to determine which location is overwritten (e.g., a round-robin algorithm). Many variations in the number of hash locations and types of rotation algorithms will become apparent to those or ordinary skill in the art, and all such variations are contemplated by the present disclosure.

Figure 14:
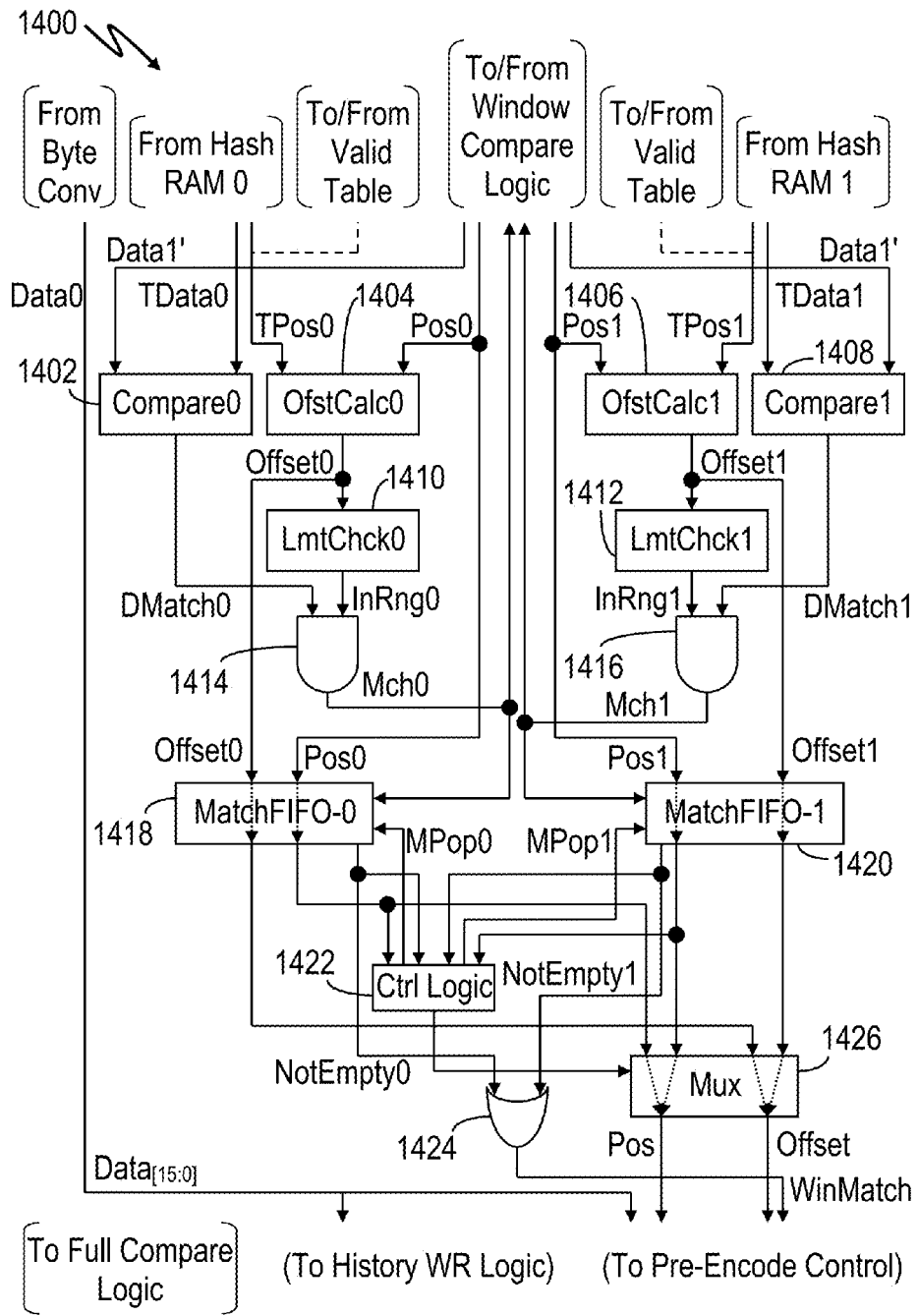
FIG. 14 shows a block diagram of window compare logic 1400 of FIGS. 13A and 17A, in accordance with at least some example embodiments.

Referring again to FIG. 13A, if data from hash RAM 0 and/or hash RAM 1 and is available for comparison, the data and position values read from the hash RAM(s), as well as the corresponding data and position values for the incoming chunk data, are all forwarded to window compare logic 1400. FIG. 14 illustrates a more detailed functional block diagram of window compare logic 1400, in accordance with at least some example embodiments. Data read from the hash RAMs in each lane are compared to the corresponding incoming data (Compare0 1402 and/or Compare1 1408) to determine if the data matches. Also, each stored location for each lane is subtracted from the corresponding current data position within the chunk (OfstCalc0 1404 and/or OfstCalc1 1406) to produce an offset value (Offset0/1), which is compared against the maximum offset value that can be represented by a code word (LmtChck0 1410 and/or LmtChck1 1412).

If the data matches (as indicated by DMatch0 and/or DMatch1) and the offset is within a range that can be represented by a code word (as indicated by InRng0 and/or InRng1), a match is signal is asserted (Mch0 and/or Mch1) by AND gate 1414 and/or 1416, which is used by hash RAM read/write logic 1330 (as previously described) and by window compare logic 1400 to control further processing. The match signals are also used to load both the calculated offsets (Offset0/1) and the incoming data position (Pos0/1) for each lane into a corresponding match FIFO (Match-FIFO-0 1418 and/or MatchFIFO-1 1420). The match and position signals for each lane are used by control logic (Ctrl Logic) 1422 to determine which match FIFO output is output by window compare logic 1400 (via multiplexer 1426), and to generate the control signals to pop the match FIFOs (MPop0 and/or MPop1). In at least some embodiments, when both match FIFOs signal that data is available (via the NotEmpty0 and NotEmpty1 signals), control logic 1422 selects the data with the lowest position value (i.e., the oldest data). The two match FIFO not empty signals (NotEmpty0 and/or NotEmpty1) are further combined by OR gate 1424 to signal a valid window match (WinMatch) and that data indicating the position of a match and the offset to the previous occurrence of the matching data is available, thus outputting the match position and offset data in the proper order.

Referring again to FIG. 13A, match position and offset data output by window compare logic 1400, together with the window match indication signal, are all presented to pre-encode control 1322, which transitions the history read (HRd) signal to read data from history RAM 1326 and extend the comparison of the incoming data to data beyond the first three matching bytes. The comparison is performed by full compare logic 1328, which generates a full match signal (FullMatch) that is monitored by pre-encode control 1322. While a full match is detected between the incoming data stream and the data in the history buffer, no data is sent to encoder 1390. When a mismatch is identified, the end of the chunk is reached, the offset position of the start of the incoming data within the history buffer is reached, or the maximum length match length that can be represented by a code word is reached, the offset value provided by window compare logic and the length of the matching sequence are transmitted by pre-encode control 1322 to encoder 1390 as part a match command (described below). Subsequent non-matching data bytes are forwarded to encoder 1390 as part of a literal command (also described below). Up to three non-matching data bytes immediately following the match may be appended to the end of the match command (described further below). At the end of the chunk an EOF command is sent to the encoder.

In parallel to the frill match detection, incoming data (Data0$_{[15:0]}$) is also presented by window compare logic 1400 to history write logic 1320, which writes the data to history RAM 1326. For each processing cycle two data bytes are concurrently written to history RAM 1326 and compared by full compare logic 1328. Data from lane 0 is used because it includes the first byte from both lane 0 and lane 1, the two bytes being processed within a given processing cycle. In at least some example embodiments, history data is maintained in history RAM 1326 within a circular buffer that is sized to be, at most, equal to the maximum offset that can be represented by a code word. Thus, even though a chunk could be as large as 64 Kbytes, if the maximum offset that can be represented by a code word is, for example, 4096, the circular buffer is configured to be 4096 bytes in length.

Pre-encode control 1322 (FIG. 13A) and/or 1722 (FIG. 17A) transmits literal commands, match commands and EOF commands to encoder 1390/1790. These commands are transferred from pre-encode control 1322/1722 to encoder 1390/1790 as a 34-bit command. FIG. 15A shows an example of how such commands may be formatted, in accordance with at least some example embodiments. The literal command shown includes between 1 and 4 bytes of uncompressed incoming chunk data, with the L field encoded as shown to indicate which of the byte fields include valid data. In at least some example embodiments, encoder 1390/1790 combines groups of literal commands into longer, multi-byte literal records for storage to the pLUN that include a length field at the beginning of the record (for later decoding of the data when read from the pLUN). In order to provide the total number of successive literal bytes to encoder 1390/1790, the literal data bytes must be buffered until a match sequence is encountered, or until the maximum number of bytes that can be encoded within a single literal record are processed. Referring to both FIGS. 13A and 17A, in at least some example embodiments, pre-encode control 1322/1722 may include an output FIFO (not shown) to buffer the literal data bytes. Once the full match length is determined and is transmitted to encoder 1390/1790 (e.g., via a separate dedicated connection), the literal bytes may be transmitted as literal commands to encoder 1390/1790 for inclusion in a literal record.

The match command shown includes the offset value output by window compare logic 1400 to pre-encode control 1322/1722 (indicating the start of the previous occurrence of the sequence) and the length of the matching string as determined from the full compare described above using full compare logic 1328/1728 and history RAM 1326/1726. The match command also includes X and Y flags that are used to indicate to encoder 1390/1790 whether certain thresholds for the length and offset fields have not been exceeded. If these fields are sufficiently small, smaller code words may be used, resulting in a higher compression efficiency. Thus, for example, in at least some embodiments a two byte code word is used to represent matches of between 3 and 8 bytes if the offset values between 1 and 2048 bytes, a three byte code word is used to represent matches of between 9 and 127 bytes for offset values between 1 and 4096 bytes, and a four byte code word is used to represent matches of between 3 and 1023 bytes for offset values between 1 and 4096 bytes. The threshold flags X and Y enable the use of simple and fast static decoders within encoder 1390/1790 to determine which code word to use, thus avoiding the need for the encoder to perform multiple compare operations on the offset and length values of the match command.

Each match command and literal command are converted by encoder 1390/1790 into corresponding match records and literal records that together make up the encoded data (EncodedData) output by encoder 1390/1790 for storage as a compressed chunk on a backend pLUN. FIG. 15B shows examples of such records, in accordance with at least some embodiments. Literal records with both one and two byte headers are shown, as well as three types of match records. The match records include records with two, three or four header bytes (depending upon the length of the match and the range of the offset to the previous occurrence), and each type of match record can include up to 3 additional trailing literal bytes. The inclusion of trailing literal bytes avoids the need to create additional literal records for small numbers of literals that may occur between match sequences, or at the end of the data. The end of the data within a chunk is marked by an EOF record. Each record is identified by the record type values shown and indicated within the first byte of the record, and is used to determine how the data is decompressed and reconstructed by the data decompression engine (described below).

Figure 16:
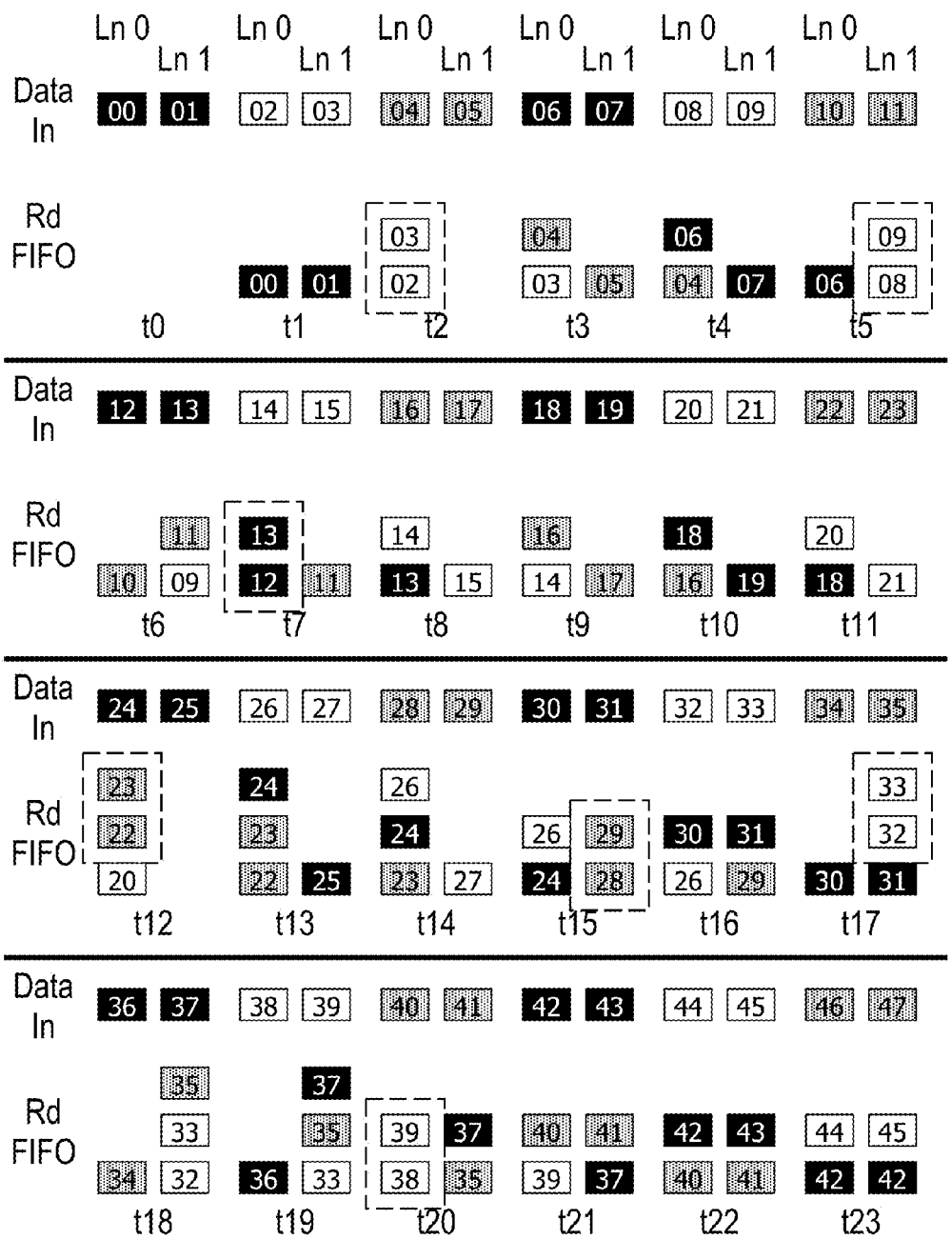
FIG. 16 shows an example of the flow and distribution of data through the read FIFOs of FIGS. 13C and 17C, in accordance with at least some embodiments.

As can be seen from the above description, once a set of values is loaded onto the read FIFOs within hash RAM read/write logic 1340 of FIG. 13A, the processing of the values for that set within a given lane is independent of the processing of values for that set (or any other set) being processed in the other lane. The processing performed within one lane does not depend upon or affect the processing performed in the other lane. Processing of data within one lane continues uninterrupted as long as data is available, regardless of whether data is being processed in the other lane, and regardless of which data sequence is being processed in the other lane. Because of this processing independence between lanes, at least some of the extra processing cycles used for back-to-back hash RAM reads in one lane can be recovered by subsequent back-to-back reads in the other lane. FIG. 16 illustrates an example of such processing cycle recovery for a series of back-to-back hash RAM reads executed by the sequence detector embodiment of FIG. 13A. In this example 24 processing cycles are shown (t0 through t23) in which preliminary matches are indicated in all 24 cycles, but none are an exact match. As a result, hash RAM reads are required in all 24 cycles.

The first row (Data In) shows the incoming lane data (Data0, Idx0, Data1 and Idx1) that is loaded into registers 1308 and 1310 of FIG. 13A. The data for each lane is identified by the least recent byte of the three bytes within the lane window. Thus, block 00 identified the byte sequence $B_0$-$B_2$ and block 01 identifies byte sequence $B_1$-$B_3$. The second row (Rd FIFO) shows the contents of the read FIFOs of FIG. 13C (Read FIFO-0 1354 and Read FIFO-1 1356), with data exiting the FIFOs (i.e., available for a hash RAM read) shown at the bottom of an entry, just above the processing cycle identifier (e.g., just above to). Because the registers and the read FIFOs are in different pipeline stages of sequence detector 1380, there is at least a one processing cycle skew between the load of registers 1308 and 1310 and the output of index values by the read FIFOs for hash RAM reads.

The example of FIG. 16 shows six distinct back-to-back hash RAM reads. The dashed boxes indicate where the lane data for each back-to-back read is loaded into a read FIFO. In this example, sequence pairs 02-03, 12-13 and 22-23 will each result in back-to-back hash RAM reads in lane 0. Similarly, sequence pairs 08-09, 28-29 and 32-33 will each result in back-to-back hash RAM reads in lane 1. The first back-to-back hash RAM read (02-03 in lane 0 at t2 and t3) results in an additional processing cycle skew in lane 0, wherein lane 0 data for at least one of the hash RAM reads isn't available until two processing cycles after being loaded into the previous pipeline stage, rather than just one processing cycle. After a subsequent back-to-back read in the opposite lane (sequence 08-09 in lane 1 at t5 and t6), the situation is reversed, wherein lane 0 has recovered the lost processing cycle, but lane 1 is now skewed by one cycle. Two subsequent, back-to-back reads in lane 0 (12-13 at t7 and t8, and 22-23 at t13 and t14) result in a recovery of the lost cycle in lane 1, but a 3 cycle skew in lane 0. Thus, for example, sequence 23 is loaded into the previous pipeline stage during cycle t11, but is not available for a hash RAM read until cycle t14. A subsequent back-to-back hash RAM read in lane 1 (28-29 at t15/t16) results in a recovery of a lost cycle in lane 1 and a loss of one cycle in lane 0, leaving both lanes skewed by two cycles. Later back-to-back reads in alternating lanes (e.g., 32-33 at t18/t19 and 38-39 at t20/t21) result in no additional net skew.

From the above, those of ordinary skill in the art will recognize that with a relatively random distribution of the incoming data over time, on average only a few processing cycles will be lost per chunk for the worst case scenario of continuous preliminary matches, with no actual matches. Thus, for at least some example embodiments, the two byte per processing cycle throughput is maintained for a significant majority of the time for such a worst case scenario. The described scenario is a worst case because, as previously described, read cycles are not needed for sequences without a preliminary index match, or for sequences that include bytes shared with a previously matching sequence. These cases thus do not result in back-to-back reads, and in some cases may provide additional unused cycles available for the recovery of lost processing cycles.

As already noted, different code words of varying lengths may be used to represent a matched sequence, depending upon the number of matching bytes and upon the size of the offset value between the current sequence and the previous occurrence of the sequence. If both lanes match, but one lane indicates an offset value that fits within a smaller code word, greater compression efficiencies can be achieved if the smaller code word is used. Data compression engine 1700, illustrated in FIGS. 17A through 17D, implements such an offset selection scheme, in accordance with at least some example embodiments. Data compression engine 1700 is similar to data compression engine 1300 of FIG. 13A through 13D (and uses corresponding reference numbers), and in the discussion that follows only the differences are described.

In the example embodiment of FIGS. 17A through 17D, the position information for the previous occurrence of a sequence (TPos$0_0$, TPos$0_1$, TPos$1_0$ and TPos$1_1$) is stored within validity table 1730, rather than hash RAMs 1770-0 and 1770-1. If validity table 1730 indicates that the indices of both lanes have each only occurred in the same, single lane (and thus back-to-back hash RAM reads may be needed), the hash RAM read/write logic can compare both position values provided by the validity table. This enables hash RAM read/write logic 1730 to read the hash RAM value with the smallest offset first. If the hash RAM data value read results in a match, the offset value used for the code word will be the smaller value, and the hash RAM read corresponding to the larger offset value will be skipped.

Figure 17A:
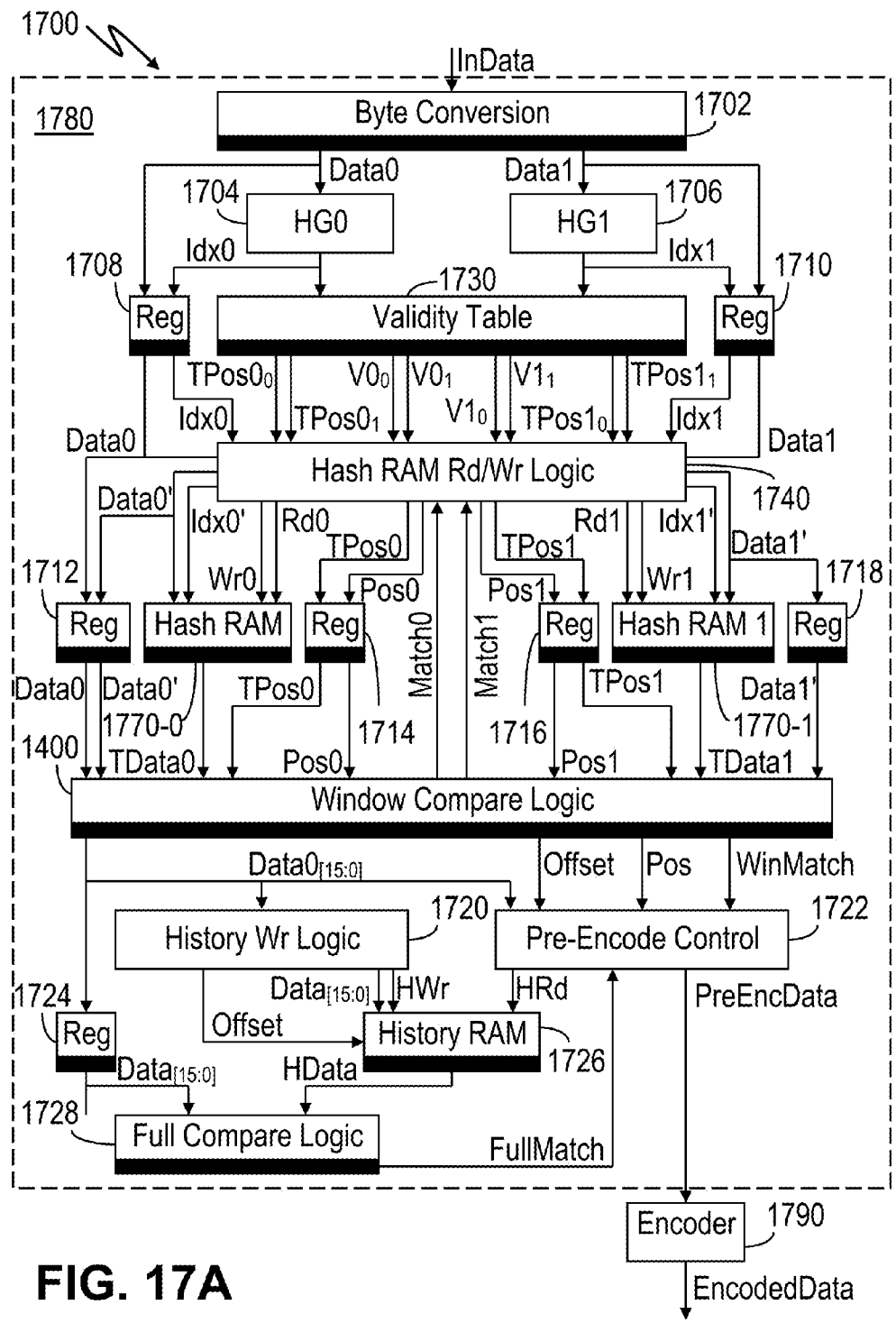
FIG. 17A shows a detailed functional block diagram of a compression engine, with position information stored within validity table 1730, in accordance with at least some example embodiments.
Figure 17B:
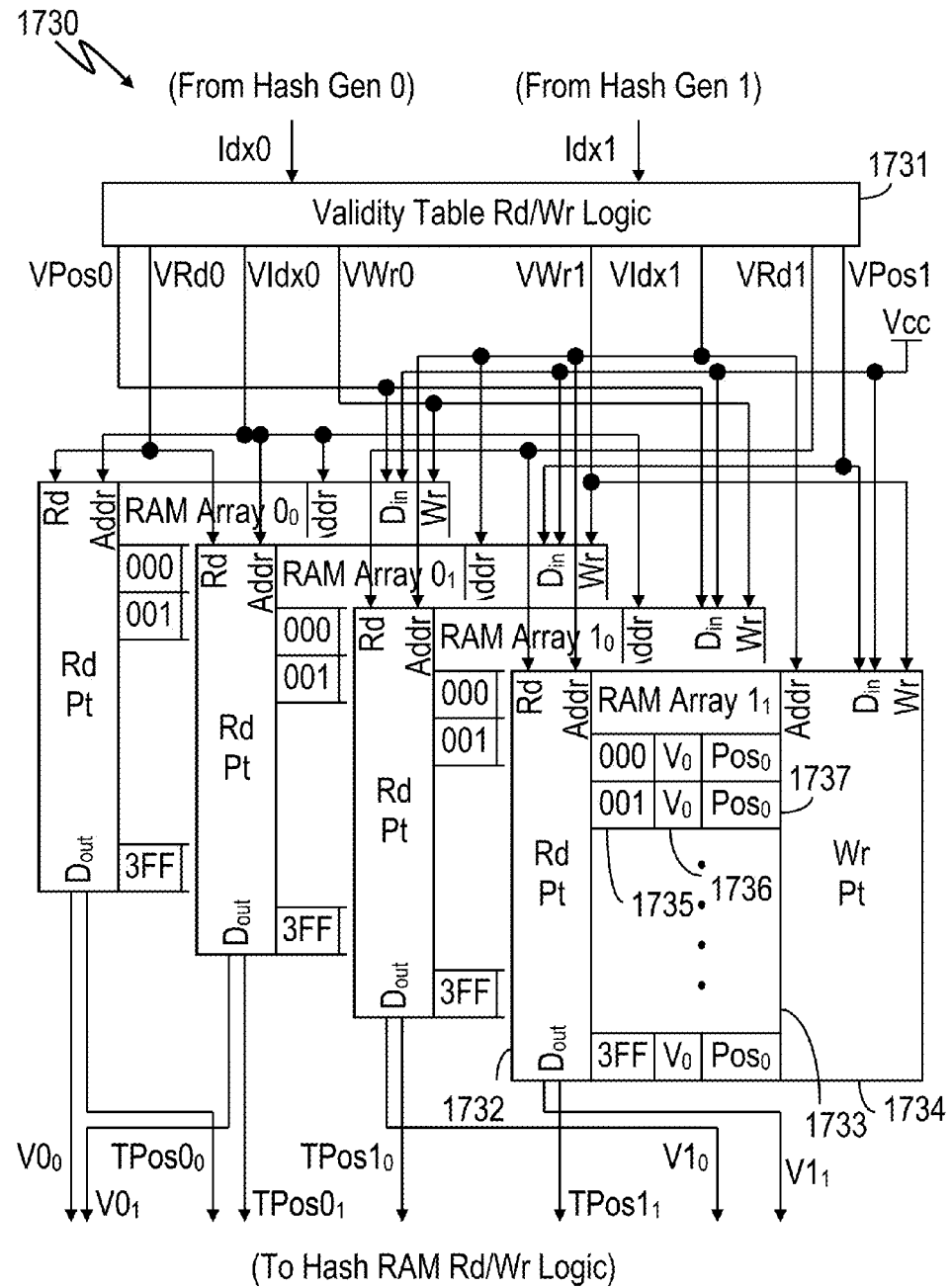
FIG. 17B shows a block diagram of validity table 1730 of FIG. 17A, implemented as four dual-port RAMs, in accordance with at least some example embodiments.

FIG. 17B illustrates an example embodiment of validity table 1730 of FIG. 17A. Because validity table 1730 includes significantly more information than validity table 1330 of FIG. 9A, in at least some example embodiments validity table 1730 of FIGS. 17A and 17B is implemented using four, dual-port RAM arrays rather than flip-flops (e.g., using FPGAs that include RAM arrays). Two arrays are read and written using the index and data from the same lane, while the other two arrays are read using the index from one lane, but written using the index and data of the opposing lane. Thus, RAM array $0_0$ is read and written to using validity table index 0 (Vldx0) and validity table position data 0 (VPos1); RAM array $0_1$ is read using index 0, but written to using index 1 (Vldx1) and position data 1 (VPos1); RAM array $1_0$ is read using index 1, but written to using index 0 and position data 0; and RAM array 1 is read and written to using index 1 and position data 1. In this manner, all reads of the arrays are performed in parallel, and all writes to the array are also performed in parallel.

Figure 17C:
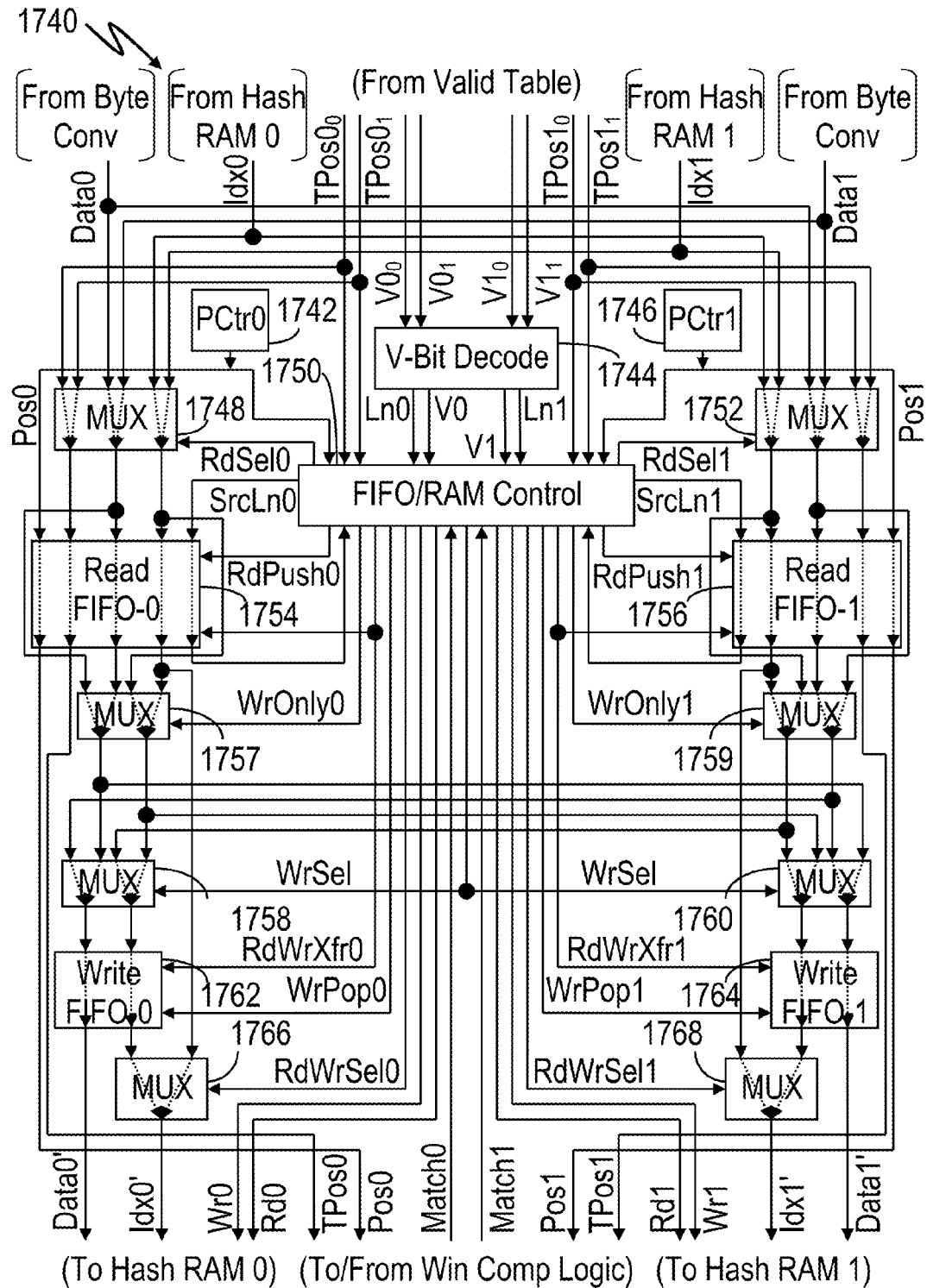
FIG. 17C shows a block diagram of hash RAM read/write logic 1740 of FIG. 17A, in accordance with at least some example embodiments.
Figure 17D:
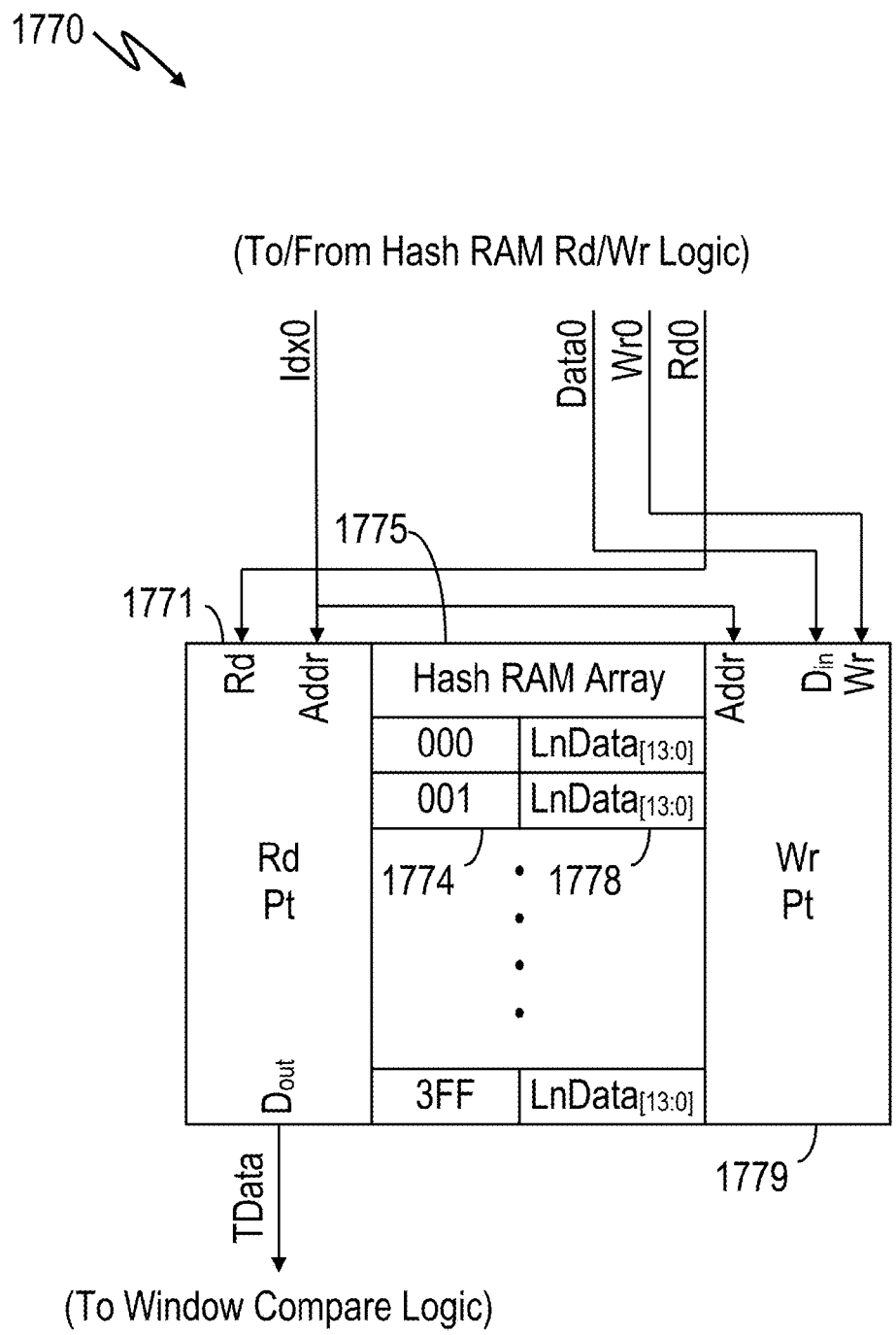
FIG. 17D shows a block diagram of a hash RAM 1770 (corresponding to hash RAMs 1770-0 and 1770-1 of FIG. 17A), in accordance with at least some example embodiments.

Referring now to FIG. 17C, the four table position values are presented to FIFO/RAM control 1750 of hash RAM read/write logic 1740. If the validity bits indicate that two back-to-back hash RAM reads may be required, the offset values between the current position and the table position for each lane are calculated by FIFO/RAM control 1750, and the index, position, table position, data and source lane information for the lane with the smallest offset is loaded into the appropriate read FIFO first, followed by the set of values for the other lane. This will cause the hash RAM read corresponding to the smaller offset value to be performed first, thus favoring smaller offset values (and potentially smaller code words) in cases where both hash RAM lane locations store matching values. Because the position information is not stored in the hash RAMs, only the index and data values are forwarded to the write FIFOs. FIG. 17D shows hash RAM 1770 (representative of hash RAMs 1770-0 and 1770-1 of FIG. 17A), which contains only lane data ($LnData_{[13:0]}$).

Figure 18:
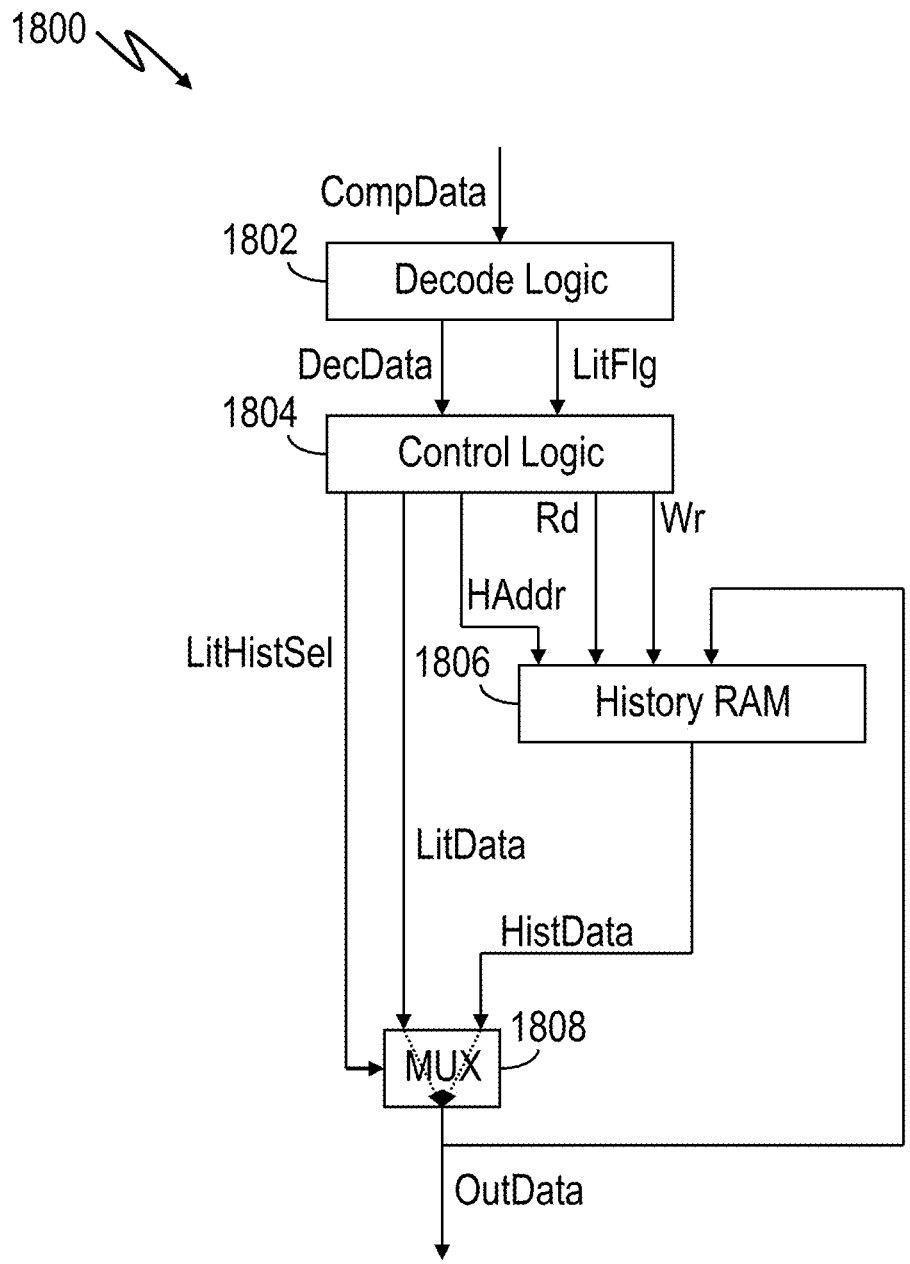
FIG. 18 shows a block diagram of decompression engine 1800, in accordance with at least some example embodiments.

Chunk data decompression engine 1800 is shown in FIG. 18, in accordance with at least some example embodiments. Compressed data (CompData), formatted as described above and shown in FIG. 15B, is received and decoded by decode logic 1802. If a literal record is identified, the literal data is output as the decoded data (DecData), and the literal flag (LitFlg) is asserted. If a match record is identified by decode logic 1802, the offset and length parameters of the match record are output as the decoded data, and the literal flag is de-asserted. The decoded data and the literal flag are provided to control logic 1804. If the literal flag is asserted, control logic 1804 configures multiplexer (MUX) 1808 (via the literal/history select (LitHistSel) signal) to output the literal data (LitData) as the output data (OutData). The output data is fed back to the input of history RAM 1806, where the output data is written by control logic 1804 to history RAM 1806 (via the Write (Wr) signal). The current location within the chunk being de-compressed is used as the history RAM address (HAddr). If the literal flag is not asserted, control logic 1804 configures multiplexer 1808 to output historical data (HistData) read from history RAM 1606 by control logic 1804 (via the read (Rd) signal). The offset value included in the decoded data is used as the initial history RAM address, which is incremented until all of the matching bytes have been output, as indicated by the length value included in the decoded data. Data is decoded and output until an EOF record for the chunk is encountered. The EOF record is not output. As with the literal data case, output data is fed back to the input of history RAM 1806, where the output data is written by control logic 1804 to history RAM 1806 (via the Write (Wr) signal).

Hardware and Software Implementation Example

Figure 19:
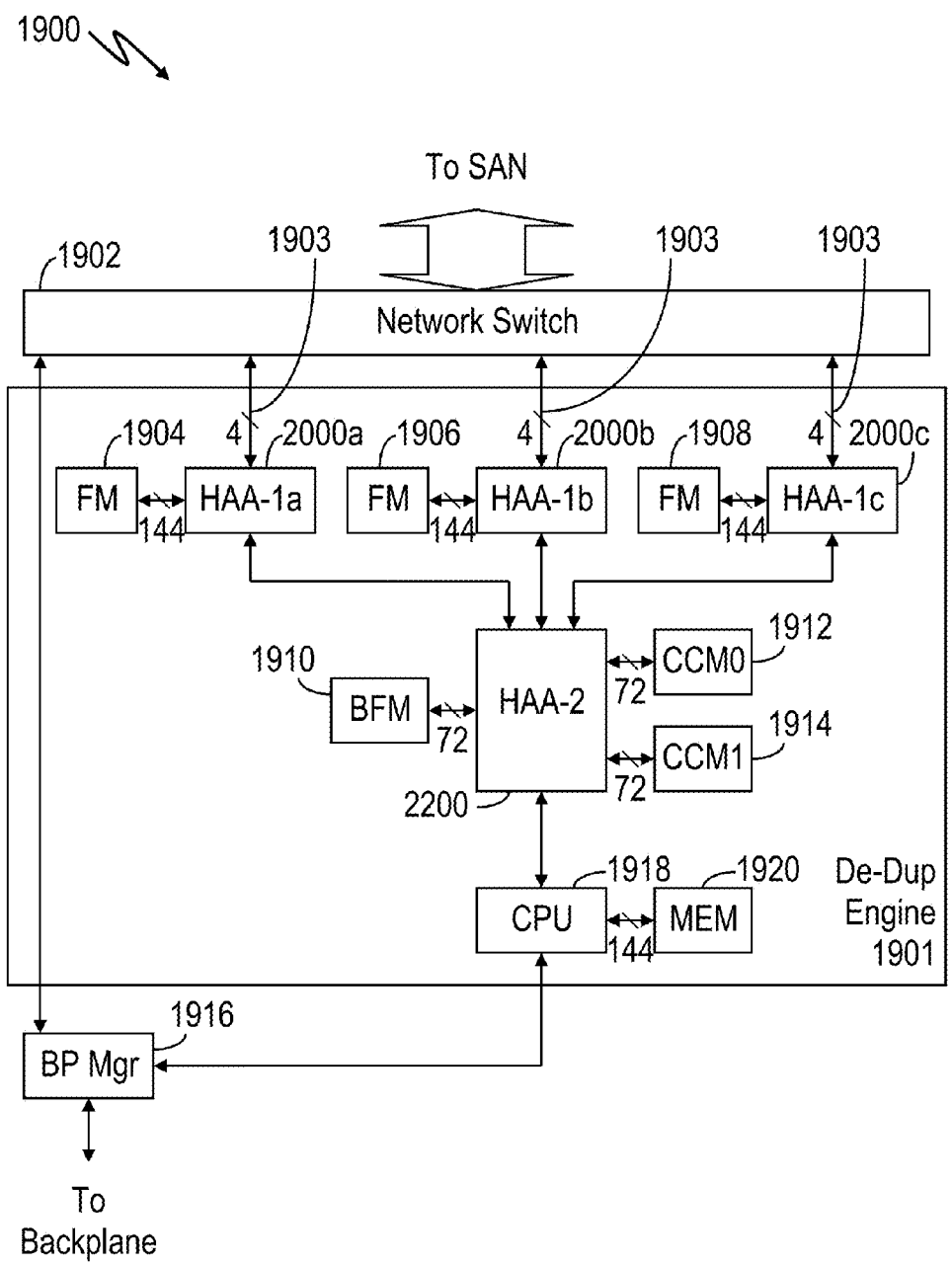
FIG. 19 shows a high-level block diagram of a hardware implementation of deduplication blade 300 of FIG. 2, in accordance with at least some example embodiments.

FIG. 19 shows an example of a data deduplication and compression system 1900, constructed in accordance with at least some embodiments, which is configured for installation within a director-level switch used to form at least part of the SAN. Although the system shown and described in FIG. 19 does not include the partitioning scheme previously described, such partitioning has been omitted from the example solely for simplicity. The examples presented are equally applicable to embodiments that implement partitioning.

The embodiment shown implements a deduplication engine 1901 using a combination of hardware and software. The example system 1900 includes a network switch 1902 that provides connectivity between deduplication engine 1901 and a SAN. The network switch 1902 couples to each of three hardware assist application specific integrated circuits or hardware assist ASIC modules within deduplication engine 1901 (HAA-1a module 2000a, HAA-1b module 2000b, and HAA-1c module 2000c) via four, 4-Gbps Fibre Channel ports, through which data is received from and transmitted to both storage devices and hosts. Each HAA-1 module couples to an associated frame memory module (FM 1904, FM 1906 and FM 1908 respectively), and all of the HAA-1 modules couple to a single HAA-2 module 2000. HAA-2 module 2000 also couples to three memory modules: Bloom filter memory (BFM) module 1910, CAS cache memory 0 (CCM0) module 1912, and CAS cache memory 1 (CCM1) module 1914. HAA-2 module 2200 also couples to CPU 1918, which executes the deduplication engine software modules described herein. CPU 1918 further couples to both memory module (MEM) 1920 and backplane manager (BP Mgr) 1916. Backplane manager 1916 couples to both network switch 1902 and the backplane of the director-level switch in which example system 1900 is installed.

Each of the HAA-1modules provides hardware implementations of both deduplication functions and compression/decompression functions that require processing all of the data within a frame. These functions include the Rabin Fingerprint generation used to define chunks, the SHA-256 and CRC-64 generation used to produce chunk identifiers, the CRC-64 checking used to verify data integrity at various points during chunk processing, and both the compression and decompression of the data within the chunks. The HAA-2 module provides hardware implementations of deduplication functions that only require processing metadata associated with the frame data, including the Bloom filter and the CAS cache. Each of the different types of hardware assist ASIC modules, as well as their interfaces to the software modules executing on the CPU, are explained in more detail below.

Hardware Assist ASIC 1

Figure 20:
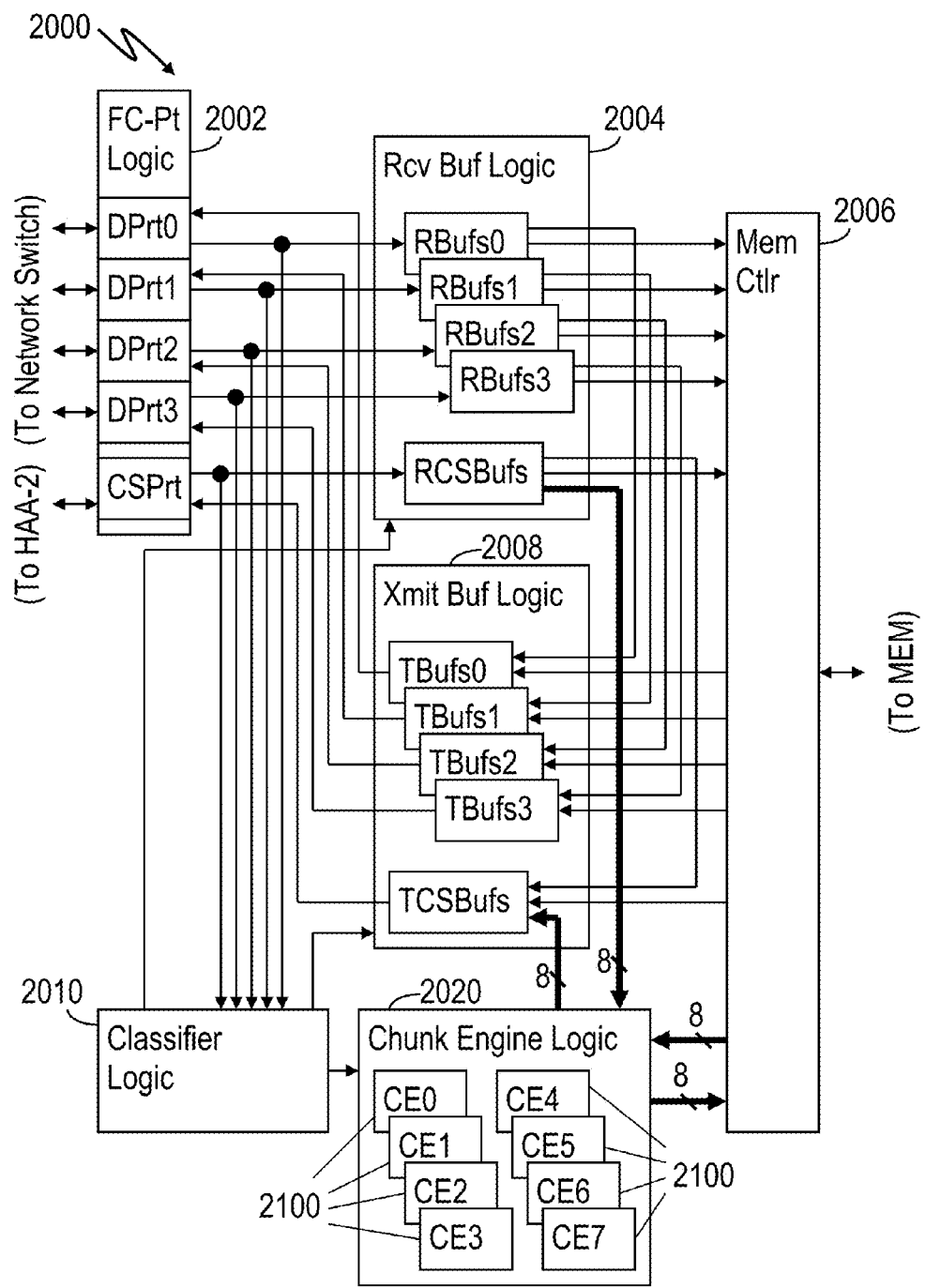
FIG. 20 shows a block diagram of a hardware assist ASIC module, in accordance with at least some example embodiments.

FIG. 20 shows a block diagram of a hardware assist ASIC module 2000, representative of HAA-1 modules 2000a, 2000b and 2000 and constructed in accordance of at least some example embodiments. HAA-1 module 2000 includes Fibre Channel port logic (FC-Pt Logic) 2002, which includes four, 4-Gbps Fibre Channel data ports (data port 0 (DPort0) through data port 3 (DPort3)) that provide connectivity to network switch 1902 of FIG. 19. HAA-1 module 2200 also includes a fifth, 4-Gbps Fibre Channel command and status port (CSPrt) that provides connectivity to HAA-2 module 2200 of FIG. 17. All five ports of FC port logic 2002 couple to both receive buffer logic (Rcv Buf Logic) 2004 and transmit buffer logic (Xmit Buf Logic) 2008. Incoming serial data is converted to 32-bit parallel data, and the data from each data port of FC port logic 2002 is transferred from a receive port to a corresponding set of receive data buffers (RBufs0-3), and incoming control and status frames are transferred from the control and status port of FC port logic 2002 to the receive control and status buffers (RCSBufs) of receive buffers 2004.

The headers for incoming data frames, as well as for incoming control and status frames, are also transferred to classifier logic 2010. Classifier logic 2010 decodes the headers and performs various internal control functions, including identifying incoming data frames, sequencing of the incoming frames, and instructing the receive buffer logic to extract frame payloads and store the extracted payloads in the external frame memory coupled to the HAA-1 module (via memory controller (Mem Ctrl) 2006, which couples to receive buffer logic 2004). Classifier 2010 also recognizes CPU-originated commands (received on the command and status port from the HHA-2 module), which are decoded as either commands directed to the HHA-1 module (e.g., a command to compress a data chunk), or frames to be forwarded to a data port for transmission to either a host or a storage device. Classifier 2010 also performs at least part of the management of the receive buffers of receive buffer logic 2004.

Extracted payload data stored in external frame memory is transferred (via memory controller 2006) from the frame memory module to chunk engine (CE) logic 2020, which includes eight independent chunk engines (CE0 through CE7) 2100 for processing frame data. Each individual chunk engine has two separate data paths from the frame memory module (via memory controller 2006). One path provides extracted frame data from the frame memory module for processing by the chunk engine, the other provides processed frame data from the chunk engine back to the frame memory module. These paths are shown in the example of FIG. 20 as 8 data paths from chunk engine logic 2020 to memory controller 2006, and 8 data paths from memory controller 2006 to chunk engine logic 2020. If the extracted frame data originates from a host, the frame data may optionally be processed for deduplication, data compression, or both, before being written to a storage device. If the extracted frame data originates from a storage device, the frame data may optionally be decompressed before being transmitted to a requesting host.

Once the data is processed by a chunk engine within chunk engine logic 2020, the resulting processed data is stored back into the frame memory module via memory controller 2006. Chunk engine logic couples to the receive control and status buffer of receive buffer logic 2004 via 8 separate data paths (one for each chunk engine within chunk engine logic 2020), and similarly couples to the transmit control and status buffer of transmit buffer logic 2008, also via 8 separate data paths (also one for each chunk engine). The receive buffer paths provide control data from the CPU to each chunk engine, and the transmit buffer paths provide status data from each chunk engine back to the CPU.

Continuing to refer to the example embodiment of FIG. 20, each of the data ports, as well as the control and status port, couple to transmit buffer logic 2008, which includes transmit buffer sets 1 through 3 (TBufs0 through TBufs3), as well as a set of control and status transmit buffers (TCSBufs). Data processed by system 1900 and stored in the corresponding HAA-1 frame memory module is transferred from the frame memory module to the transmit buffer within transmit buffer logic 2008 corresponding to the data port coupled to the destination of the processed frame data. The data is subsequently transferred to the corresponding data port for serialization, formatting and transmission to its destination (host or device) via network switch 1902 of FIG. 19.

Figure 21:
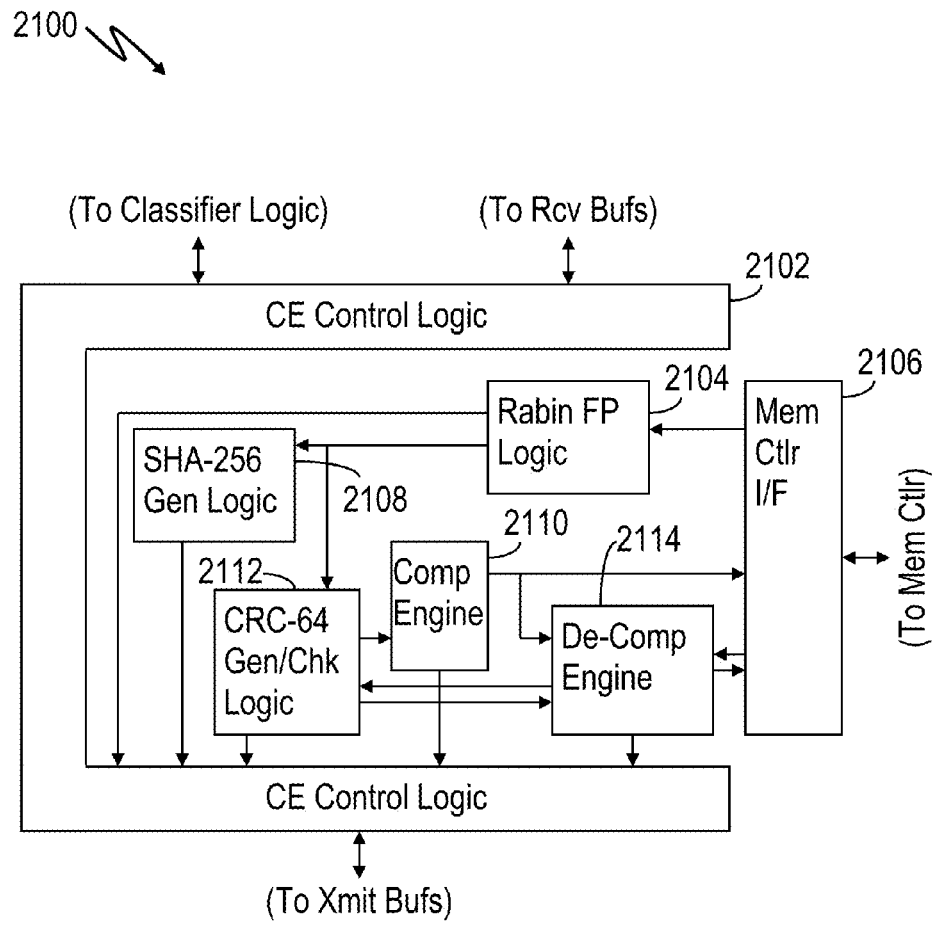
FIG. 21 shows a block diagram of one of the chunk engines of FIG. 19, in accordance with at least some example embodiments.

FIG. 21 shows a more detailed block diagram of a chunk engine 2100, constructed in accordance with at least some example embodiments. Extracted frame data destined for a storage device is received by memory controller interface (Mem Ctlr I/F) 2106 from the frame memory and is forwarded to Rabin fingerprint logic (Rabin FP Logic) 2104. Rabin fingerprint logic 2104 couples to memory controller interface 2106, secure hash algorithm 256 generation logic (SHA-256 Gen Logic) 2108, and cyclic redundancy check 64 generation and check logic (CRC-64 Gen/Chk Logic) 2112), and applies the Rabin fingerprint calculation previously described to the frame data to determine the boundaries that define each chunk. The data for each chunk is forwarded by Rabin fingerprint logic 2104 to both SHA-256 generation logic 2108 and CRC-64 generation and check logic 2112, which each applies its respective algorithm to the chunk data to derive SHA-256 and CRC-64 values for the chunk. The chunk boundary information, SHA-256 value and the CRC-64 value for each chunk are all forwarded to chunk engine control logic 2102 (coupled to Rabin fingerprint logic 2104, SHA-256 generation logic 2108 and CRC-64 generation and check logic 2112), which forwards the data to transmit buffer logic 2008 of FIG. 20 for subsequent transmission to CPU 1918 of FIG. 19.

Continuing to refer to FIG. 21, the data is forwarded by CRC-64 generation and check logic 2112 to data compression engine (Comp Engine) 2110 (which are coupled to each other) for data compression as previously described. Data compression engine 2110 couples to both data decompression engine (De-Comp Engine) 2114 and memory controller interface 2106, and forwards the compressed data to both. The compressed data is forwarded by memory controller interface 2106 to memory controller 2006 of FIG. 20 for subsequent storage in the frame memory (e.g., frame memory 1906 of FIG. 19). Concurrently, the compressed data is decompressed by data decompression engine 2114, which couples to, and forwards the decompressed data to, CRC-64 generation and check logic 2112. The CRC-64 value is calculated for the decompressed data and compared to the CRC-64 value calculated before compression of the data to verify that no errors were introduced by the compression of the data. Data compression engine 2110 and data decompression engine 2114 are each coupled to chunk engine control logic 2102, and each provides the status of their operations for each chunk upon completion. This status, together with the results of the CRC-64 verification check of the chunk, is combined with the Rabin fingerprint, SHA-256 and CRC-64 data for the chunk, which is all forwarded by chunk engine control logic 2102 for subsequent transmission to CPU 1918, as previously described.

Data decompression engine 2114 also couples to memory controller interface 2106, from which data decompression engine 2114 receives compressed chunk data, stored in the frame memory, for decompression. The decompressed chunk data is forwarded back to memory controller interface 2106 for subsequent storage in the frame memory, and is also forwarded to CRC-64 generation and check logic 2112 to calculate the CRC-64 value for each chunk, and to compare the value with the stored CRC-64 value for the chunk. The results of the decompression and CRC-64 check are forwarded to chunk engine control logic 2102 for subsequent transmission to CPU 1918, as previously described.

Chunk engine control logic 2102 also couples to classifier logic 2010 of FIG. 20, which controls at least part of the configuration and operation of chunk engine control logic 2102 based upon command messages received from CPU 1918 of FIG. 19, and decoded by classifier logic 2010. These commands are forwarded to chunk engine control logic 2102 from the receive control and status buffers of receive buffer logic 2004, to which chunk engine control logic 2102 also couples.

Hardware Assist ASIC-2

Figure 22:
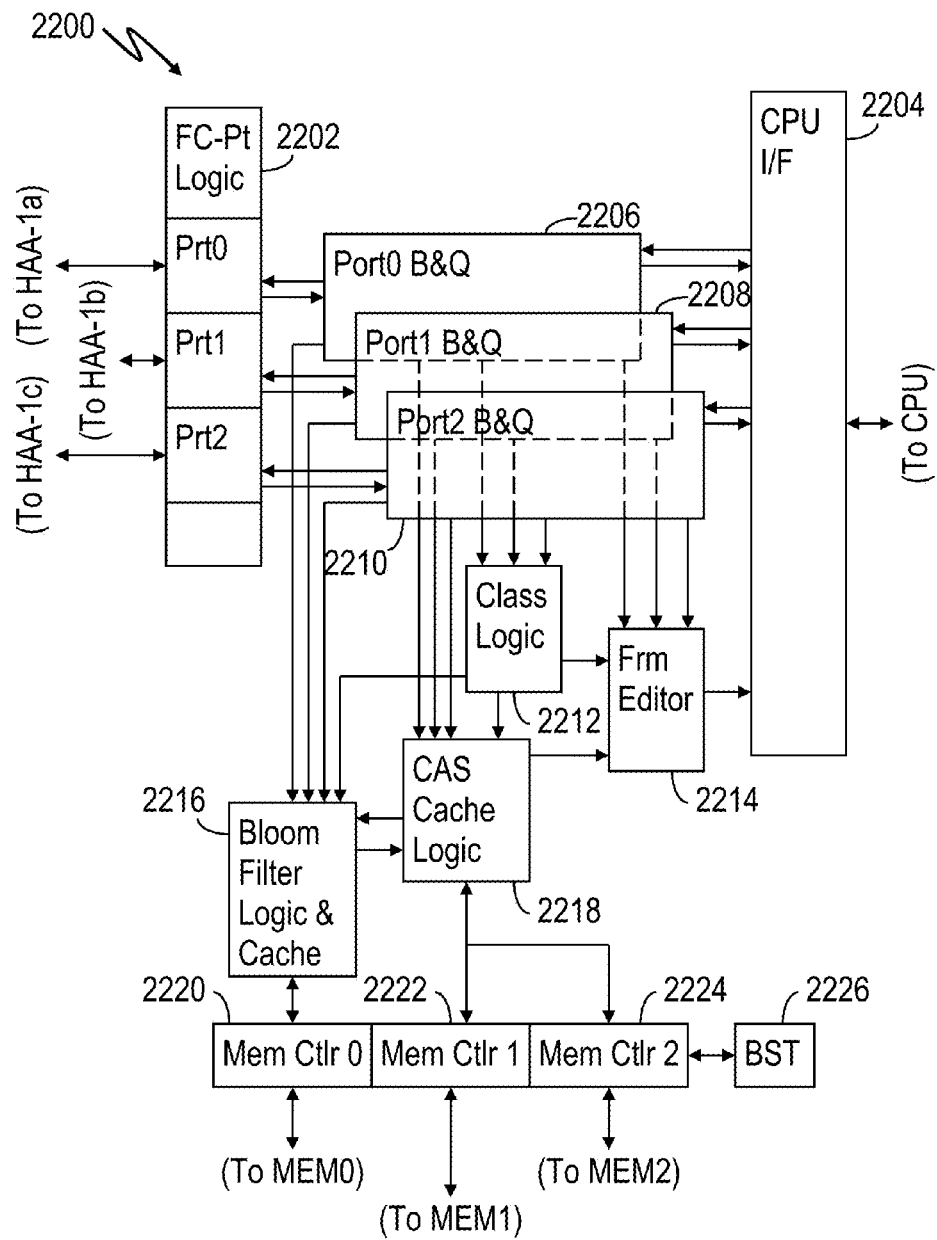
FIG. 22 shows a block diagram of hardware assist ASIC 2 of FIG. 19, in accordance with at least some example embodiments.

FIG. 22 shows a block diagram of a hardware assist ASIC 2 module 2200, constructed in accordance with at least some example embodiments. Fibre Channel port logic 2202 provides connectivity to each of the three HAA-1 modules of FIG. 19 through ports 0 through 2 (Prt0 through Prt 2). Each port couples to a corresponding port buffers and queues module (Port0 B&Q 2206, Port1 B&Q 2208 and Port 2 B&Q 2210), and each port buffers and queues module couples to CPU interface (CPU I/F) 2204, Bloom filter logic and cache 2216, CAS cache logic 2218, classifier logic (Class Logic) 2212 and Frame editor (Frm Editor) 2214. Data, command and status frames received from the HAA-1 modules and/or the CPU are initially stored in a corresponding receive buffer, and the frame header is decoded by classifier logic 2218. If the frame is not directed to the HAA-2 module, classifier logic 2212 causes frame editor 2214 to forward the frame to its destination (e.g., a command frame directed to HAA-1b and received from the CPU is forwarded to port 1 for transmission to HAA-1b).

If a frame received by HAA-2 module 2200 is a command frame from the CPU directed to the HAA-2 module, classifier logic 2218 causes the frame to be forwarded to the appropriate module. Thus, for example, if the CPU issues a CAS cache write command, classifier logic 2218 causes the command frame (which includes the relevant updated CAS entry and/or metadata information to be written) to be forwarded to CAS cache logic 2218. If a frame received by HAA-2 module 2200 is a frame that includes chunk information from an HAA-1 module (e.g., the chunk boundaries, SHA-256 data and CRC-64 data for a processed chunk to be stored), classifier logic 2212 cause frame editor 2214 to forward the frame received from the HAA-1 module to both Bloom filter logic and cache 2216 and to CPU 1918 of FIG. 19. This triggers a Bloom filter lookup, and a corresponding CAS cache lookup if the Bloom filter indicates that the chunk identified in the received frame already exists on the relevant storage device. The results of the Bloom filter lookup and CAS cache lookup (if performed) are subsequently appended to the received frame as it is forwarded to CPU 1918, thus providing the software executing on the CPU with the information necessary to process the chunk.

Bloom filter logic and cache 2216 couples to memory controller 0 (Mem Ctlr 0) 2220, and CAS cache logic 2218 couples to both memory controller 1 (Mem Ctlr 1) 2222 and memory controller 2 (Mem Ctlr 2) 2224. Each memory controller couples to a corresponding memory module (BFM, CCM0 and CCM1 of FIG. 19), and also to built-in self test (BST) module 2226 (used to initialize blocks of memory within each of BFM, CCM0 and CCM1, e.g., as part of a Bloom filter reconstruction). Memory controller 0 (2220) operates to control and provide access to the BFM module, which stores the status bits for the Bloom filter arrays corresponding to each of the physical LUNs managed by data deduplication and compression system 1900 of FIG. 19. The Bloom filter cache is maintained in a smaller, separate area of memory within Bloom filter and cache 2216. Memory controllers 1 and 2 (2222 and 2224) similarly operate to control and provide access to the CCM0 and CCM1 modules, which store the CAS cache entries for the CAS caches corresponding to each of the physical LUNs managed by data deduplication and compression system 1900 of FIG. 19.

CPU and Software

Referring now to both FIGS. 3 and 19, CPU 1918 executes the software modules that perform the remaining storage-related operations not performed by the hardware assist ASIC modules, which are shown as components of De-Dup Engine S/W 350 in FIG. 3. These include I/O engine 352, volume manager 354, metadata management module 356, thin provisioning module 358, read/write engine 360 and defragmentation module 362, each already described above. By using dedicated hardware to implement at least some of the deduplication and/or compression functions as previously described, these software modules require significantly less time to perform their functions, when compared to what would be required if the functions implemented in hardware were instead implemented in software executing on the CPU (given the same CPU operating at the same clock rate). When such hardware off-loading is combined with the previously described data/metadata organization and caching, significant performance improvements may be achieved over systems that do not implement such hardware off-loading and data/metadata organization and caching, as shown in more detail below.

Example Data Flow

The following description illustrates how data is processed by data deduplication and compression system (DCS) 1900 of FIG. 19. A high level overview of the example data flow is first presented, followed by a more detailed description of the same data flow.

In the present example, a request to write data to a virtual LUN managed by DCS 1900 is received from a host at an input port of one of the HAA-1 modules. The HAA-1 module identifies the write request, configures the HAA-1 module hardware to receive the data frames associated with the request, and signals to the requesting host that it is ready to receive the data frames. Once the data frames begin to arrive at an HAA-1 module input port, hardware within the HAA-1 module subdivides the incoming frames into chunks, calculates chunk identifiers on the fly for each chunk, and compresses and stores the chunks in memory for later retrieval. As the processing of each chunk is completed, information for each corresponding chunk, including the chunk identifier generated by the HAA-1 module, is forwarded to the HAA-2 module for further processing. The HAA-2 module uses the chunk identifiers received from the HAA-1 module to determine whether the chunk is a duplicate of another chunk already stored on the system. The result of this determination is forwarded to the CPU where software executing on the CPU takes action appropriate action in response.

If a chunk is a duplicate, the software updates the metadata of the corresponding chunk already stored on the system and the corresponding vLUN location map, and a command is issued by the CPU to the appropriate HAA-1 module (via the HAA-2 module) to discard the buffered chunk. Updates to the CAS info (part of the CAS index) are also provided to the HAA-2 module, which maintains the CAS cache. If the information received by the HAA-2 module from the HAA-1 module indicates that the chunk is a new, unique chunk, the software allocates storage space for the data, creates the corresponding metadata, commands the HAA-2 module to update the CAS cache, and commands the HAA-1 module to transmit the buffered chunk across the SAN to the storage device where the storage space has been allocated. Upon completion of the write operation, the software executing on the CPU causes a message to be transmitted to the host node that originated the write request, which indicates the completion status of the write operation.

Examining the above-described write operation in more detail, and referring to the example intelligent storage system of FIG. 1A, the example data flow presented in FIG. 1C, the example software modules shown in FIG. 3, the example metadata structures and engines of FIG. 5A, and the example hardware embodiment of FIGS. 19-22, four new blocks (B3 through B6) each within one of virtual data units 3 through 6 (U3 through U6) are to be written to vLUN 152 of FIG. 3. vLUN 152 is presented by volume manager software 354 (FIG. 3), executing on CPU 1918 of DCS 1900 (FIG. 19), to hosts coupled to SAN 102 (FIG. 1A). A write request message is received from a host by DCS 1900, and is routed by network switch 1902 (FIG. 19) to a data port of an HAA-1 module (FIG. 19). For purposes of this example, the received message is routed to port 0 of HAA-1b module 2000b, which has previously been configured to receive data addressed to vLUN 152. In this example, vLUN 152 is configured to store deduplicated and compressed data on pLUN 160 (FIG. 1C).

The write request message for blocks 3 through 6 is initially stored within the receive buffers for port 0 of receive buffer logic 2004 (FIG. 20). Classifier logic 2010 (FIG. 20) decodes the header of the received message, identifies it as a write request, and causes the message to be forwarded to HAA-2 2200 (FIG. 19), which in turn forwards the message to CPU 1918. Metadata management module software 356 (FIG. 3) executing on CPU 1918 responds to the forwarded write request by directing a command to HAA-1b 2000b (via HAA-2 2200) that causes classifier logic 2010 to prepare frame buffers in frame memory 1906 (FIG. 19) to receive and extract the incoming data (blocks 3 through 6 of FIG. 3). Classifier logic 2010 then causes a message to be sent back to the host (via the port 0 transmit buffers of transmit buffer logic 2008 (FIG. 20)), that indicates to the host that vLUN 152 is ready to accept the data to be written. The host transmits one or more messages containing data block 3, which are received and stored within the port 0 receive buffers of receive buffer logic 2004. Classifier logic 2010 identifies the received message(s) as (a) data message(s) and when a buffering threshold is reached, causes a message to be sent to CPU 1918 (via HAA-2 2200), which notifies metadata management module software 356 that the threshold has been reached. Metadata management module software 356 responds by sending a command to HAA-1b 2000b (via HAA-2 2200) to generate a fingerprint, which causes classifier logic 2010 to instruct receive buffer logic 2004 to extract the payload (block 3), and to store the extracted payload within the buffers previously reserved within frame memory 1906.

As the block is transferred into frame memory 1906, classifier logic 2010 further instructs one of the chunk engines 2100 within chunk engine logic 2020 (FIG. 20) to start reading in the extracted data for block 3 from frame memory 1906. The chunk engine 2100 reads in the extracted data for block 3, which is first processed by Rabin fingerprint logic 2104, and then forwarded to both SHA-256 generation logic 2108 and CRC-64 generation and check logic 2112 (FIG. 21). Data is forwarded through each module of the chunk engine as it is received in a continuous stream so as to reduce any processing-related latency. Rabin fingerprint logic 2104 defines a single chunk for block 3 since the block is 1,492 bytes long (see vLUN location map 162, FIG. 1C), which is less than the 2,048 bytes required before Rabin fingerprint logic 2104 begins to search for a chunk anchor point. After identifying and compressing the one chunk for block 3, and completing the SHA-256 and CRC-64 value calculations, the chunk boundaries, SHA-256 and CRC-64 information are all forwarded by the chunk engine to chunk engine control logic 2102 (FIG. 21) for subsequent transmission to HAA-2 2200.

HAA-2 2200 receives the information for the one chunk of block 3 on port 1, which is stored within Buffers and Queues 2208 (FIG. 22). Classifier logic 2212 (FIG. 22) concurrently receives the header for the received message, identifying the message as a chunk information message. Classifier 2212 instructs Bloom filter logic and cache 2216 (FIG. 22) to perform a Bloom filter look up for the chunk based upon the chunk ID provided within the body of the message (i.e., the concatenation of the SHA-256 and CRC-64 values for the chunk). Because block 3 includes the same data as block 1, which is already stored on the system, Bloom filter logic and cache 2216 returns an indication that the chunk may already exist on pLUN 160. The positive indication from the Bloom filter triggers a CAS index lookup (FIG. 5A) by CAS cache logic 2218 (FIG. 22), which performs the functions of fingerprint lookup engine 520 of FIG. 5A. If the bucket for the CAS bucket block is already loaded within the CAS cache for pLUN 160 (e.g., CAS cache 540 of FIG. 5A, stored within CCM0 1912 of FIG. 19), the bucket data is read. The results of the Bloom filter lookup, the success/failure status of the CAS cache lookup (if performed), and the CAS bucket data (if a performed lookup is successful) are subsequently appended to the chunk information message previously received, and the modified chunk information message is transmitted to CPU 1918 for further processing.

Upon receipt of the modified chunk information message, metadata management module software 356 examines the received chunk information message. In this example, the received chunk information for block 3 indicates a possible match from the Bloom filter lookup, and a confirmed match from the CAS cache read. If the status value within the received chunk information indicates that the CAS cache read was not successful, the CPU sends a message to one of the HAA-1 modules to read the required CAS buck block from the CAS pLUN (e.g., pLUN 544 of FIG. 5A). In at least some example embodiments, each CAS bucket block is implemented as a B+ search tree (not shown), wherein the root node is store in memory and includes 16 keys corresponding to 16 leaves, with each leaf including 16 CAS cache entries. When a CAS pLUN read is needed, the B+ tree is used to identify which group of 16 CAS cache entries (i.e., which leaf) to read into the CAS cache. The response to the read request is subsequently sent by the HAA-1 module to the HAA-2 module, which forwards the message to CPU 1918 to provide Metadata management module software 356 with the requested CAS B+ tree leaf.

If the CAS entry is located within the B+ leaf read from the CAS pLUN, a message is sent by metadata management module software 356 to the HAA-2 module, which uses the entry to update the least recently used entry for the corresponding bucket block within the CAS cache (if the bucket block is already loaded in the CAS cache). If the entry is not found, it is added to the bucket block, the B+ tree is updated, and a message is sent by metadata management module software 356 to the HAA-2 module, which uses the new entry to update the least recently used entry for the corresponding bucket block within the CAS cache if the bucket block is already loaded in the CAS cache. If the bucket block is not already loaded in the CAS cache, it is loaded into the cache with the new entry as Entry[0]. A message is also transmitted by the CPU to an HAA-1 module (via the HAA-2 module) to update the CAS pLUN with the new entry.

Metadata management module software 356 uses the metadata record pointer (included in the bucket data added to the chunk information message by HAA-2 2200) to locate the corresponding metadata record for the chunk data already stored on pLUN 160. Metadata management module software 356 first attempts to locate the metadata page containing the required metadata record in the metadata cache (e.g., metadata cache 550 of FIG. 5A), which is maintained within CPU memory 1920 (FIG. 19). If the required metadata page is not already loaded in the metadata cache, the CPU reads the required metadata page from the CAS metadata pLUN (e.g., pLUN 554 of FIG. 5A) into the metadata cache. The chunk information is read from the metadata record corresponding to the chunk already stored on pLUN 160 that matches the chunk from block 3, and the entry within vLUN location map 162 (also maintained within CPU memory 1920) corresponding to block 3 is updated by volume manager software 354 to reflect the metadata record pLUN location information. The compressed chunk data for block 3 stored in frame memory 1906 is thus ignored, and will later be discarded when the allocated resources within HAA-1b 200b are released upon completion of the processing of the write request.

While the chunk information message for block 3 is being processed by CPU 1918, HAA-1b 2000b continues to receive data messages from the host, and to process the remaining blocks stored within frame memory 1906 as they are extracted from each received message or set of messages corresponding to each block. After processing block 3, one or more data messages that include block 4 is received, and the data for block 4 is extracted from the payload of the corresponding message(s) and stored within frame memory 1906. Classifier 2010 causes a chunk engine 2100 to process block 4 in the same manner as block 3, which forwards the chunk engine processing results for transmission to HAA-2 2200 as a chunk information message for block 4. Unlike block 3, however, the one chunk for block 4 (which is also less than 2,048 bytes) does not match any chunk already stored on the system, which is indicated by the results from the Bloom filter. As a consequence, no CAS cache lookup is performed, since the Bloom filter does not produce false negatives and verification of the Bloom filter results is not required.

The modified chunk information message for block 4 is received by metadata management module software 356, which recognizes from the Bloom filter results that the chunk for block 4 is a new chunk and passes the chunk information to volume manager software 354. Volume manager software 354 in turn passes the chunk information to thin provisioning module software 358 (FIG. 3; also executing on CPU 1918), which allocates a physical unit on pLUN 160 for the data if a physical unit corresponding to virtual unit 4 (U4) hasn't already been allocated (e.g., due to a previous write of other data within virtual unit 4). Once allocated, or if the unit is already allocated, data space is assigned for the compressed chunk of block 4 and the start pLUN LBA is provided by thin provisioning module software 358 to volume manager software 354. Volume manager software 354 in turn uses the information to create a new entry within vLUN location map 162 that maps the corresponding vLUN LBA of the chunk for block 4 to the assigned pLUN data space.

The pLUN location information for the block 4 chunk is passed by volume manager software 354 to metadata management module software 356, which creates a new metadata record for the new chunk, which is stored within either an existing metadata page, or a newly allocated metadata page. The chunk data and metadata allocation information is then passed by metadata management module software 356 to read/write engine software 360 (FIG. 3; also executing on CPU 1918), which generates a data transfer message and a metadata update message, both of which are forwarded to HAA-2 2200. Upon receipt of each of these messages, classifier logic 2212 of HAA-2 2200 causes frame editor 2214 to forward both messages to HAA-1b 2000b.

Upon receipt of metadata update message forwarded by HAA-2 2200, classifier logic 2010 of HAA-1b 2000b causes the CAS index data provided in the message to be written to the both the hash index table pLUN and the CAS info pLUN (e.g., hash index table pLUN 534 and CAS info pLUN 544 of FIG. 5), and further causes the metadata provided in the message to be written to the CAS metadata pLUN (e.g., CAS metadata pLUN 554 of FIG. 5). Upon receipt of the data transfer message forwarded by HAA-2 2200, classifier 2010 of HAA-1b 2000b causes the compressed data for the block 4 chunk, stored in frame memory 1906, to be written to the location on pLUN 160 indicated by the location information provided in the data transfer message. After both the metadata update and the data transfer have completed, classifier logic 2010 causes a completion status message to be sent back to CPU 1918 (via HAA-2 2200).

Processing continues for blocks 5 and 6, wherein block 5 (which includes a single, duplicate chunk) is processed in a manner similar to block 3, and block 6 (which includes a single, non-duplicated chunk) is processed in a manner similar to block 4. Upon completion of the processing of all four blocks, metadata management module software 354 transmits a command message to HAA-1b 2000b (via HAA-2 2200) that causes classifier 2010 to release all resources within HAA-1b 2000b associated with the transaction (e.g., the chunk engine(s) used to process the data, as well as the buffers within receive buffer logic 2004, frame memory 1906, and transmit buffer logic 2008). Classifier 201 further causes a write status message to be sent back to the host that originated the original write request, completing the processing of the request.

Throughput Performance

By offloading onto dedicated hardware operations that would otherwise be computationally intensive for a processor, and by organizing both the data and the metadata so as to initially store and subsequently maintain related data and metadata clustered together on the storage media and thus in cache memory, at least some embodiments of the deduplication and compression system of the present application can perform the operations described herein at the wire speed of the links that couple the system to a SAN. For example, DCS 1900 of FIG. 19 couples to a SAN through network switch 1902 via twelve, 4 Gbps Fibre Channel links 1903, thus providing an aggregate bandwidth of 48-Gbps for the system. Taking into account the encoding used in the Fibre Channel links (8B/10B encoding) as well as other associated overhead, each 4 Gbps link is actually capable of a wire speed data throughput of 3.32 Gbps (425 MBps), resulting in an actual aggregate bandwidth of 39.84 Gbps (4.98 GBps) for the system.

In order to process data at least as fast as it is received on a given Fibre Channel link, each data stream processed through a given HAA-1 port (e.g., port 0 of FIG. 20) transfers the de-serialized incoming data, 32 bits at a time, at a rate of 106.25 MHz. In the embodiments of FIGS. 19-21, chunk engines 2100 each have two data lanes and operate at 212.5 MHz. Because two bytes (one for each lane) are processed during each chunk engine processing cycle at twice the rate of the incoming de-serialized data, the chunk engines can process the incoming data at the full wire speed of 425 MBps. In other example embodiments, chunk engines 2100 each have four data lanes and operate at 106.25 MHz, and thus four bytes are processed during each chunk engine processing cycle at the same rate as the incoming de-serialized data. In each of these embodiments, even if data is being input and output concurrently on all four ports of an HAA-1 module, because eight chunk engines are available, four chunk engines are available to actively process data for each of the four links 1903 associated with a single HAA-1 module, while the other four chunk engines are each available to be configured to process another chunk without having to wait for the current processing of chunks by any of the first four chunk engines to complete. Thus, data can continue to be processed by each HAA-1 module at the full, aggregate wire speed data rate of 130.6 Gbps in each direction without introducing interruptions or pauses in the data stream caused by delays introduced while the HHA-1 module is set up to process additional chunks.

Further, 800 MHz DDR2 RAMs are used for frame memories 1904, 1906 and 1908 and a 144-bit data bus (16 bytes of data plus 1 bit of parity per data byte), and data with parity is written to and read from the RAMs 288-bits at a time (256 of data, 32 of parity) at the 212.5 MHz rate. This memory configuration produces a 530.13 Gbps (6.64 GBps) burst data transfer rate both in and out of the frame memories. This burst rate is higher than the full aggregate data rate of 390.84 Gbps (4.98 GBps) of the four links 1903, and thus enabling data to be transferred in and out of the frame memories at the SAN wire speed data rate.

In order to sustain the wire speed data rates described above, the metadata associated with the streams for all three HAA-1 modules must also be processed within the time allotted. Using as an example a DCS 1900 used to deduplicate and compress data stored by one or more backup servers, a deduplication ratio of ma is assumed. Thus, 10% of the incoming data is unique, and 90% is duplicated. Also, because the chunk engines s of the example embodiment of FIG. 21 implement the random irreducible polynomial of equation (1) within Rabin fingerprint logic 2104, the average chunks size is 8 Kbytes. As a result, on average 652,800 chunks must be processed by HAA-2 2200 and CPU 1918 per second (4.98 GBps/8,192 bytes per chunk) in order to sustain an aggregate throughput of 48 Gbps for the system. Of these 652,800 chunks, 65,280 are unique chunks (10%), while 587,520 chunks are duplicates (90%). Assuming a CAS cache hit rate of 98%, 575,770 chunks will be located within the CAS cache, while 11,750 chunks will not be located within the CAS cache and will need to be read from the CAS pLUN (e.g., pLUN 544 of FIG. 5A). Table 4 summarizes these results.

TABLE 4

| | |
|---|---|
| Input Traffic Processed by DCS 1900 (FIG. 19) | 5,347,737,600 Bytes/sec |
| Average Chunk Size | 8,192 Bytes |
| Total Chunks/Second | 652,800 Chunks/sec |
| Duplicate Traffic % | 90% |
| Unique Traffic % | 10% |
| Unique Chunks/Second | 65,280 Chunks/sec |
| Duplicate Chunks/Second | 587,520 Chunks/sec |
| CAS Cache Hit Rate | 98% |
| CAS Cache Miss Rate | 2% |
| Duplicate Chunks/Second already in CAS Cache | 575,770 Chunks/sec |
| Duplicate Chunks/Second not already in CAS Cache | 11,750 Chunks/sec |

Table 5 provides a set of estimated instructions performed by CPU 1918 for the operations listed, and the resulting processing power required for CPU 1918 in order to process the above-described data at 48 Gbps.

TABLE 5

| | |
|---|---|
| # of Instructions to Process a Unique Chunk | 31,200 Instr. |
| Total Instructions/Second Unique Chunk Processing | 1,962,934,274 Instr./sec |
| # of Instructions to Process Duplicate Chunks already in CAS cache | 9,700 Instr. |
| Total Instructions/Second for Duplicate Chunks already in CAS cache | 5,382,592,266 Inst./sec |
| # of Instructions to Process Duplicate Chunks not already in CAS cache | 23,300 Instr. |
| Total Instructions/Second for Duplicate Chunks not already in CAS cache | 263,863,665 Inst./sec |
| Total # of Instructions/Second to Process All Chunks | 7,609,390,203 Inst./sec |
| I/O Operations (IOP)/Second | 78,643 Ops./sec |
| # of Instructions/IOP | 5,600 Inst. |
| Total # of Instructions/Second for IOPs | 440,401,920 Inst./sec |
| Total # Instructions/Second for Chunk-Related Operations | 8,049,792,123 Inst./sec |
| Processing Power Required in Billions of Instructions per Second (BIPS) | 8.05 BIPS |
| Additional Processing Power for Overhead and Additional Tasks | 25% |
| Total Processing Power Required for CPU 1918 to support 48 Gbps Deduplication and Compression | 10.06 BIPS |

In at least some example embodiments of DCS 1900, an Octeon Plus CN5750 processor, manufacture by Cavium Networks, is used for CPU 1918. This processor is a 750 MHz, 12-core MIPS processor that is rated at a maximum performance of 190.2 BIPS, and which supports interfacing with 800 MHz DDR2 RAMs using up to 144-bits of combined data and parity.

To achieve the desired hit rates, the CAS cache is sized to store a predetermined percentage of the total number of CAS entries associated with a given backend data pLUN (e.g., pLUN 564 of FIG. 5A). In at least some example embodiments, because the metadata record pointer stored within a CAS entry is 32 bits wide, a maximum of 4,294,967,296 chunks can be represented (and thus stored) on the pLUN. Given that the average chunk size is 8 Kbytes, the total storage capacity of the pLUN is 32 Tbytes. To achieve the desired 98% hit rate for a CAS cache associated with a 32 Tbyte pLUN, the CAS cache is sized to accommodate 26,214,400 entries (i.e., a cache ratio of 0.61035%). Because each CAS entry is 64 bytes, a total of 1,677,721,600 bytes of CAS cache memory is required for the CAS cache associated with each CAS partition, and thus with each 32 Tbyte pLUN. In at least some example embodiments CAS cache memories CCM0 and CCM1 of FIG. 19 together provide up to 16 Gbytes of cache memory space. With 16 Gbytes reserved for CAS cache, DCS 1900 of FIG. 19 can thus support up to 8, 32 Tbyte pLUNs that operate at the full, aggregate wire speed data rate of 48 Gbps. At a 10:1 deduplication ratio, this represents as much as 2.56 Pbytes of storage, a number that is increased even further by the data compression provided by the chunk engines s 2100 of FIG. 19.

Figure 23:
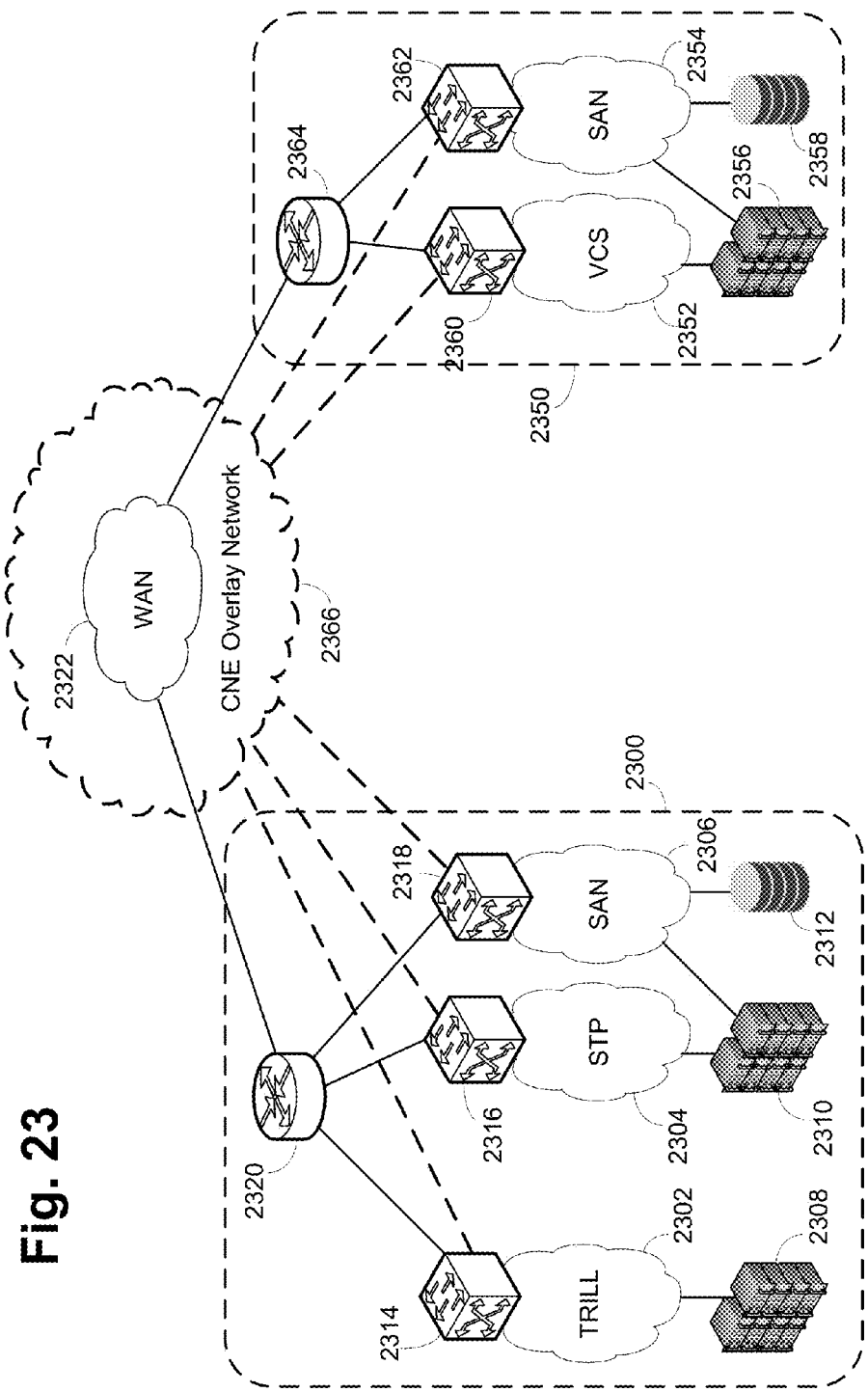
FIG. 23 is a block diagram of an embodiment having two connected data centers according to at least some example embodiments.

Referring to FIG. 23, a network illustrating portions according to the present invention is shown. A first data center 2300 is shown having three separate internal networks, a TRILL (Transparent Interconnection of Lots of Links) network 2302, a normal Ethernet spanning tree protocol (STP) network 2304 and a storage area network (SAN) 2306. Application servers 2308 are connected to the TRILL network 2302, while application servers 2310 are connected to the STP network 2304 and the SAN 2306. Storage 2312 is shown connected to the SAN 2306. Each of the networks 2302, 2304 and 2306 has a converged network extension (CNE) device 2314, 2316, 2318 connected. The CNE devices 2314, 2316, 2318 are connected to a router 2320, which in turn is connected to a WAN 2322. A second data center 2350 is similar, having a VCS Ethernet fabric network 2352 and a SAN 2354. Application servers 2356 are connected to each network 2352 and 2354, with storage connected to the SAN 2354. CNE devices 2360, 2362 are connected to each network 2352, 2354 and to a router 2364, which is also connected to the WAN 2322 to allow the data centers 2300, 2350 to communicate. The operation of the CNE devices 2314-2318 and 2360-2362 result in an effective CNE overlay network 2366, with virtual links from each CNE device to the CNE overlay network 2366.

One goal of the embodiments of the present invention is to extend a VCS and TRILL network across data centers and meet the scalability requirements needed by the deployments. A CNE device can be implemented in a two-box solution, wherein one box is capable of L2/L3/FCoE switching and is part of the VCS, and the other facilitates the WAN tunneling to transport Ethernet and/or FC traffic over WAN. The CNE device can also be implemented in a one-box solution, wherein a single piece of network equipment combines the functions of L2/L3/FCoE switching and WAN tunneling.

VCS as a layer-2 switch uses TRILL as its inter-switch connectivity and delivers a notion of single logical layer-2 switch. This single logical layer-2 switch delivers a transparent LAN service. All the edge ports of VCS support standard protocols and features like Link Aggregation Control Protocol (LACP), Link Layer Discovery Protocol (LLDP), VLANs, MAC learning, etc. VCS achieves a distributed MAC address database using Ethernet Name Service (eNS) and attempts to avoid flooding as much as possible. VCS also provides various intelligent services, such as virtual link aggregation group (vLAG), advance port profile management (APPM), End-to-End FCoE, Edge-Loop-Detection, etc. More details on VCS are available in U.S. patent application Ser. Nos. 13/098,360, entitled "Converged Network Extension," filed Apr. 29, 2011; 12/725,249, entitled "Redundant Host Connection in a Routed Network," filed 16 Mar. 2010; 13/087,239, entitled "Virtual Cluster Switching," filed 14 Apr. 2011; 13/092,724, entitled "Fabric Formation for Virtual Cluster Switching," filed 22 Apr. 2011; 13/092,580, entitled "Distributed Configuration Management for Virtual Cluster Switching," filed 22 Apr. 2011; 13/042,259, entitled "Port Profile Management for Virtual Cluster Switching," filed 7 Mar. 2011; 13/092,460, entitled "Advanced Link Tracking for Virtual Cluster Switching," filed 22 Apr. 2011; No. 13/092,701, entitled "Virtual Port Grouping for Virtual Cluster Switching," filed 22 Apr. 2011; 13/092,752, entitled "Name Services for Virtual Cluster Switching," filed 22 Apr. 2011; 13/092,877, entitled "Traffic Management for Virtual Cluster Switching," filed 22 Apr. 2011; and 13/092,864, entitled "Method and System for Link Aggregation Across Multiple Switches," filed 22 Apr. 2011, all hereby incorporated by reference.

In embodiments of the present invention, for the purpose of cross-data-center communication, each data center is represented as a single logical RBridge. This logical RBridge can be assigned a virtual RBridge ID or use the RBridge ID of the CNE device that performs the WAN tunneling.

Figure 24:
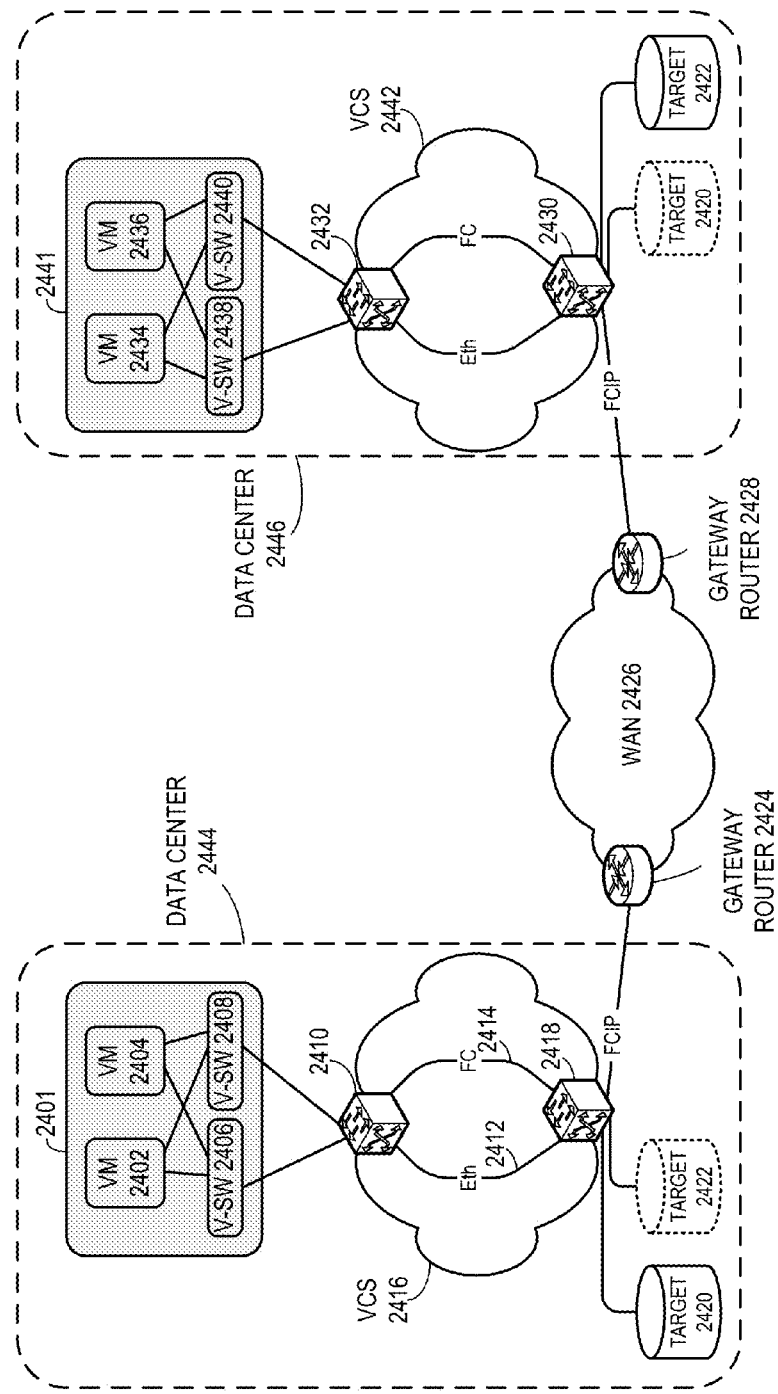
FIG. 24 illustrates an exemplary network architecture which includes CNE devices for facilitating cross-data-center communications, in accordance with one embodiment of the present invention.

FIG. 24 illustrates an exemplary network architecture which includes CNE devices for facilitating cross-data-center communications, in accordance with one embodiment of the present invention. In this example, two data centers 2444 and 2446 are coupled to a WAN 2426 via gateway routers 2424 and 2428, respectively. Data center 2444 includes a VCS 2416, which couples to a number of hosts, such as host 2401, via its member switches, such as switch 2410. Host 2401 includes two VMs 2402 and 2404, which are coupled to virtual switches 2406 and 2408 in a dual-homing configuration. In one embodiment, virtual switches 2406 and 2408 reside on two network interface cards on host 2401. Virtual switches 2406 and 2408 are coupled to VCS member switch 2410. Also included in VCS 2416 is a CNE device 2418. CNE device 2418 is configured to receive both Ethernet (or TRILL) traffic from member switch 2410 via an Ethernet (or TRILL) link 2412, and FC traffic via FC link 2414. Also coupled to CNE device 2418 is a target storage device 2420, and a cloned target storage device 2422 (denoted by dotted lines). CNE device 2418 maintains an FCIP tunnel to data center 2446 across WAN 2426 via gateway routers 2424 and 2428.

Similarly, data center 2446 includes a VCS 2442, which in turn includes a member switch 2432. Member switch 2432 is coupled to a host 2441, which includes VMs 2434 and 2436, both of which are coupled to virtual switches 2438 and 2440. Also included in VCS 2442 is a CNE device 2430. CNE device is coupled to member switch 2432 via an Ethernet (TRILL) link and an FC link. CNE device 2430 is also coupled to target storage device 2422 and a clone of target storage device 2420.

During operation, assume that VM 2402 needs to move from host 2401 to host 2441. Note that this movement is previously not possible, because virtual machines are visible only within the same layer-2 network domain. Once the layer-2 network domain is terminated by a layer-3 device, such as gateway router 2424, all the identifying information for a particular virtual machine (which is carried in layer-2 headers) is lost. However, in embodiments of the present invention, because CNE device extends the layer-2 domain from VCS 2416 to VCS 2442, the movement of VM 2402 from data center 2444 to data center 2446 is now possible as that fundamental requirement is met.

When forwarding TRILL frames from data center 2444 to data center 2446, CNE device 2418 modifies the egress TRILL frames' header so that the destination RBridge identifier is the RBridge identifier assigned to data center 2446. CNE device 2418 then uses the FCIP tunnel to deliver these TRILL frames to CNE device 2430, which in turn forwards these TRILL frames to their respective layer-2 destinations.

VCS uses FC control plane to automatically form a fabric and assign RBridge identifiers to each member switch. In one embodiment, the CNE architecture keeps the TRILL and SAN fabrics separate between data centers. From a TRILL point of view, each VCS (which corresponds to a respective data center) is represented as a single virtual RBrdige. In addition, the CNE device can be coupled to a VCS member switch with both a TRILL link and an FC link. The CNE device can join the VCS via a TRILL link. However, since the CNE devices keeps the TRILL VCS fabric and SAN (FC) fabric separate, the FC link between the CNE device and the member switch is configured for FC multi-fabric.

Figure 25:
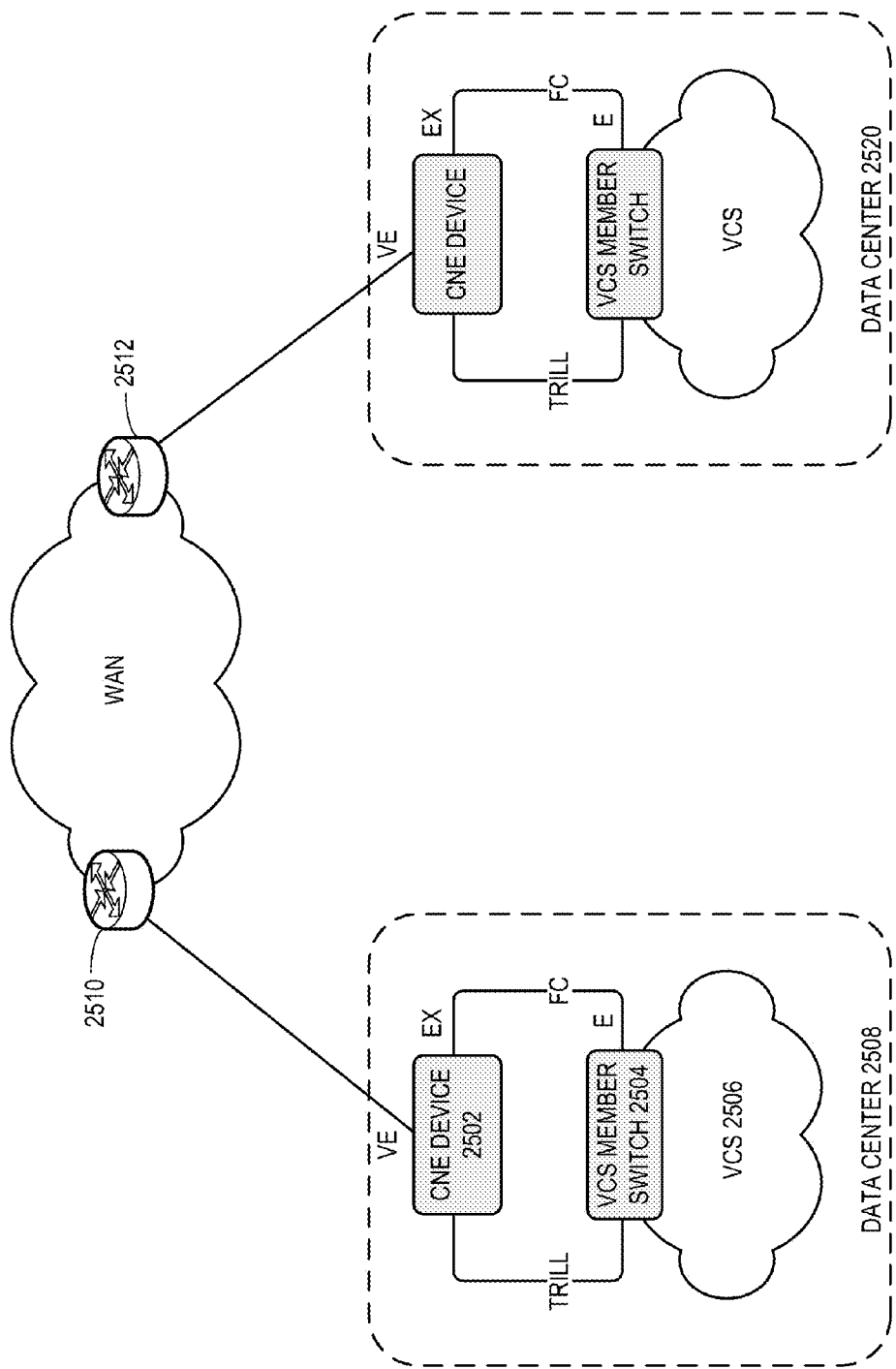
FIG. 25 illustrates an exemplary implementation of CNE-enabled VCSs, in accordance with one embodiment of the present invention.

As illustrated in FIG. 25, a data center 2508 is coupled to a WAN via a gateway router 2510, and a data center 2520 is coupled to the WAN via a gateway router 2512. Data center 2508 includes a VCS 2506, which includes a member switch 2504. Also included in data center 2508 is a CNE device 2502. CNE device 2502 is coupled to VCS member switch 2504 via a TRILL link and an FC link. CNE device 2502 can join the VCS via the TRILL link. However, the FC link allows CNE device 2502 to maintain a separate FC fabric with VCS member switch 2504 to carry FC traffic. In one embodiment, the FC port on CNE device 2502 is an FC EX_port. The corresponding port on member switch 2504 is an FC E_port. The port on CNE device 2502 on the WAN side (coupling to gateway router 2510) is an FCIP VE_port. Data center 2520 has a similar configuration.

In one embodiment, each data center's VCS includes a node designated as the ROOT RBridge for multicast purposes. During the initial setup, the CNE devices in the VCSs exchange each VCS's ROOT RBridge identifier. In addition, the CNE devices also exchange each data center's RBridge identifier. Note that this RBridge identifier represents the entire data center. Information related to data-center RBridge identifiers is distributed as a static route to all the nodes in the local VCS.

Figure 26A:
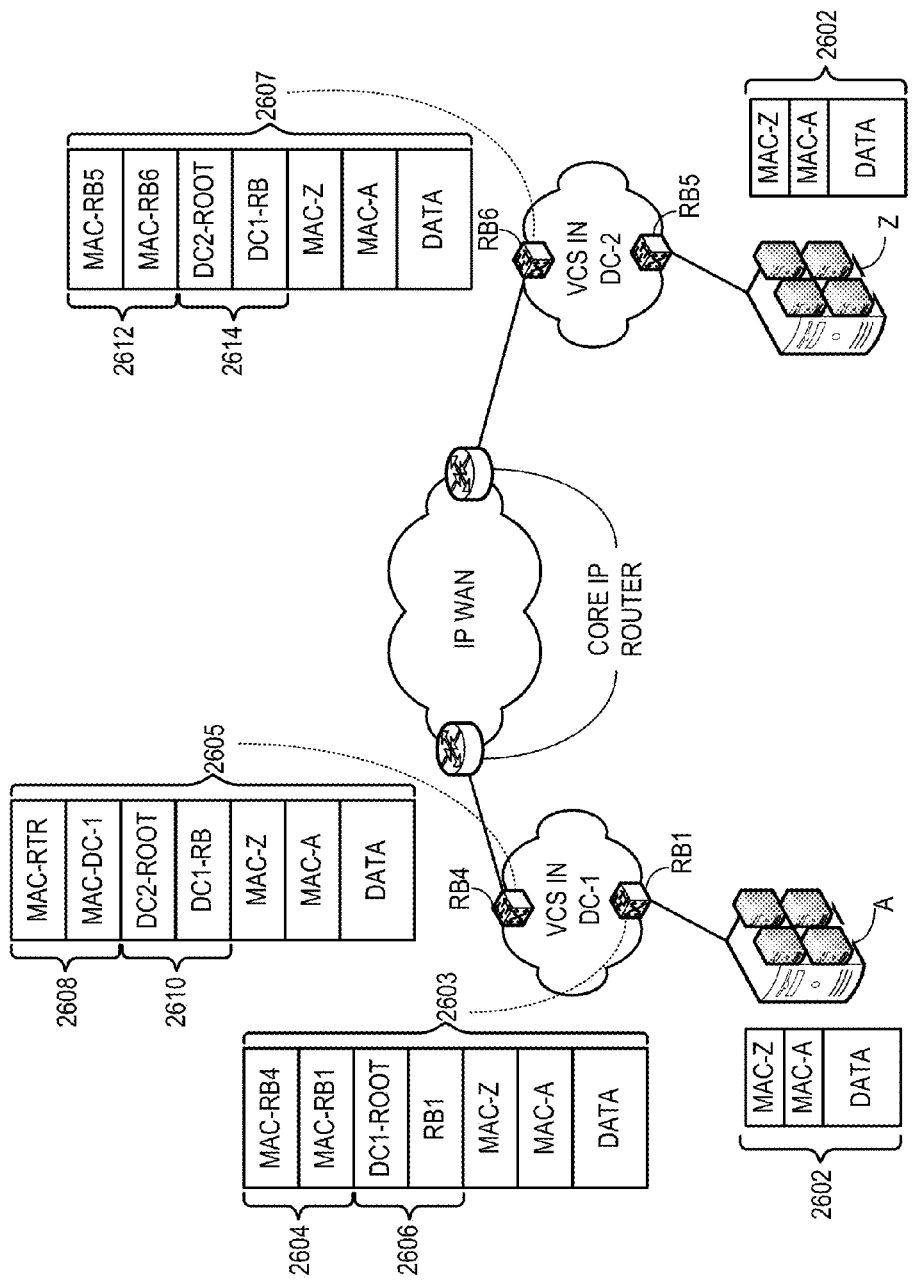
FIG. 26A presents a diagram illustrating how CNE devices handle broadcast, unknown unicast, and multicast (BUM) traffic across data centers, in accordance with one embodiment of the present invention.

FIG. 26A presents a diagram illustrating how CNE devices handle broadcast, unknown unicast, and multicast (BUM) traffic across data centers, in accordance with one embodiment of the present invention. In this example, two data centers, DC-1 and DC-2, are coupled to an IP WAN via core IP routers. The CNE device in DC-1 has an RBridge identifier of RB4, and the CNE device in DC-2 has an RBridge identifier of RB6. Furthermore, in the VCS in DC-1, a member switch RB1 is coupled to host A. In the VCS in DC-2, a member switch RB5 is coupled to host Z.

Assume that host A needs to send multicast traffic to host Z, and that host A already has the knowledge of host Z's MAC address. During operation, host A assembles an Ethernet frame 2602, which has host Z's MAC address (denoted as MAC-Z) as its destination address (DA), and host A's MAC address (denoted as MAC-A) as its source address (SA). Based on frame 2602, member switch RB1 assembles a TRILL frame 2603, whose TRILL header 2606 includes the RBridge identifier of data center DC-1's root RBridge (denoted as "DC1-ROOT") as the destination RBridge, and RB1 as the source RBridge. (That is, within DC-1, the multicast traffic is distributed on the local multicast tree.) The outer Ethernet header 2604 of frame 2603 has CNE device RB4's MAC address (denoted as MAC-RB4) as the DA, and member switch RB1's MAC address (denoted as MAC-RB1) as the SA.

When frame 2603 reaches CNE device RB4, it further modifies the frame's TRILL header to produce frame 2605. CNE device RB4 replaces the destination RBridge identifier in the TRILL header 2610 with data center DC-2's root RBridge identifier DC2-ROOT. The source RBridge identifier is changed to data center DC-1's virtual RBridge identifier, DC1-RB (which allows data center DC-2 to learn data center DC-1's RBridge identifier). Outer Ethernet header 2608 has the core router's MAC address (MAC-RTR) as its DA, and CNE device RB4's MAC address (MAC-DC-1) as its SA.

Frame 2605 is subsequently transported across the IP WAN in an FCIP tunnel and reaches CNE device RB6. Correspondingly, CNE device RB6 updates the header to produce frame 2607. Frame 2607's TRILL header 2614 remains the same as frame 2605. The outer Ethernet header 2612 now has member switch RB5's MAC address, MAC-RB5, as its DA, and CNE device RB6's MAC address, MAC-RB6, as its SA. Once frame 2607 reaches member switch RB5, the TRILL header is removed, and the inner Ethernet frame is delivered to host Z.

In various embodiments, a CNE device can be configured to allow or disallow unknown unicast, broadcast (e.g., ARP), or multicast (e.g., IGMP snooped) traffic to cross data center boundaries. By having these options, one can limit the amount of BUM traffic across data centers. Note that all TRILL encapsulated BUM traffic between data centers can be sent with the remote data center's root RBridge identifier. This translation is done at the terminating point of the FCIP tunnel.

Additional mechanisms can be implemented to minimize BUM traffic across data centers. For instance, the TRILL ports between the CNE device and any VCS member switch can be configured to not participate in any of the VLAN MGIDs. In addition, the eNS on both VCSs can be configured to synchronize their learned MAC address database to minimize traffic with unknown MAC DA. (Note that in one embodiment, before the learned MAC address databases are synchronized in different VCSs, frames with unknown MAC DAs are flooded within the local data center only.)

To further minimize BUM traffic, broadcast traffic such as ARP traffic can be reduced by snooping ARP responses to build ARP databases on VCS member switches. The learned ARP databases are then exchanged and synchronized across different data centers using eNS. Proxy-based ARP is used to respond to all know ARP requests in a VCS. Furthermore, multicast traffic across data centers can be reduced by distributing the multicast group membership across data canters by sharing the IGMP snooping information via eNS.

The process of forwarding unicast traffic between data centers is described as follows. During the FCIP tunnel formation, the logical RBridge identifiers representing data centers are exchanged. When a TRILL frame arrives at the entry node of the FCIP tunnel, wherein the TRILL destination RBridge is set as the RBridge identifier of the remote data center, the source RBridge in the TRILL header is translated to the logical RBridge identifier assigned to the local data center. When the frame exits the FCIP tunnel, the destination RBridge field in the TRILL header is set as the local (i.e., the destination) data center's virtual RBridge identifier. The MAC DA and VLAN ID in the inner Ethernet header is then used to look up the corresponding destination RBridge (i.e., the RBridge identifier of the member switch to which the destination host is attached, and the destination RBridge field in the TRILL header is updated accordingly.

In the destination data center, based on an ingress frame, all the VCS member switches learn the mapping between the MAC SA (in the inner Ethernet header of the frame) and the TRILL source RBridge (which is the virtual RBridge identifier assigned to the source data center). This allows future egress frames destined to that MAC address to be sent to the right remote data center. Note that since the RBridge identifier assigned to a given data center does not correspond to a physical RBridge, in one embodiment, a static route is used to map a remote data-center RBridge identifier to the local CNE device.

Figure 26B:
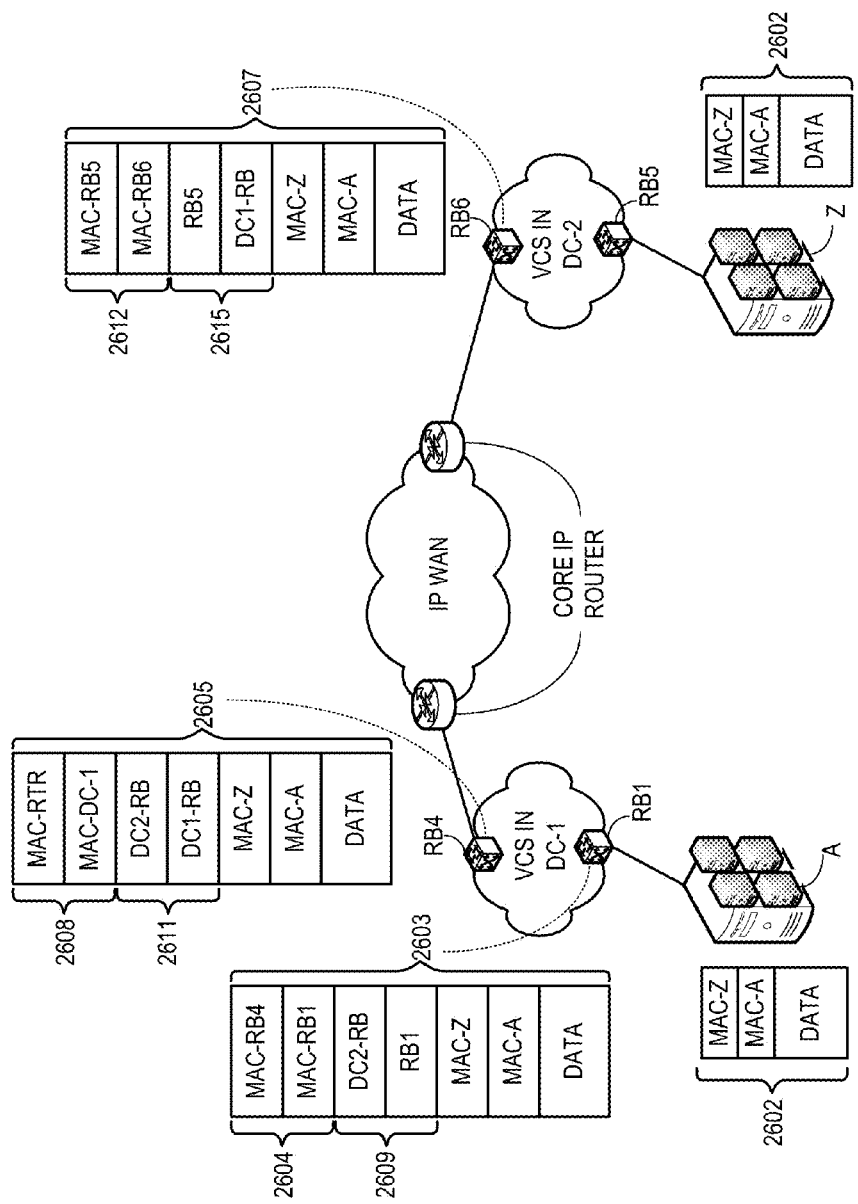
FIG. 26B presents a diagram illustrating how CNE devices handle unicast traffic across data centers, in accordance with one embodiment of the present invention.

FIG. 26B presents a diagram illustrating how CNE devices handle unicast traffic across data centers, in accordance with one embodiment of the present invention. Assume that host A needs to send unicast traffic to host Z, and that host A already has the knowledge of host Z's MAC address. During operation, host A assembles an Ethernet frame 2602, which has host Z's MAC address (MAC-Z) as its DA, and host A's MAC address (MAC-A) as its SA. Based on frame 2602, member switch RBi assembles a TRILL frame 2603, whose TRILL header 2609 includes the RBridge identifier of data center DC-2's virtual Rbridge (denoted as "DC2-RB") as the destination RBridge, and RB1 as the source RBridge. The outer Ethernet header 2604 of frame 2603 has CNE device RB4's MAC address (MAC-RB4) as the DA, and member switch RB1's MAC address (MAC-RB1) as the SA.

When frame 2603 reaches CNE device RB4, it further modifies the frame's TRILL header to produce frame 2605.

CNE device RB4 replaces the source RBridge identifier in the TRILL header 2611 with data center DC-1's virtual RBridge identifier DC1-RB (which allows data center DC-2 to learn data center DC-1's RBridge identifier). Outer Ethernet header 2608 has the core router's MAC address (MAC-RTR) as its DA, and CNE device RB4's MAC address (MAC-DC-1) as its SA.

Frame 2605 is subsequently transported across the IP WAN in an FCIP tunnel and reaches CNE device RB6. Correspondingly, CNE device RB6 updates the header to produce frame 2607. Frame 2607's TRILL header 2615 has an updated destination RBridge identifier, which is RB5, the VCS member switch in DC-2 that couples to host Z. The outer Ethernet header 2612 now has member switch RB5's MAC address, MAC-RB5, as its DA, and CNE device RB6's MAC address, MAC-RB6, as its SA. Once frame 2607 reaches member switch RB5, the TRILL header is removed, and the inner Ethernet frame is delivered to host Z.

Flooding across data centers of frames with unknown MAC DAs is one way for the data centers to learn the MAC address in another data center. All unknown SAs are learned as MACs behind an RBridge and it is no exception for the CNE device. In one embodiment, eNS can be used to distribute learned MAC address database, which reduces the amount of flooding across data centers.

In order to optimize flushes, even though MAC addresses are learned behind RBridges, the actual VCS edge port associated with a MAC address is present in the eNS MAC updates. However, the edge port IDs might no longer be unique across data-centers. To resolve this problem, all eNS updates across data centers will qualify the MAC entry with the data-center's RBridge identifier. This configuration allows propagation of port flushes across data centers.

In the architecture described herein, VCSs in different data-centers do not join each other; hence the distributed configurations are kept separate. However, in order to allow virtual machines to move across data-centers, there will be some configuration data that needs to be synchronized across data-centers. In one embodiment, a special module (in either software or hardware) is created for CNE purposes. This module is configured to retrieve the configuration information needed to facilitate moving of virtual machines across data centers and it is synchronized between two or more VCSs.

In one embodiment, the learned MAC address databases are distributed across data centers. Also, edge port state change notifications (SCNs) are also distributed across data centers. When a physical RBridge is going down, the SCN is converted to multiple port SCNs on the inter-data-center FCIP link.

In order to protect the inter-data-center connectivity, a VCS can form a vLAG between two or more CNE devices. In this model, the vLAG RBridge identifier is used as the data-center RBridge identifier. The FCIP control plane is configured to be aware of this arrangement and exchange the vLAG RBridge identifiers in such cases.

Figure 27:
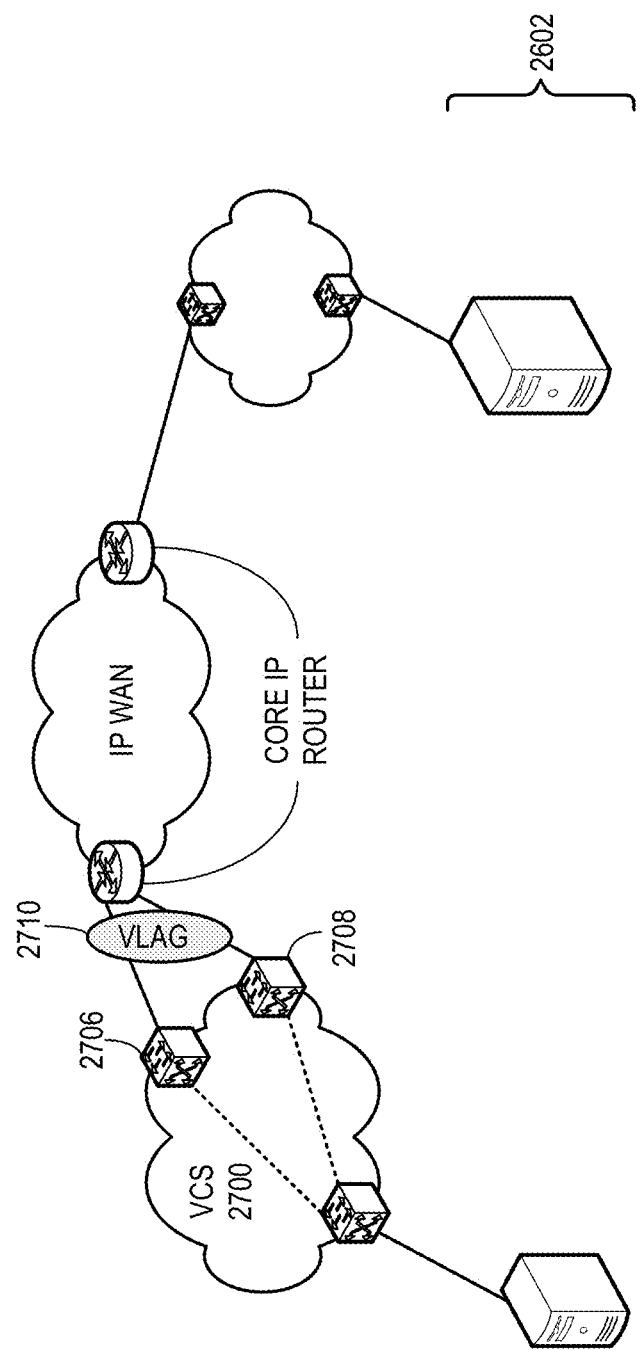
FIG. 27 illustrates an example where two CNE devices are used to construct a vLAG, in accordance with an embodiment of the present invention.

FIG. 27 illustrates an example where two CNE devices are used to construct a vLAG, in accordance with an embodiment of the present invention. In this example, a VCS 2700 includes two CNE devices 2706 and 2708. Both CNE devices 2706 and 2708 forms a vLAG 2710 which is coupled to a core IP router. vLAG 2710 is assigned a virtual RBridge identifier, which is also used as the data-center RBridge identifier for VCS 2700. Furthermore, vLAG 2710 can facilitate both ingress and egress load balancing (e.g., based on equal-cost multi-pathing (ECMP)) for any member switch within VCS 2700.

Figure 28:
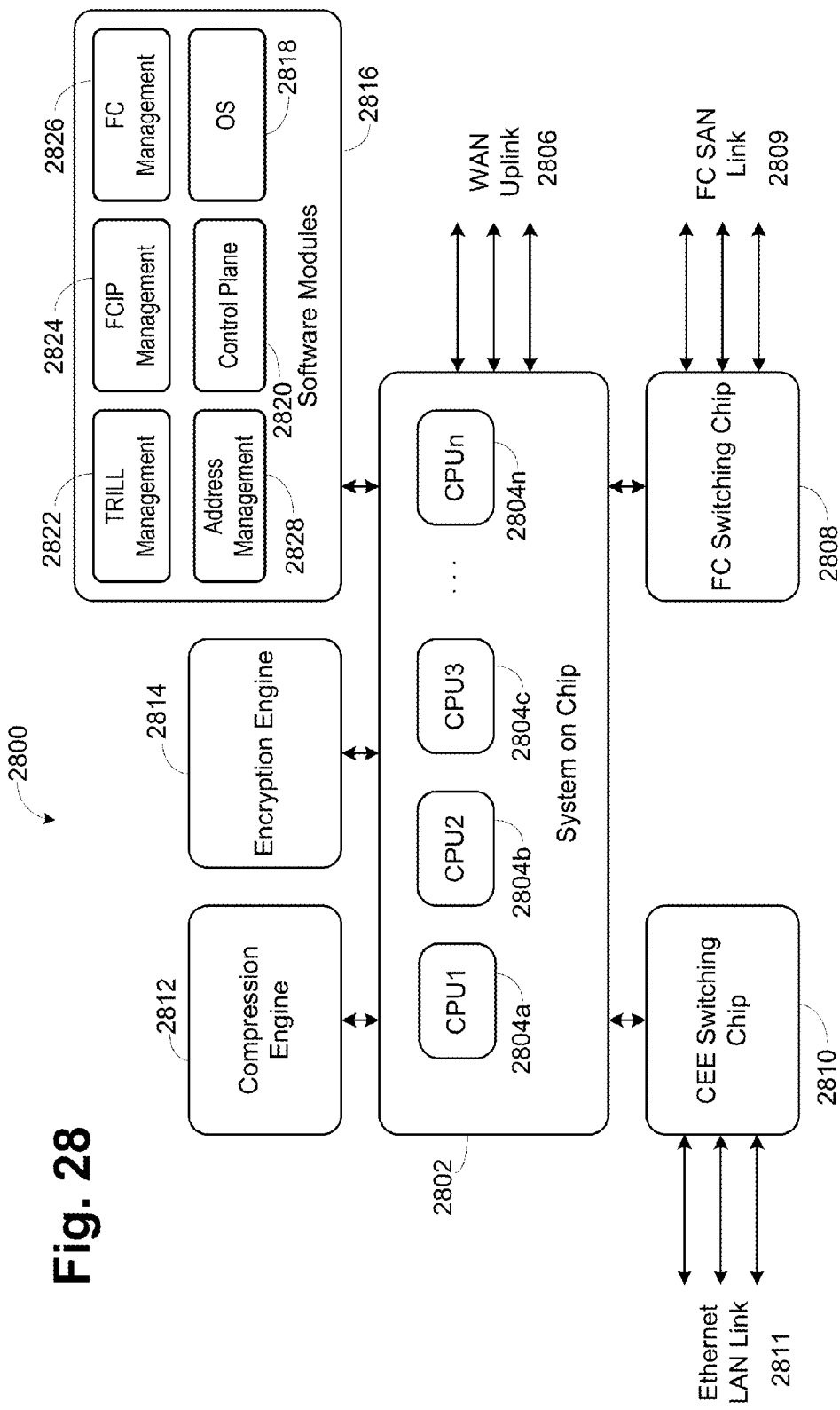
FIG. 28 is a block diagram of one embodiment of an LDCM appliance according to the present invention.

FIG. 28 illustrates a CNE/LDCM device 2800, the Long Distance Cloud Migration ("LDCM") features preferably being added to a CNE device to create a single device. A system on chip (SOC) 2802 provides the primary processing capabilities, having a plurality of CPUs 2804. A number of Ethernet connections 2806 are preferably included on the SOC 2802 to act as the WAN link, though a separate Ethernet device could be used if desired. An FC switching chip 2808 is connected to the SOC 2802 to provide connections to FC SANs. A CEE switching chip 2810 is connected to the SOC 2802 to allow attachment to the VCS or to an Ethernet LAN. A compression engine 2812 is provided with the SOC 2802 to provide compression and dedup capabilities to reduce traffic over the WAN links. The compression engine 2812 is a variation of the above described deduplication logic adapted for network data traffic instead of disk data storage. As such, writes effectively become transmits and reads effectively become receives. LBAs are no longer specifically used but location of stored data is still used. An encryption engine 2814 is provided for security purposes, as preferably the FCIP tunnel is encrypted for security.

Various software modules 2816 are present in the CNE/LDCM device 2800. These include an underlying operating system 2818, a control plane module 2820 to manage interaction with the VCS, a TRILL management module 2822 for TRILL functions above the control plane, an FCIP management module 2824 to manage the FCIP tunnels over the WAN, an FC management module 2826 to interact with the FC SAN and an address management module 2828.

Figure 29:
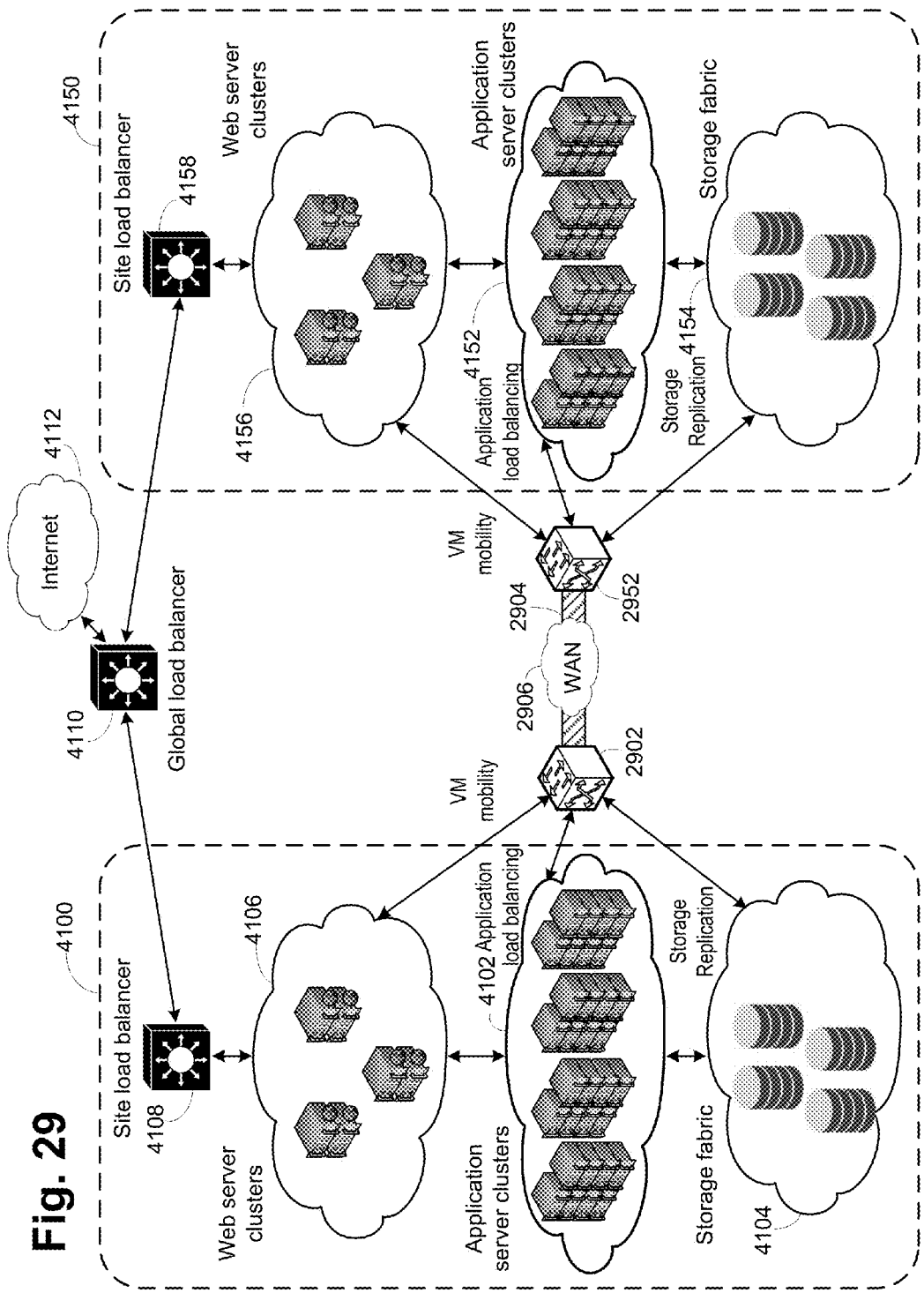
FIG. 29 is a block diagram of the data centers of FIG. 23 modified to operate according to one embodiment of the present invention.

FIG. 29 illustrates the data centers with the addition of CNE/LDCM devices 2902, 2952. Two data centers 4100, 4150 are illustrated. Each has a series of application server clusters 4102, 4152 which execute the actual applications, such as in a SaaS (software as a Service) architecture. Data is stored in a storage fabric 4104, 4154. Access to the application server clusters 4102, 4152 is shown as being through web server clusters 4106, 4156, though more direct access at the LAN layer is common. A site load balancer 4108, 4158 distributes incoming requests across the web servers in the web server clusters 4106, 4156. A global load balancer 4110 is connected to the Internet 4112 to balance load between the data centers 4100, 4150.

The CNE/LDCM devices 2902 and 2952 create a cloud virtual interconnect (CVI) 2904 between themselves, effectively an FCIP tunnel through the WAN 2906. The CVI 2904 is used for VM mobility, application load balancing and storage replication between the data centers 100, 150.

The cloud virtual interconnect 2904 preferably includes the following components. An FCIP trunk, as more fully described in U.S. patent application Ser. No. 12/880,495, entitled "FCIP Communications with Load Sharing and Failover", filed Sep. 29, 2010, which is hereby incorporated by reference, aggregates multiple TCP connections to support wide WAN bandwidth ranges from 100 Mbps up to 20 Gbps. It also supports multi-homing and enables transparent failover between redundant network paths.

Adaptive rate limiting (ARL) is performed on the TCP connections to change the rate at which data is transmitted through the TCP connections. ARL uses the information from the TCP connections to determine and adjust the rate limit for the TCP connections dynamically. This will allow the TCP connections to utilize the maximum available bandwidth. It also provides a flexible number of priorities for defining policies and the users are provisioned to define the priorities needed.

High bandwidth TCP (HBTCP) is designed to be used for high throughput applications, such as virtual machine and storage migration, over long fat networks. It overcomes the challenge of the negative effect of traditional TCP/IP in WAN. In order to optimize the performance the following changes have been made.

1) Scaled Windows: In HBTCP, scaled windows are used to support WAN latencies of up to 350 ms or more. Maximum consumable memory will be allocated per session to maintain the line rate.

2) Optimized reorder resistance: HBTCP has more resistance to duplicate acknowledgements and requires more duplicate ACK's to trigger the fast retransmit.

3) Optimized fast recovery: In HBTCP, instead of reducing the cwnd by half, it is reduced by substantially less than 50% in order to make provision for the cases where extensive network reordering is done.

4) Quick Start: The slow start phase is modified to quick start where the initial throughput is set to a substantial value and throughput is only minimally reduced when compared to the throughput before the congestion event.

5) Congestion Avoidance: By carefully matching the amount of data sent to the network speed, congestion is avoided instead of pumping more traffic and causing a congestion event so that congestion avoidance can be disabled.

6) Optimized slow recovery: The retransmission timer in HBTCP (150 ms) expires much quicker than in traditional TCP and is used when fast retransmit cannot provide recovery. This triggers the slow start phase earlier when a congestion event occurs.

7) Lost packet continuous retry: Instead of waiting on an ACK for a SACK retransmitted packet, continuously retransmit the packet to improve the slow recovery, as described in more detail in U.S. patent application Ser. No. 12/972,713, entitled "Repeated Lost Packet Retransmission in a TCP/IP Network", filed Dec. 20, 2010, which is hereby incorporated by reference.

The vMotion migration data used in VM mobility for VMware systems enters the CNE/LDCM device 2902 through the LAN Ethernet links of the CEE switching chip 2810 and the compressed, encrypted data is sent over the WAN infrastructure using the WAN uplink using the Ethernet ports 2806 of the SOC 2802. Similarly for storage migration, the data from the SAN FC link provided by the FC switching chip 2808 is migrated using the WAN uplink to migrate storage. The control plane module 2820 takes care of establishing, maintaining and terminating TCP sessions with the application servers and the destination LDCM servers.

Figure 30B:
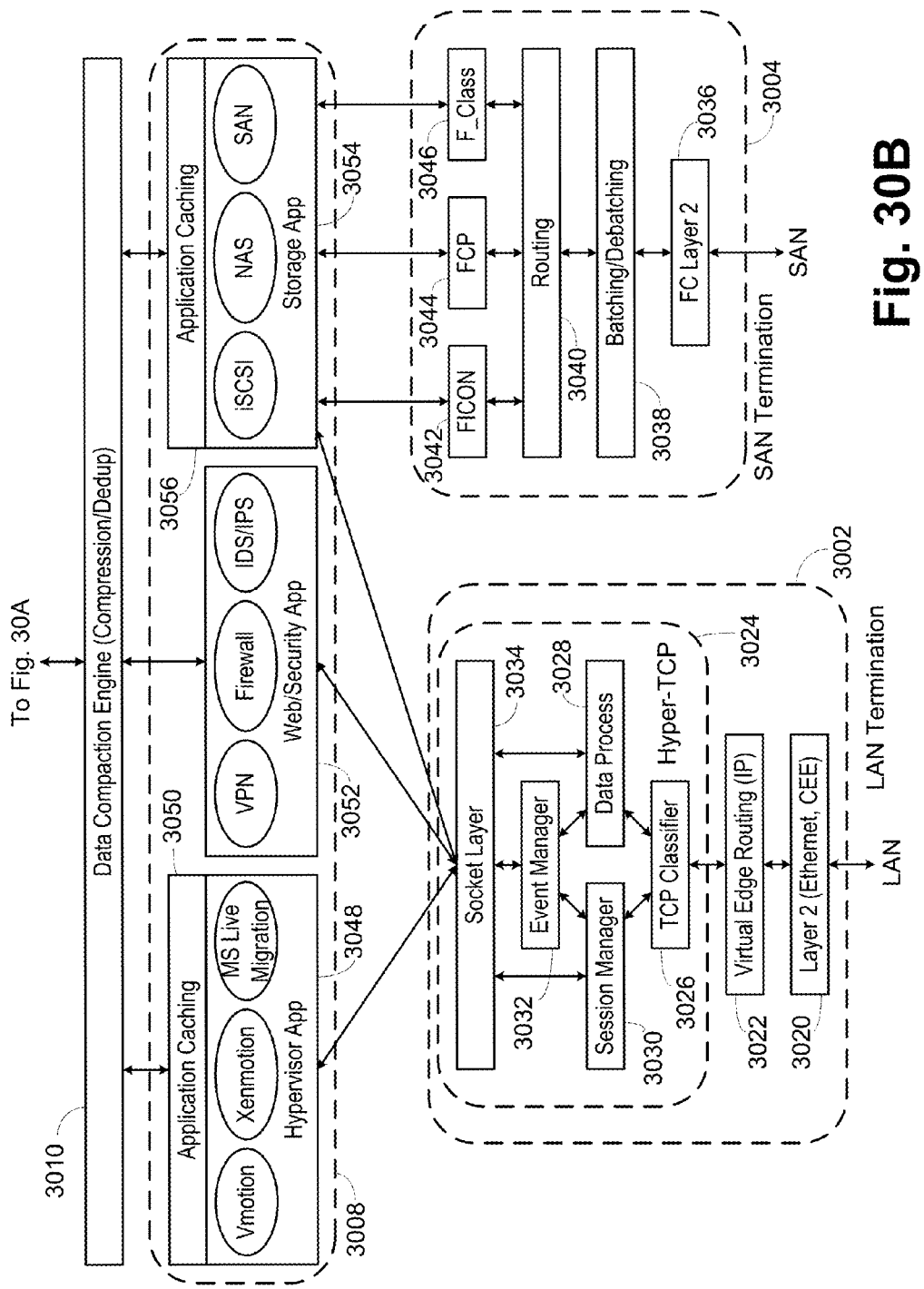

FIGS. 30A and 30B illustrate the functional blocks and modules of the CNE/LDCM device. LAN termination 3002 and SAN termination 3004 are interconnected to the CVI 3006 by an application module 3008, the data compaction engine 3010 and a high reliability delivery application (HRDA) layer 3012.

LAN termination 3002 has a layer 2, Ethernet or CEE, module 3020 connected to the LAN ports. An IP virtual edge routing module 3022 connects the layer 2 module 3020 to a Hyper-TCP module 3024. The Hyper-TCP module 3024 operation is described in more detail below and includes a TCP classifier 3026 connected to the virtual edge routing module 3022. The TCP classifier 3026 is connected to a data process module 3028 and a session manager 3030. An event manager 3032 is connected to the data process module 3028 and the session manager 3030. The event manager 3032, the data process module 3028 and the session manager 3030 are all connected to a socket layer 3034, which acts as the interface for the Hyper-TCP module 3024 and the LAN termination 3002 to the application module 3008.

SAN termination 3004 has an FC layer 2 module 3036 connected to the SAN ports. A batching/debatching module 3038 connects the FC layer 2 module 3036 to a routing module 3040. Separate modules are provided for FICON traffic 3042, FCP traffic 3044 and F Class traffic 3046, with each module connected to the routing module 3040 and acting as interfaces between the SAN termination 3004 and the application module 3008.

The application module 3008 has three primary applications, hypervisor 3048, web/security 3052 and storage 3054. The hypervisor application 3048 cooperates with the various hypervisor motion functions, such vMotion, Xenmotion and MS Live Migration. A caching subsystem 3050 is provided with the hypervisor application 3048 for caching of data during the motion operations. The web/security application 3052 cooperates with VPNs, firewalls and intrusion systems. The storage application 3054 handles iSCSI, NAS and SAN traffic and has an accompanying cache 3056.

The data compaction engine 3010 uses the compression engine 2812 to handle compression/decompression and dedup operations to allow improved efficiency of the WAN links.

The main function of the HRDA layer 3012 is to ensure the communication reliability at the network level and also at the transport level. As shown, the data centers are consolidated by extending the L2 TRILL network over IP through the WAN infrastructure. The redundant links are provisioned to act as back up paths. The HRDA layer 3012 performs a seamless switchover to the backup path in case the primary path fails. HBTCP sessions running over the primary path are prevented from experiencing any congestion event by retransmitting any unacknowledged segments over the backup path. The acknowledgements for the unacknowledged segments and the unacknowledged segments themselves are assumed to be lost. The HRDA layer 3012 also ensures reliability for TCP sessions within a single path. In case a HBTCP session fails, any migration application using the HBTCP session will also fail. In order to prevent the applications from failing, the HRDA layer 3012 transparently switches to a backup HBTCP session.

The CVI 3006 includes an IP module 3066 connected to the WAN links. An IPSEC module 3064 is provided for link security. A HBTCP module 3062 is provided to allow the HBTCP operations as described above. A QoS/ARL module 3060 handles the QoS and ARL functions described above. A trunk module 3058 handles the trunking described above.

Hyper-TCP is a component in accelerating the migration of live services and applications over long distance networks. Simply, a TCP session between the application client and server is locally terminated and by leveraging the high bandwidth transmission techniques between the data centers, application migration is accelerated.

Hyper-TCP primarily supports two modes of operation: 1) Data Termination Mode (DTM) in which the end device TCP sessions are not altered but the data is locally acknowledged and data sequence integrity is maintained; and 2) Complete Termination Mode (CTM) in which end device TCP sessions are completely terminated by the LDCM. Data sequence is not maintained between end devices but data integrity is guaranteed.

There are primarily three phases in Hyper-TCP. They are Session Establishment, Data Transfer and Session Termination. These three phases are explained below.

During session establishment the connection establishment packets are snooped and the TCP session data, like connection end points, Window size, MTU and sequence numbers, are cached. The Layer 2 information like the MAC addresses is also cached. The TCP session state on the Hyper-TCP server is same as that of the application server and the TCP session state of the Hyper-TCP client is same as application client. With the cached TCP state information, the Hyper-TCP devices can locally terminate the TCP connection between the application client and server and locally acknowledge the receipt of data packets. Hence, the RTT's calculated by the application will be masked from including the WAN latency, which results in better performance.

Figure 31:
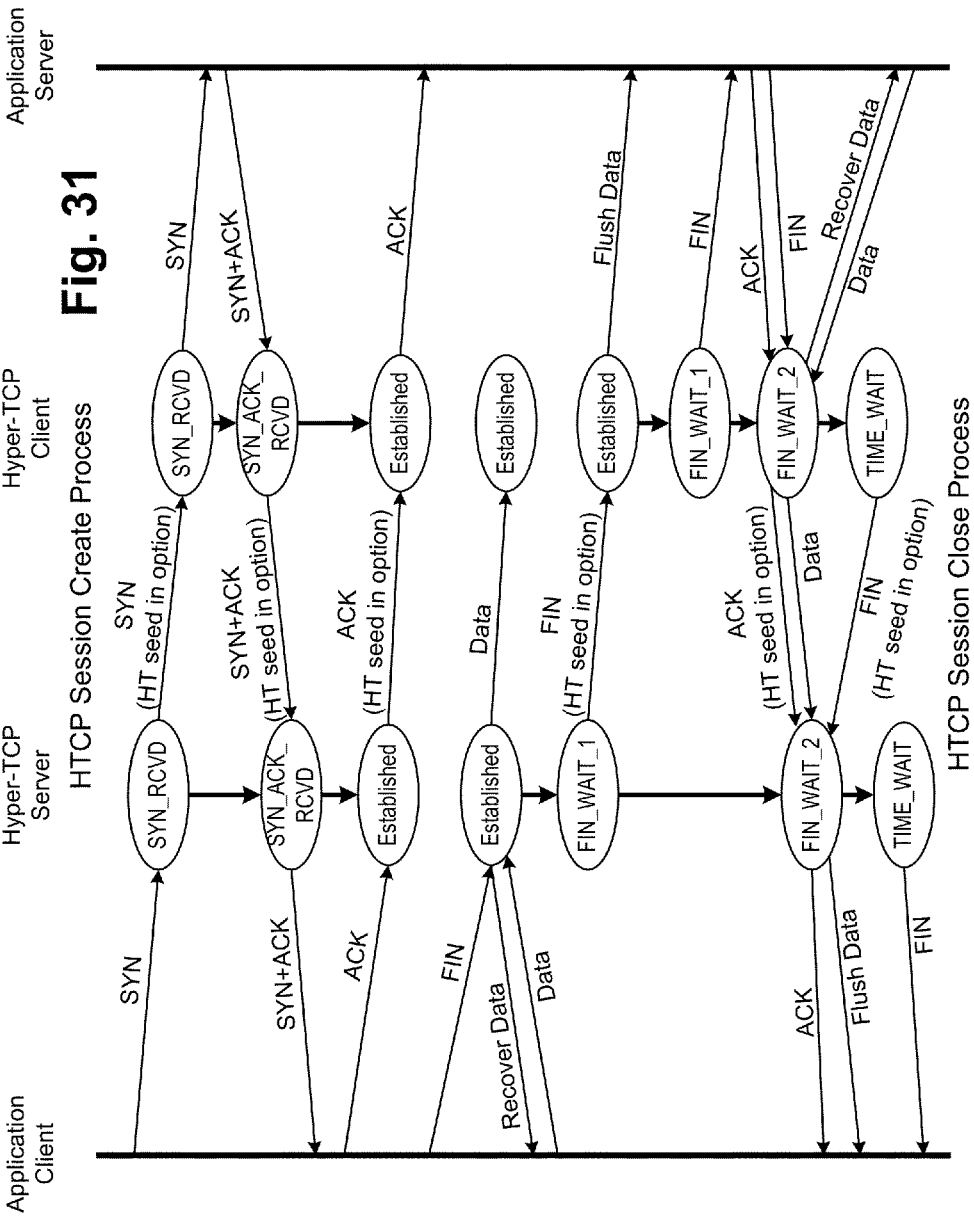
FIG. 31 is a ladder diagram of Hyper-TCP session create and close processes according to at least some example embodiments of the present invention.

The session create process is illustrated in FIG. 31. The application client transmits a SYN, which is snooped by the Hyper-TCP server. The Hyper-TCP server forwards the SYN to the Hyper-TCP client, potentially with a seed value in the TCP header options field. The seed value can indicate whether this is a Hyper-TCP session, a termination mode, the Hyper-TCP version and the like. The seed value is used by the various modules, such as the data compaction engine 3010 and the CVI 3006, to determine the need for and level of acceleration of the session. The Hyper-TCP client snoops and forwards the SYN to the application server. The application server responds with a SYN+ACK, which the Hyper-TCP client snoops and forwards to the Hyper-TCP server. The Hyper-TCP server snoops the SYN+ACK and forwards it to the application client. The application client responds with an ACK, which the Hyper-TCP server forwards to the Hyper-TCP client, which in turn provides it to the application server. This results in a created TCP session.

Once the session has been established, the data transfer is always locally handled between a Hyper-TCP device and the end device. A Hyper-TCP server acting as a proxy destination server for the application client locally acknowledges the data packets and the TCP session state is updated. The data is handed over to the HBTCP session between the Hyper-TCP client and server. HBTCP session compresses and forwards the data to the Hyper-TCP client. This reduces the RTT's seen by the application client and the source as it masks the latencies incurred on the network. The data received at the Hyper-TCP client is treated as if the data has been generated by the Hyper-TCP client and the data is handed to the Hyper-TCP process running between the Hyper-TCP client and the application server. Upon congestion in the network, the amount of data fetched from the Hyper-TCP sockets is controlled.

Figure 32:
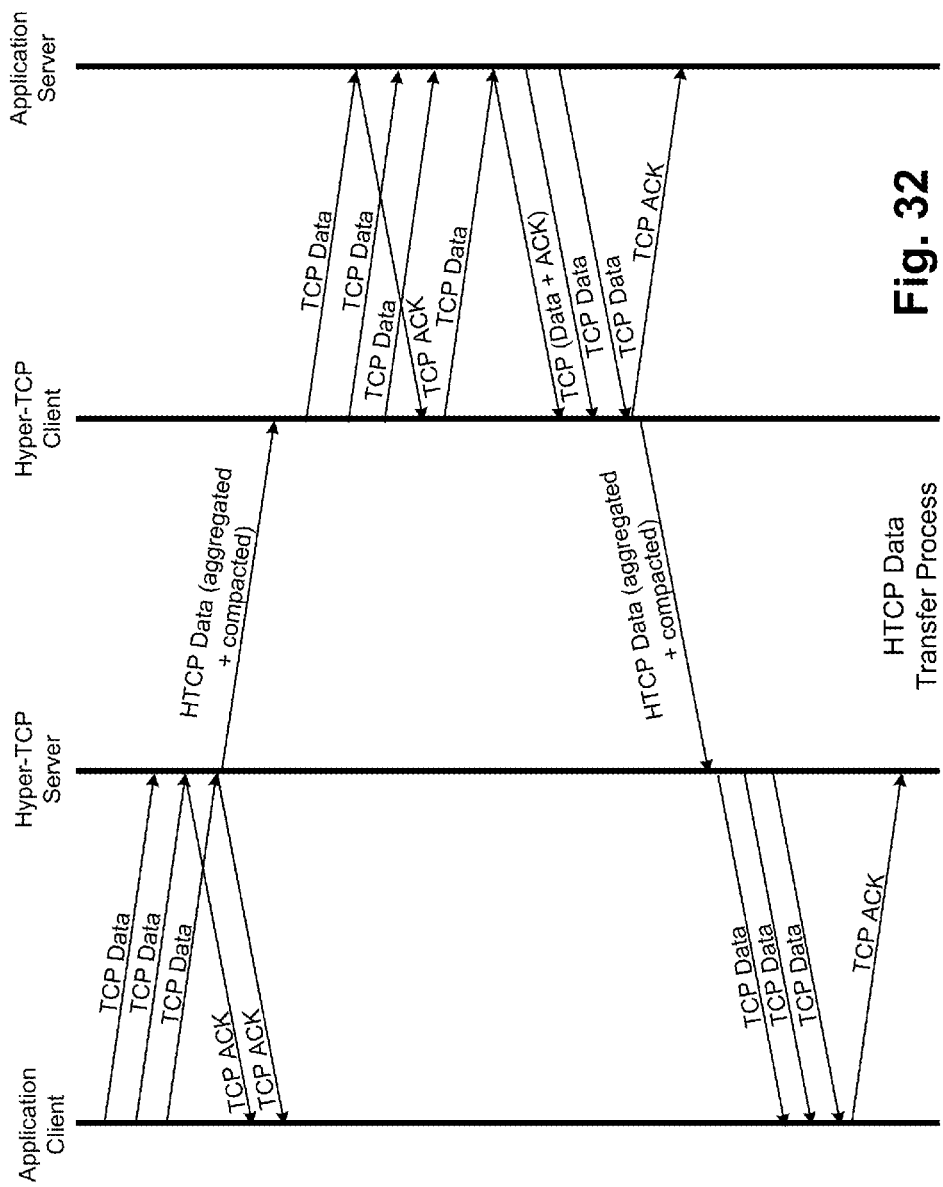
FIG. 32 is a ladder diagram of Hyper-TCP data transfer operations according to at least some example embodiments of the present invention.

This process is illustrated in FIG. 32. Data is provided from the application client to the Hyper-TCP server, with the Hyper-TCP server ACKing the data as desired, thus terminating the connection locally at the Hyper-TCP server. The LDCM device aggregates and compacts the received data to reduce WAN traffic and sends it to the Hyper-TCP client in the other LDCM device. The receiving LDCM device uncompacts and deaggregates the data and provides it to the Hyper-TCP client, which in turn provides it to the application server, which periodically ACKs the data. Should the application server need to send data to the application client, the process is essentially reversed. By having the Hyper-TCP server and client locally respond to the received data, thus locally terminating the connections, the application server and client are not aware of the delays resulting from the WAN link between the Hyper-TCP server and client.

During session termination, a received FIN/RST is transparently sent across like the session establishment packets. This is done to ensure the data integrity and consistency between the two end devices. The FIN/RST received at the Hyper-TCP server will be transparently sent across only when all the packets received prior to receiving a FIN have been locally acknowledged and sent to the Hyper-TCP client. If a FIN/RST packet has been received on the Hyper-TCP client, the packet will be transparently forwarded after all the enqueued data has been sent and acknowledged by the application server. In either direction, once the FIN has been received and forwarded, the further transfer of packets is done transparently and is not locally terminated.

This is shown in more detail in FIG. 31. The application client provides a FIN to the Hyper-TCP server. If any data has not been received by the Hyper-TCP server, the Hyper-TCP server will recover the data from the application client and provide it to the Hyper-TCP client. The Hyper-TCP server then forwards the FIN to the Hyper-TCP client, which flushes any remaining data in the Hyper-TCP client and then forwards the FIN to the application server. The application server replies with an ACK for the flushed data and then a FIN. The Hyper-TCP client then receives any outstanding data from the application server and recovers data to the application server. The ACK and the data are forwarded to the Hyper-TCP server. After the data is transferred, the Hyper-TCP client forwards the FIN to the Hyper-TCP server. The Hyper-TCP server forwards the ACK when received and flushes any remaining data to the application client. After those are complete, the Hyper-TCP server forwards the FIN and the session is closed.

Figure 33:
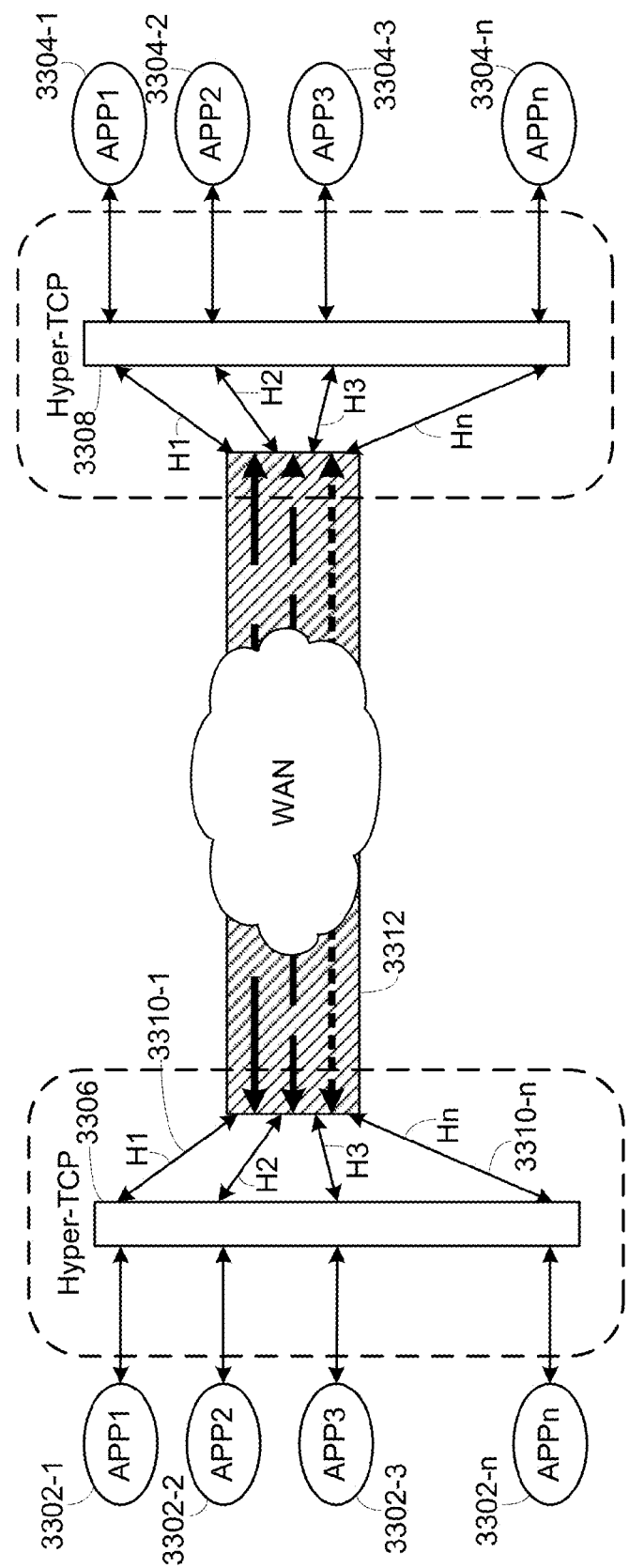
FIG. 33 is a block diagram illustrating the operation of Hyper-TCP according to at least some example embodiments of the present invention.

FIG. 33 illustrates the effective operation of the Hyper-TCP server and client over the CVI 3312. A series of applications 3302-1 to 3302-n are communicating with applications 3304-1 to 3304-n, respectively. The Hyper-TCP server agent 3306 cooperates with the applications 3302 while the Hyper-TCP agent 3308 cooperates with the applications 3304. In the illustration, four different Hyper-TCP sessions are shown, H1, H2, H3 and Hn 3310-i to 3310-n, which traverse the WAN using the CVI 3312.

Figure 34:
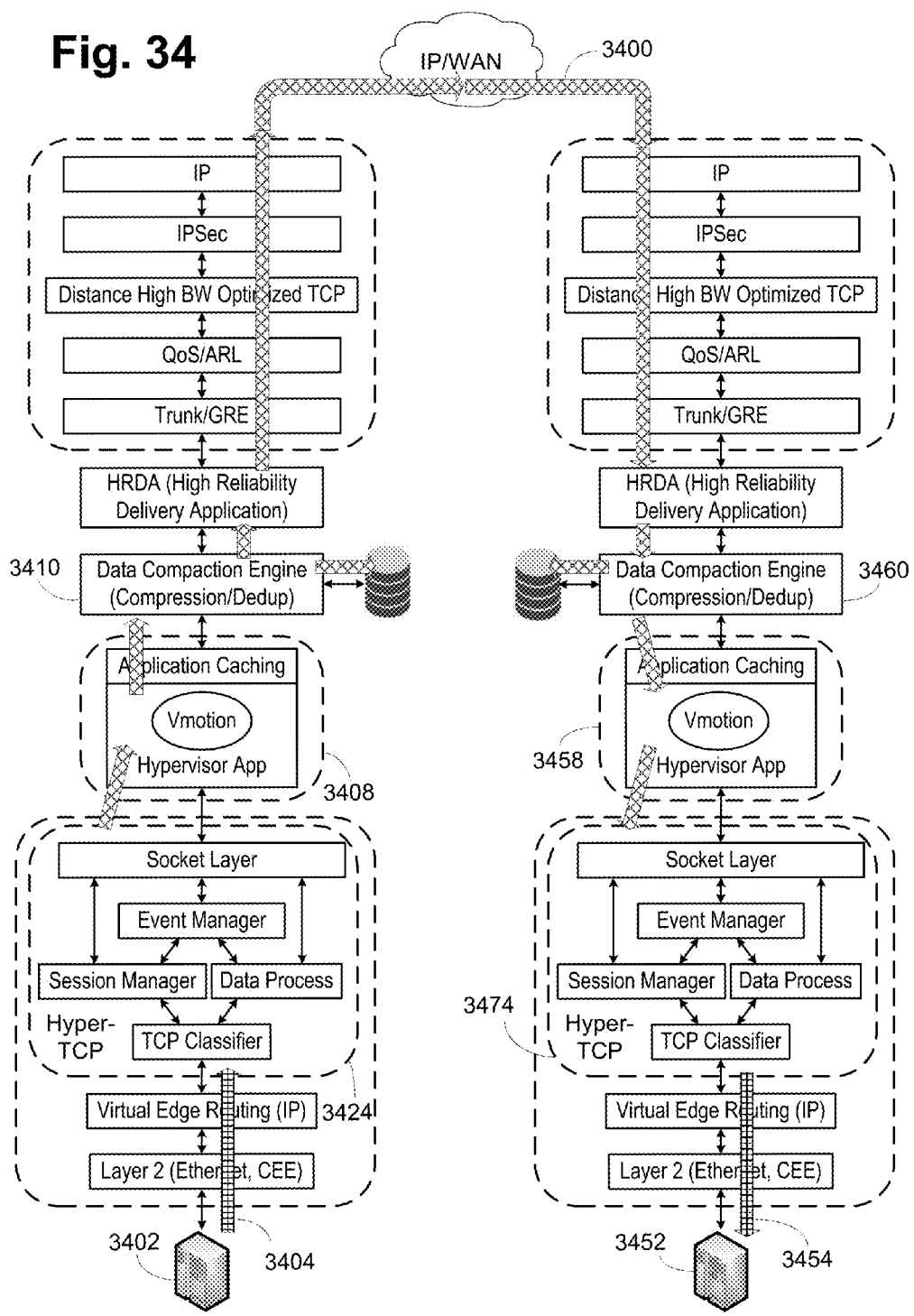
FIG. 34 is a block diagram of a de-duplication engine for use in network communications according to at least some example embodiments of the present invention.

FIG. 34 illustrates how LDCM performs a vMotion migration event between two ESX servers 3402, 3452. A HBTCP session 3400 is established between the Hyper-TCP server 3024 and client 3474. The filtering of the sessions that need acceleration are done based on the user configuration. Once a TCP session is established between the two ESX servers 3402, 3452, the Hyper-TCP client/server locally terminates the TCP session 3404. The packets from the source ESX server 3402 are locally acknowledged by the Hyper-TCP proxy server 3024. The data is then handed to HBTCP operations. HBTCP sends compressed and encrypted data to the HBTCP running with the Hyper-TCP proxy client 3474. The data transferred is finally handed over to the Hyper-TCP session between the Hyper-TCP client 3474 and the destination ESX server 3452 in TCP session 3454. This mechanism enables parallel transfer of data between the two ESX servers 3402, 3452 and completely unaffected by the WAN latency.

The migration is further improved through application caching, wherein application caching modules such as 3050 cache the data being transferred from the ESX server 3402. The application data caching module 3050 caches the already acknowledged data at the destination node (Hyper-TCP client 3474). The destination node updates the caching and storage status to the source node (Hyper-TCP server 3024), which is used to control the sessions that are being accelerated. A session manager uses the application credentials provided by the administrator to terminate the application's TCP sessions by using the Hyper-TCP modules 3024, 3474. If caching storage is over utilized, the session manager filters the low priority application flows from the acceleration/optimization by using a cache storage consumption control signal with the destination node. In general the session manager allocates maximum consumable memory storage based on the bandwidth policy and the WAN latency. The destination device consumption rate is determined by monitoring the egress data flow. This device consumption rate is passed to the application source which is used to control the ingress data from the source device.

The TCP session between the ESX servers 3402, 3452 is locally terminated by the Hyper-TCP modules 3024, 3474. The vMotion application in the application module 3008 dequeues the socket data and sends the data to the data compaction engine 3010. The data block, if not previously seen, is cached and then compressed. An existing HBTCP session through the path picked up by the HRDA layer 3012 is used to send the compressed data to the destination server 3452. On the destination side, the application module 3458 is signaled and the data received is sent to the data compaction engine 3460 to be decompressed. The data is then sent to the application caching module to be cached. The vMotion application in the application module 3458 picks up the uncompressed data and enqueues the data in the socket buffer of the Hyper-TCP session. The data is then dequeued and is finally sent to the destination ESX server 3452. If the data block had a hit at the application caching module in the source LCDM, instead of sending the whole data block, only a signal is sent. This signal is decoded at the destination LCDM and the data is fetched from the cache locally and is sent to the destination ESX server 3452.

This caching, in conjunction with the local TCP termination makes it appear to the ESX server 3402 that the vMotion operation is happening well within the limitations. Likewise, the caching and local TCP termination at the ESX server 3454 end makes it appear to the ESX server 3454 that the vMotion operation is occurring within the limitations as well. The CVI/HBTCP recovers any packet drop in the WAN and provides seamless and parallel transfer of the data. In essence, the Hyper-TCP working in conjunction with the High Bandwidth TCP effectively mask the network latencies experienced by the ESX servers 3402, 3452 during the migration, resulting in high migration performance.

Figure 35:
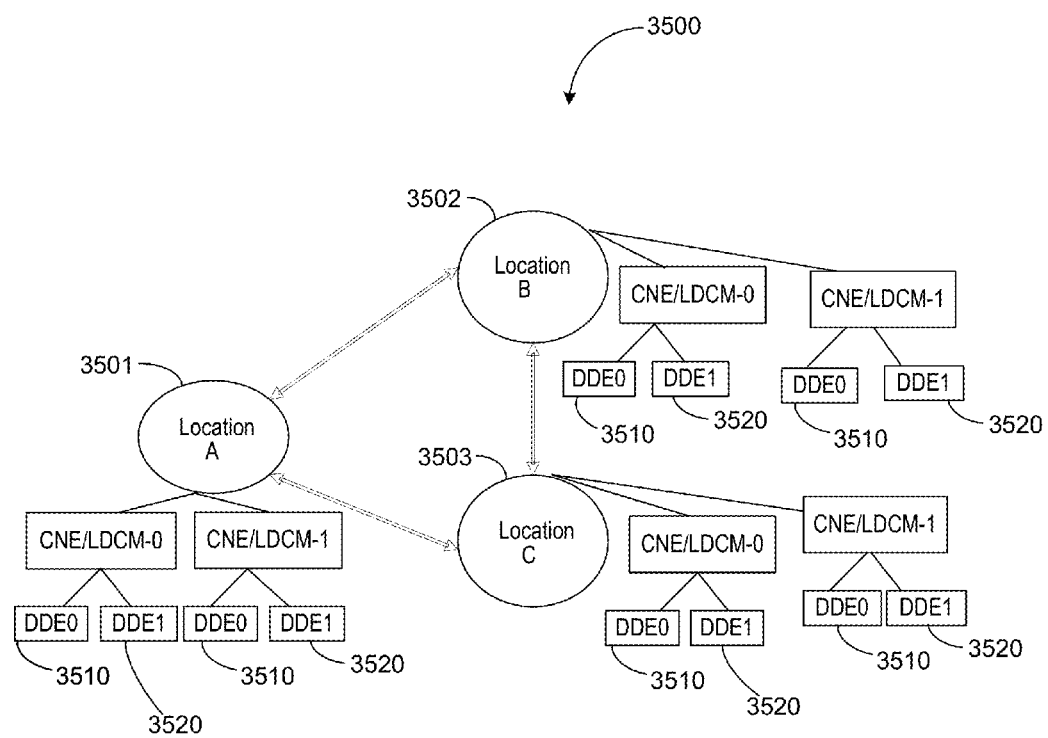
FIG. 35 is a block diagram of multiple LDCM devices at each data center according to at least some example embodiments of the present invention.

Shared Dictionary Between Different De-Dup Engines and Different CNE/LDCM Devices In order to provide more efficiency, in the preferred embodiment of the present invention, the dictionary is shared between deduplication engines (DDEs) or CNE/LDCM devices. This sharing helps achieve a better ratio for advanced compression. Sharing the dictionary increases a segment's history and increases the probability of finding a history match for the receiving segment. FIG. 35 illustrates a high availability (HA) configuration 3500 according to one embodiment of the present invention, with two CNE/LDCM devices, CNE/LDCM-o and CNE/LDCM-1 at each of three locations, Location A 3501, Location B 3502 and Location C 3503. Each CNE/LDCM device of FIG. 35 has two DDEs, DDE0 3510 and DDE1 3520. Generally, to establish such a configuration, various control path operations must occur.

A control path interface or Advanced Compression system module (ACM) provides the interface for configuring deduplication compression. The control path interface module sets up object models for the ACM that are referred to in the data path flow. In embodiment of FIG. 35 which includes three locations A 3501, B 3502 and C 3503, all locations communicate with each other and each DDE defines one instance of the ACM. In one configuration, a local site can either have two such instances (a one node CNE/LDCM device) or four such instances (two node clustered CNE/LDCM devices).

When there are multiple instances of the ACM in one location, the instances can be in distributed or stand-alone configurations. Each instance is qualified by a system wide location id, CNE/LDCM device Id and a DDE ID. In a distributed configuration, all ACM instances in a location have a common dictionary and an instance knows about all other ACM instances present in the same location (referred to as peer instance). When data is stored in the dictionary, it is fully qualified with the ACM instance information to/from which data is being sent/received. This is generally required, as data is exchanged only once between a pair of instances (or a pair of locations in a distributed configuration). A unique pair of ACM instances communicating creates a site-pair specific table. For distributed dictionaries, a short token which is qualified fully or at least partially (CNE/LDCM device ID & DDE ID) and which represents a segment, is sent over to a remote location. For non-distributed dictionaries, this token can be sent without any qualifiers.

An ACM instance maintains an Index Table, Object Table and a Segment Store. An object table includes logical and physical metadata pages. Logical metadata pages are maintained for every remote ACM instance (that an ACM instance communicates to) and provide a unique name space between local and remote ACM instances. Physical metadata pages have corresponding records for all the segments in the segment store of the ACM instance.

As discussed before, an index table provides fingerprint based lookup service. It determines whether a fingerprint (and hence data segment) was previously seen by the system. If the fingerprint is found in the database, a small length token is returned. Otherwise a new record is added. The record has a fingerprint and a small length token. The records are organized into buckets and different buckets of the table can be processed concurrently.

An object table stores location information of the segments in the dictionary. A record is directly accessed by its token value. Therefore, the primary key for the object table is the token of the record. The token is implicitly derived from the location of the record within the table. The records arrangement system provides spatial-temporal co-location of records. A metadata page is a collection of related records and serves as a unit of allocation. It also provides arrangement of pages based on different policies such as FIFO, LRU, priority based, and the like. In one embodiment, a layer of indirection is implemented in metadata page management. This facilitates sharing of segments among multi-site flows.

The storage space for storing variable sized segments is referred to as the segment store. The segment store is divided into more two or more pools, each pool supporting a fixed size chunk allocation. These chunks form a unit of allocation and free operations. A block is assigned to a segment exclusively. More than one block can be assigned to a segment but a block is never shared between more than one segments. This helps in deleting segments and avoiding blocks getting fragmented due to segment deletion.

In one embodiment, when a location or a CNE/LDCM device is added in the configuration, a corresponding set of tunnels is created. This is an indication for the ACM to create site-pair specific information. In a shared configuration, information about peer instances must be updated with every instance of the new location. The location update must also be sent to all other locations that it communicates with.

Figure 36A:
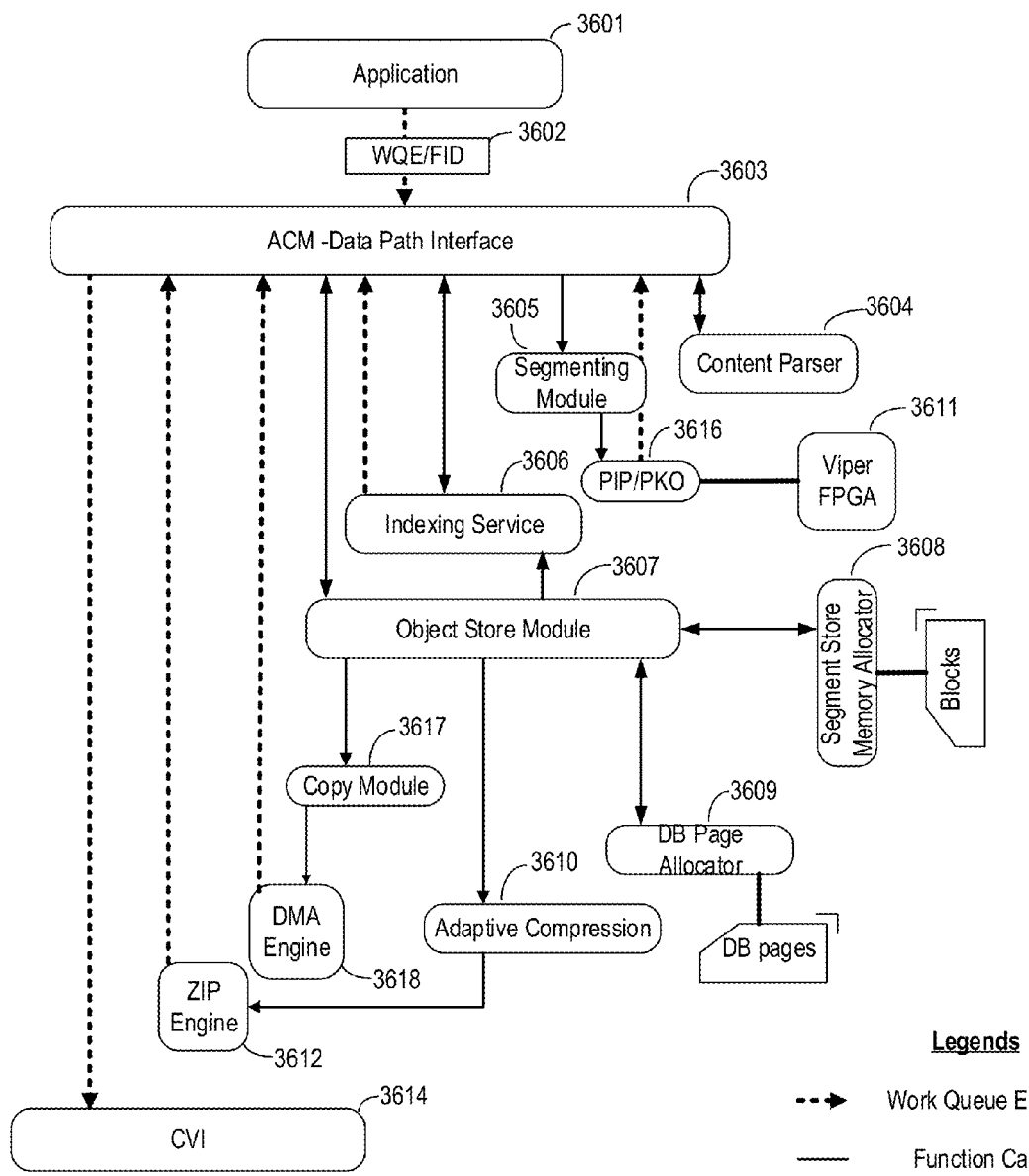
FIG. 36A is a block and flow diagram of a deflate operation according to at least some example embodiments of the present invention.

Advanced compression performs deflate operations (compression) on LAN ingress and inflate operations (decompression) on LAN egress. A deflate operation involves the process of reducing data by removing duplicate byte segments and applying the standard compression algorithm on new byte segments. This two-pass compression results in a far greater data reduction than regular compression algorithms. FIG. 36A provides an overview of the steps involved in a deflate operation in accordance with one embodiment of the present invention.

The process begins when an application 3601 submits a list of buffers (also referred to as a gather list) using a work queue entry or WQE 3602 to the Advanced Compression data path interface 3603. The data path interface (DPI) uses a content parser module 3604 to parse the buffers and create different run lists (continuous byte segments), based on the type of operation a buffer needs to undergo. One type of run list(s) includes buffers that need to undergo both advanced compression and software compression. Another type includes those that should undergo only software compression, and a third type of includes those that can skip both the advanced compression and software compression operations.

After the run lists have been created, the DPI transfers the run list(s) to a segmenting module 3605 to perform content based segmenting. In one embodiment, this content based segmenting is done using a Viper FPGA 3611. The Viper FPGA includes an engine called Content Defined Segmenting processor for creating one or more variable length segments as described above. The DPI receives the segment information messages from the Viper FPGA 3611 through the PIP/PKO 3616 and passes the information to the segmenting module 3605 to create segment objects. A segment object is defined as a byte segment with its fingerprint.

After segment objects have been created, the DPI 3603 submits the objects to the indexing service 3606 to perform a lookup. The indexing service 3606 can return the following results: 1) the segment object is new, in which case the DPI 3603 will add these segment objects to the dictionary; 2) the segment object is new for the current site pair, in which case only a logical record is created in a site-pair specific table; 3) the segment object is old, in which case the indexing service 3606 already has a corresponding record for it.

For new segment object(s), the DPI 3603 issues an add objects command to an Object Store Module (OSM) 3607. The OSM 3607 then allocates a block of segment memory, if it does not have a block associated with the stream already, through a segment store memory allocator 3608. If the OSM 3607 does not have a page associated with the stream already, the OSM can allocate a page for storing the records, through a DB page allocator 3609. After a block of memory and a page have been allocated, the OSM 3607 stores the segment in the dictionary using the copy module 3617 and the DMA engine 3618 and also uses the adaptive compression API 3610 to request compression. The adaptive compression API 3610 uses a ZIP API to send the request to a ZIP engine 3612. The ZIP engine 3612 schedules the compression result using a flow ID as an atomic tag. The DPI 3603 uses the adaptive compression API 3610 to parse the compression result. Finally, the DPI 3603 constructs the output and schedules a WQE using a Virtual Tunnel ID as an atomic tag.

Figure 36B:
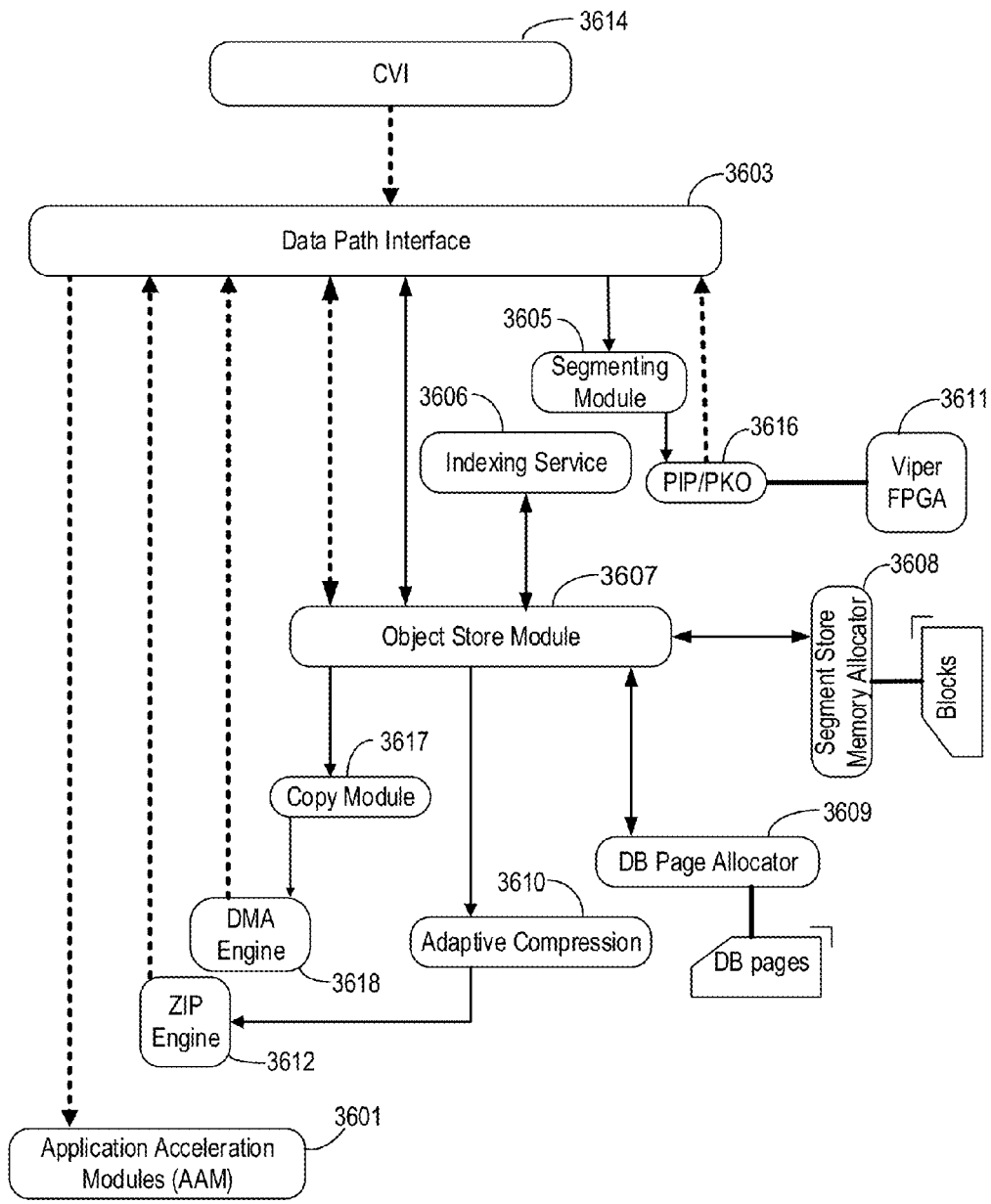
FIG. 36B is a block and flow diagram of an inflate operation according to at least some example embodiments of the present invention.

In contrast to an deflate operation, an inflate operation is a process of expanding the compressed encoded data to its original bytes by applying standard decompression algorithm and supplementing old byte segments from the local segment store. FIG. 36B provides an overview of the steps involved in an inflate operation in accordance with one embodiment of the present invention.

To begin an inflate operation, a CVI 3614 constructs back the original PDU by creating a WQE with related tag information and submitting the WQE to the Advanced Compression data path interface (DPI) 3603. The DPI 3603 parses the ACM specific metadata and creates segment objects. The DPI 3603 also uses the OSM interface 3607 to lookup segment objects based on the reference, if there are any old objects.

The OSM interface 3607 then sends a decompression request to the Adaptive compression module 3610, which issues a decompression command to the ZIP engine 3612. The ZIP engine 3612 schedules a WQE entry with a flow ID as an atomic tag on completion of the decompression command. If there are new data in the command, the DPI 3603 issues a segmenting request to the segmenting module 3605.

The PIP 3616 schedules a WQE entry to the DPI 3603, when it receives segment information packets from the Viper FPGA 3611. The DPI 3603 uses the segmenting module 3605 to parse the results and update segment objects. The DPI 3603 also uses the OSM interface 3607 to add the segment to the dictionary using the copy module 3617 and the DMA engine 3618. If there is no block associated with the stream, the OSM 3607 allocates a segment block for the stream. The OSM 3607 also allocates a page for storing a record for the stream, if it does not already have a page associated with the stream. The OSM 3607 then stores the records in the pages, compresses the data, stores the data in segment blocks, and updates the indexing service 3606. The DPI 3603 schedules a WQE entry for the next module using the user tag information and module id in its header.

In the preferred embodiment of the present invention, to share the dictionary between two or more devices, the dictionary is divided between the available DDEs in all CNE/LDCM devices that support a shared dictionary. The fingerprints are then distributed to different DDEs based on a hash function. The hash function takes the fingerprints and hashes them. Based on the hash results, the hash function selects one of the DDEs. For example, the hash function can select a few bits from the fingerprint and use these bits to select a DDE. In one embodiment, to share between 4 DDEs, 2 bits from the fingerprint are selected, and to share between 8 DDEs, 3 bits are selected.

To begin such a sharing operation, a first DDE, DDE1 receives the data and performs the segmentation and fingerprint processing, obtaining a fingerprint (FP) for each segment. Assuming there is only one segment, FP1, and FP1 is a new segment, the operation then involves processing FP1 to find out which DDE engine owns the fingerprint.

If while processing the FP1, DDE1 finds based on the hash that FP1 is owned by a second DDE, DDE2, DDE1 sends a message to DDE2 to get the reference for FN. In the preferred embodiment the reference includes at least two values, an encoded value indicating the owning remote side DDE and the token value which indicate the location of the segment in the tables. Just as a hash of the fingerprint determines the owner between DDE1 and DDE2, a hash of the fingerprint also determines the owning DDE at the remote site. This determination can be done at the local site by DDE1 or DDE2 as they know the number and configuration of DDEs at the remote site and therefore which hash to use. DDE2 then looks up FP1 and finds out that it is a new segment. Subsequently, DDE2 sends a message back to DDE1 indicating that FP1 is a new segment and it does not have a reference for it. DDE1 then sends the data and fingerprint for FP1 to DDE2 which adds this fingerprint (FP1) and the data to its database. After adding the fingerprint to its database, DDE2 sends a reference for FP1 to DDE1. In one variation of this scheme, when DDE 2 replies indicating that FP1 is a new segment, it allocates the reference and sends it with the response. DDE1 sends this reference and the data to the remote side. This enhancement reduces the latency and the exchange of messages between DDE1 and DDE2.

If FP1 is owned by DDE1 itself, then DDE1 checks to see if the segment is old or new. If new, then DDE1 adds the fingerprint and data to the database and obtains the reference. The reference and the data are then provided to the remote side.

On the receiver side, a DDE3 receives the FP1 reference and data sent by DDE1 and generates the fingerprint of the data. Either from the reference by using the included encoded ownership value or by performing the ownership hash on the fingerprint, DDE 3 can determine that this segment should be owned by DDE4 and that FP1 is a new segment. As DDE3 can use the fingerprint to generate the owning DDE, it is not required that the reference included the owning DDE for cases of new segments, but it is preferred to allow crosschecking and to save a communication back to DDE1 indicating remote side ownership. DDE3 then forwards the fingerprint, FP1 reference and data to DDE4 which stores the fingerprint, reference and data for FP1 in the dictionary. DDE3 then sends the data to the server.

If DDE3 determines that it is the owner, then DDE3 stores the fingerprint, reference and data in its dictionary and sends the data to the server.

In cases where the segment is an old segment, FP2, and assuming that there is only one FP2, DDE1 hashes FP2 to find the DDE that owns that fingerprint. If this FP is owned by DDE2, DDE1 sends a get reference message for FP2 to DDE2. Because FP2 is an old segment, DDE2 finds the reference for it and sends it back to DDE1. The reference always indicates which DDE owns the fingerprint. When DDE1 receives the reference for FP2 it prepares its control message and sends the reference for FP2 to the remote site.

If DDE1 determines that it is the owner, then DDE1 retrieves the reference and sends the reference to the receiver or remote site.

On the receiver side, DDE3 receives the FP2 reference. From the reference, which is used to obtain the owner as there is no data to develop a fingerprint from, DDE3 will know that this segment is owned by DDE4. DDE3 will then send a message to DDE4 to get the data associated by this reference. DDE 4 retrieves the data associated with FP2 and sends it to DDE3 which will reconstruct the data as it was sent from the client and deliver it to the server.

If DDE3 determines that it is the owner, DDE3 retrieves the data based on the reference and sends it to the server.

The above discussion is based on a simple configuration with just two mirror sites. If there are three or more sites that are connected, each with distributed dictionaries, the maintained information and operations are slightly different. Specifically, bits are added to the dictionary for each fingerprint to indicate which remote site has obtained the segment. The same token value is used for each remote site but the owner value in the reference might change based on the configuration of the remote site. Thus it may be helpful to store the owner identification with the remote site bit in the dictionary but it can also always be regenerated each time as the fingerprint will always be available to DDE1 as that is used to perform the lookup. As an example, if DDE1 receives a segment directed to DDE5 at the second remote site and develops FP3, it performs the lookup and determines that DDE1 has already provided the segment to DDE3 at the first remote site but has not provided it to DDE 5 at the second remote site. It will treat this as a new segment operation and perform those steps in sending the segment to DDE5. It will then mark the second remote site bit and optionally store the owner information for the second remote site but DDE1 will not have to store the segment again as it is already stored based on the earlier transaction with DDE3. Thus, if FP3 is again received for transmission to the second remote site, the lookup will indicate the segment has already been provided and the old segment protocol will be used.

When using a distributed dictionary configuration, the deflate operation described above needs to be slightly altered. In such a configuration, the dictionary is distributed across multiple processing nodes, an instance of which handles pre-defined spaces for fingerprint distribution. FIGS. 37A-37B illustrate such a configuration.

As shown in FIG. 37A, a deflate operation in a distributed dictionary configuration begins when the application acceleration module 3701 submits a list of buffers (a gather list) using WQE 3702 to the ACM data path interface, DPI 3703. The DPI 3703 then uses the content parser module 3704 to parse the buffers and create different run lists based on the different types of operations they need to undergo: 1) run list(s) for buffers that need to undergo both advanced compression & software compression, 2) run list(s) for those that need to undergo only software compression, and 3) run list(s) for those that can skip both operations. The DPI 3703 then sends these run list(s) to the segmenting module 3705 to perform content based segmenting using the Viper FPGA 3711.

The Viper FPGA 3711 sends the segmentation information to the DIP 3703 which will then process these messages using the segmenting module 3705 and create segment objects. A segment object is defined as a byte segment with its fingerprint. A DDE mask is then applied on a segment's fingerprint to determine which DDE should process the fingerprint. Segments that need to be processed by remote DDEs, are sent to the serialization & Messaging layer 3716 which creates a message that will be sent to the remote DDE. The DPI 3703 then sends the message to the remote DDE using a Massage interface layer 3718.

The next steps involved in this operation are the same as those with a standalone dictionary. These include, the DPI 3703 submitting the remaining segments that need to be processed locally to the indexing service 3706 to perform a lookup. After looking up the remaining segments, if it is determined that a segment is new, the DPI 3703 issues an add objects command to the OSM 3707. If it does not have a block associated with the stream already, the OSM 3707 may allocate a block of segment memory to the segment. It may also allocate a page for storing records, if it does not have a page associated with the stream already. The OSM 3707 then uses the adaptive compression API 3710 to request for compression. The adaptive compression 3710 uses a ZIP API to send the request to the ZIP engine 3712. The ZIP engine 3712 schedules compression results using a flow ID as an atomic tag. The DPI 3703 then uses the adaptive compression API 3710 to parse the compression results and constructs the output and schedules a WQE using a Virtual Tunnel ID as an atomic tag.

FIG. 37B illustrates this deflate operation on a local peer ACM instance. The process begins when the messaging interface 3718 submits a list of buffers using WQE 3702 and the received tag to the DPI 3703. The DPI 3703 receives the buffers and begins processing in a manner similar to the deflate operation discussed above with respect to FIG. 37A.

The previously described inflate operation is also changed when applied to a distributed dictionary configuration. An instance of such an operation which handles pre-defined space of fingerprint distribution is shown in FIG. 38A. The process starts when the CVI 3714 constructs back an original PDU, creates a WQE 3702 with the supplied tag information and submits it to the ACM data path interface, DPI 3703. The DPI 3703 parses the ACM specific metadata and creates segment object. For new segments, data is decompressed and sent to the segmenting module 3705 to generate fingerprints for the data. The Viper 3711 generates the segment information and sends the response back to the DPI 3703. The DPI 3703 parses the segment information and updates segment objects with the fingerprint information. For segment objects with references belonging to other local peer ACM instances, the DPI 3703 calls the serialization and messaging function 3716 to create message payloads to be sent to peer ACM instances.

The DPI 3703 also schedules work for the messaging interface 3718 which sends the payload to local peer instances. New and old Segments with references from this instance are sent to the OSM 3707 and the indexing service 3706 for further processing. The indexing service 3706 adds new segments to the index table and the OSM 3707 creates the corresponding logical and physical records. The DPI 3703 then adds the new segments to the dictionary using the OSM 3707. The OSM 3707 also decompress old segment data from the segment store, before data is available for application and compresses new segment's data before data is stored in the segment store.

The adaptive compression function 3710 uses the ZIP command to request for compression and decompression and the ZIP engine 3712 schedules a WQE on completion of the compression command. The DPI 3703 handles the WQE and uses the adaptive compression function 3710 to parse the compression results. The messaging interface 3718 sends a response to the local peer request and schedules a WQE for the DPI 3703. The DPI 3703 then schedules a WQE entry for the next module using user tag information and a module id in its header.

FIG. 38B illustrates this deflate operation on a local peer ACM instance. The messaging interface 3702 schedules a WQE when it receives a payload from a peer node. The DPI 3703 processes the WQE and payload and calls the serialization and messaging function 3716 to de-serialize the message payload and create segment objects. The OSM interface 3707 is then called to lookup an old segment's reference or add a new segment, if the segment is new For new segments, the OSM 3707 adds new records, corresponding to the new segments to the index table and uses the adaptive compression function 3710 to compress the data. The adaptive compression 3710 uses a ZIP command to submit a compression request to the ZIP engine 3712. The ZIP engine schedules a WQE after completing the compression command and the DPI 3703 processes the WQE and prepares a payload that needs to be sent to the peer ACM instance.

In addition to sharing the dictionary, another way to achieve a higher compression ratio is to increase the space available for the segment store. In order to increase the space available for the segment store, all the RAM available to the DDEs of CNE/LDCM devices clustered together in a location (ACM peer-DDEs) can be used as the segment store. In such a case, each CNE/LDCM device will be responsible for a certain portion of the segment store and the fingerprints. Depending on the maximum number of CNE/LDCM devices that are possible in a site, some bits of the SHA-1 fingerprint can be used to select the DDE that will handle that fingerprint. This is shown in table 6 below.

TABLE 6

| 160-bit SHA-1 finger-print: |||
| e6 84 da b9 07 a9 08 19 a0 af 4d 1f 16 a7 82 15 12 b7 d0 3d |||
| --- | --- | --- |
| Use top 4 bits to select local-site DDE | Others bits to choose array within bucket | Use bottom 27 bits to select hash bucket |

Table 7 below shows an OSM logical record. As shown the DDE ID bits have a direct correspondence to bits in the segment fingerprint.

TABLE 7

| Hash Bits | DDE ID bits | Identifier bits |
| --- | --- | --- |

When sharing the dictionary, processing of fingerprints and the corresponding segments is distributed among DDEs based on the DDE ID bits in the fingerprint. Segment Tokens are also forwarded to corresponding DDEs based on the DDE ID in the token.

In an alternate approach sharing data across multiple instances of data dictionary at a location can be achieved by another method. Such a method includes setting the node that receives the data as the owner of the data. Thus the receiving node stores the resulting new segments in its dictionary and every node owns a fingerprint value range based on the fingerprint mask. A node has an associated fingerprint mask which determines fingerprint values that it owns. For example, considering there are four nodes in each site ($Node_A$, $Node_B$, $Node_C$ and $Node_D$) and one node, $Node_A$ receives the data buffer, after performing SFP, $Node_A$ sends queries with a batch of FP requests to nodes that own fingerprint value ranges based on the fingerprint mask. $Node_B$, $Node_C$ and $Node_D$ respond to $Node_A$ with the results of the lookup search identifying a segment as new or old. If old, these nodes supply fully qualified reference (FQR) for fingerprints.

If the segment is determined as new, $Node_A$ stores the segment in its segment store and adds it to the object table. It then sends the reference to another local node which owns the fingerprint value range which, in turn, adds the record to its index table pointing to the object table record in $Node_A$. $Node_A$ then builds the advanced compression control information and sends the data to a remote node (say $Node_E$). $Node_E$ then can perform segmenting, if the new data was sent across a WAN link.

$Node_E$ may also store the new data in its segment store and update its index table with the fingerprint for fingerprint values that it owns. $Node_E$ then sends out the fingerprint and reference to other nodes in the remote site (e.g., $Node_F$, $Node_G$ and $Node_H$). These nodes update their index tables with references from $Node_E$.

If the segment is determined as old data, for references that belong to Node$_E$, data is retrieved from its segment store. For references that belong to the other nodes in remote sites, Node$_E$, sends a data request to those nodes.

Thus, a system and method for managing a network deduplication dictionary is disclosed in which the dictionary is divided between available deduplication engines (that support shared dictionaries. The fingerprints are distributed to different DDEs based on a hash function. The hash function takes the fingerprint and hashes it and based on the hash result, it selects one of the DDEs. The hash function could select a few bits from the fingerprint and use those bits to select a DDE.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A data deduplication engine (DDE), comprising:
   a plurality of local area network (LAN) ports for coupling to a LAN, the LAN including a data device and a second DDE;
   at least one wide area network (WAN) port for coupling to a WAN, the WAN including a remote DDE; and
   an engine coupled to the plurality of LAN ports and to the at least one WAN port for receiving an input data stream containing duplicates from the data device, providing an output data stream containing duplicates to the data device, providing references and segments to the remote DDE and receiving references and segments from the remote DDE;
   wherein upon receiving the input data stream from the data device, the engine performs segmentation and fingerprint processing on the input data stream to create a first segment and a first fingerprint for the first segment; and
   wherein the engine determines if the engine or the second DDE owns the first fingerprint.

2. The data deduplication engine of claim 1, wherein if the engine owns the first fingerprint, the engine determines whether the first fingerprint is for a new segment or an old segment.

3. The data deduplication engine of claim 2, wherein if the engine owns the first fingerprint and the first segment is the new segment, the engine stores the first fingerprint and the first segment, determines a first reference and provides the first reference and the first segment to the remote DDE.

4. The data deduplication engine of claim 2, wherein if the engine owns the first fingerprint and the first segment is the old segment, the engine looks up a reference for the first segment and provides the reference to the remote DDE.

5. The data deduplication engine of claim 1, wherein if the second DDE owns the first fingerprint, the engine sends a message comprising the first fingerprint to the second DDE.

6. The data deduplication engine of claim 5, wherein if the second DDE owns the first fingerprint and the first segment is an old segment, the engine receives a reference associated with the first fingerprint from the second DDE and provides the reference to the remote DDE.

7. The data deduplication engine of claim 5, wherein if the second DDE owns the first fingerprint and the first segment is a new segment, the engine receives an indication of being the new segment from the second DDE and the engine sends the first segment to the second DDE.

8. The data deduplication engine of claim 7, wherein the engine receives a reference associated with the first segment from the second DDE and the engine provides the reference to the remote DDE.

9. The data deduplication engine of claim 1, wherein if the engine receives a message comprising a second fingerprint of a second segment from the second DDE, the engine provides a reference associated with the second fingerprint to the second DDE.

10. The data deduplication engine of claim 9, wherein the engine determines if the second fingerprint is for a new segment or an old segment.

11. The data deduplication engine of claim 10, wherein if the second fingerprint is for the new segment, the engine stores the second fingerprint and provides an indication of being the new segment to the second DDE.

12. The data deduplication engine of claim 11, wherein the engine receives a second segment from the second DDE in response to the indication and stores the second segment.

13. The data deduplication engine of claim 10, wherein if the second fingerprint is for the old segment, the engine looks up the reference associated with the second fingerprint to provide the reference to the second DDE.

14. The data deduplication engine of claim 1, wherein when the engine receives a remote reference from the remote DDE, the engine determines if the engine or the second DDE owns the remote reference.

15. The data deduplication engine of claim 14, wherein if the engine owns the remote reference, the engine stores the remote reference.

16. The data deduplication engine of claim 15, wherein if the engine owns the remote reference and the engine receives a remote segment, the engine provides the remote segment as the output data stream to the data device.

17. The data deduplication engine of claim 15, wherein if the engine does not receive a remote segment associated with the remote reference from the remote DDE and the engine owns the remote reference, the engine reconstructs a segment using the remote reference and provides the reconstructed segment as the output data stream to the data device.

18. The data deduplication engine of claim 14, wherein if the second DDE owns the remote reference, the engine provides the remote reference to the second DDE.

19. The data deduplication engine of claim 18, wherein if the second DDE owns the remote reference and the engine receives a remote segment, the engine provides the remote segment to the second DDE and provides the remote segment as the output data stream to the data device.

20. The data deduplication engine of claim 18, wherein if the engine does not receive a remote segment associated with the remote reference from the remote DDE and the second DDE owns the remote reference, the engine receives a reconstructed segment from the second DDE and provides the reconstructed segment as the output data stream to the data device.

21. The data deduplication engine of claim 1, wherein the engine is configured to apply a DDE mask to the first fingerprint to determine which deduplication engine owns the first fingerprint.

22. The data deduplication engine of claim 1, wherein the engine is configured to apply a hash function to the first fingerprint to determine which deduplication engine owns the first fingerprint.

23. A method for inline data deduplication, comprising:
receiving an input data stream containing duplicates from a data device, the input data stream being received by a first data deduplication engine (DDE);
providing an output data stream containing duplicates from the first DDE to the data device;
providing references and segments to a remote DDE and receiving references and segments at the first DDE from the remote DDE;
performing segmentation and fingerprint processing by the first DDE on the input data stream to create a first segment and a first fingerprint for the first segment; and
determining by the first DDE if the first DDE or a second DDE owns the first fingerprint.

24. The method of claim 23, wherein if the first DDE owns the first fingerprint, the method further comprising the first DDE determining whether the first fingerprint is for a new segment or an old segment.

25. The method of claim 24, wherein if the first DDE owns the first fingerprint and the first segment is the new segment, the method further comprising the first DDE storing the first fingerprint and the first segment.

26. The method of claim 25, further comprising the first DDE determining a reference and providing the reference and the first segment to the remote DDE.

27. The method of claim 24, wherein if the first DDE owns the first fingerprint and the first segment is the old segment, the method further comprising the first DDE looking up a reference for the first segment and providing the reference to the remote DDE.

28. The method of claim 23, wherein if the second DDE owns the first fingerprint, the method further comprising the first DDE sending a message comprising the first fingerprint to the second DDE.

29. The method of claim 28, if the second DDE owns the first fingerprint and the first segment is an old segment, the method further comprising the first DDE receiving a reference associated with the first fingerprint from the second DDE and providing the reference to the remote DDE.

30. The method of claim 29, wherein if the second DDE owns the first fingerprint and the first segment is a new segment, the method further comprising the first DDE receiving an indication of being the new segment from the second DDE and the first DDE sending the first segment to the second DDE.

31. The method of claim 30, further comprising the first DDE receiving a reference associated with the first segment from the second DDE and the first DDE providing the reference and the first segment to the remote DDE.

32. The method of claim 23, further comprising the first DDE receiving a message comprising a second fingerprint from the second DDE, providing a reference associated with the second fingerprint to the second DDE and determining if the second fingerprint is for a new segment or an old segment.

33. The method of claim 32, wherein if the second fingerprint is for the new segment, the method further comprising the first DDE storing the second fingerprint and providing an indication of being new segment to the second DDE.

34. The method of claim 33, further comprising the first DDE receiving a second segment from the second DDE and storing the second segment.

35. The method of claim 32, wherein if the second fingerprint is for the old segment, the method further comprising the first DDE looking up the reference associated with the second fingerprint and providing the reference to the second DDE.

36. The method of claim 23, wherein if the first DDE receives a remote reference from the remote DDE, the method further comprising the first DDE determining if it or the second DDE owns the remote reference.

37. The method of claim 36, wherein if the first DDE receives a remote segment associated with the remote reference from the remote DDE and the first DDE owns the remote reference, the method further comprising the first DDE storing the remote reference and the remote segment and providing the remote segment as the output data stream to the data device.

38. The method of claim 36, wherein if the first DDE does not receive a remote segment associated with the remote reference from the remote DDE and the first DDE owns the remote reference, the method further comprising the first DDE storing the remote reference, reconstructing a segment using the reference and providing the reconstructed segment as the output data stream to the data device.

39. The method of claim 36, wherein if the first DDE receives a remote segment associated with the remote reference from the remote DDE and the second DDE owns the remote reference, the method further comprising the first DDE providing the remote reference and the remote segment to the second DDE and providing the remote segment as the output data stream to the data device.

40. The method of claim 36, wherein if the first DDE does not receive a remote segment associated with the remote reference from the remote DDE and the second DDE owns the remote reference, the method further comprising the first DDE providing the remote reference to the second DDE, receiving a reconstructed segment from the second DDE and providing the reconstructed segment as the output data stream to the data device.

41. The method of claim 23, wherein the step of determining includes applying a DDE mask to the first fingerprint to determine which deduplication engine owns the first fingerprint.

42. The method of claim 23, wherein the step of determining includes applying a hash function to the first fingerprint to determine which deduplication engine owns the first fingerprint.

43. A system for inline data deduplication, comprising:
a first deduplication engine (DDE1) coupled to one or more input ports for connecting to a local area network (LAN) and to a wide area network (WAN), the one or more output ports for receiving an input data stream containing duplicates and one or more output ports for sending an output data stream;
a second deduplication engine (DDE2) coupled to the first deduplication engine via a local area network; and
a third deduplication engine (DDE3) coupled to the first deduplication engine via the wide area network;
wherein, the DDE1 is configured to perform segmentation and fingerprint processing on the input data stream to create at least one segment and one fingerprint for the at least one segment, the DDE1 further configured to determine which deduplication engine on the local area network owns the fingerprint.

* * * * *